(12) United States Patent
Machida

(10) Patent No.: US 10,746,998 B2
(45) Date of Patent: Aug. 18, 2020

(54) OPTICAL DEVICE, IMAGE DISPLAY DEVICE, AND DISPLAY DEVICE

(71) Applicant: Sony Corporation, Tokyo (JP)

(72) Inventor: Akio Machida, Kanagawa (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 15/743,766

(22) PCT Filed: Jun. 15, 2016

(86) PCT No.: PCT/JP2016/067794
§ 371 (c)(1),
(2) Date: Jan. 11, 2018

(87) PCT Pub. No.: WO2017/013971
PCT Pub. Date: Jan. 26, 2017

(65) Prior Publication Data
US 2018/0210207 A1 Jul. 26, 2018

(30) Foreign Application Priority Data

Jul. 22, 2015 (JP) .................................. 2015-144593

(51) Int. Cl.
*G02B 27/01* (2006.01)
*G02B 27/00* (2006.01)
*F21V 8/00* (2006.01)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ............ G02B 27/0172; G02B 27/0006; G02B 27/0176; G02B 27/0178; G02B 27/0174;
(Continued)

(56) References Cited

U.S. PATENT DOCUMENTS

| 7,495,644 B2 * | 2/2009 | Hirakata | ............. H01L 51/5259 345/87 |
| 2004/0232535 A1 | 11/2004 | Tarn | |
| 2014/0340286 A1 * | 11/2014 | Machida | ............ G02B 26/0833 345/8 |

FOREIGN PATENT DOCUMENTS

| JP | 07-334067 A | 12/1995 |
| JP | 2002-107658 A | 4/2002 |

(Continued)

OTHER PUBLICATIONS

Written Opinion and English translation thereof dated Aug. 30, 2016 in connection with International Application No. PCT/JP2016/067794.

(Continued)

*Primary Examiner* — Robert E. Tallman
(74) *Attorney, Agent, or Firm* — Wolf, Greenfield & Sacks, P.C.

(57) ABSTRACT

An optical device, includes: a first substrate 121 including a first surface 121A and a second surface 121B; a second substrate 122 including a first surface 122A and a second surface 122B; deflection units 141 and 142 disposed on the first surface 121A of the first substrate 121; a sealing member 124 sealing an outer edge portion of the first surface 121A of the first substrate 121 and an outer edge portion of the first surface 122A of the second substrate 122; and a moisture absorption member 130 disposed in a space which is surrounded by the first substrate 121, the second substrate 122, and the sealing member 124.

17 Claims, 31 Drawing Sheets

(52) U.S. Cl.
CPC ..... *G02B 27/0006* (2013.01); *G02B 27/0176* (2013.01); *G02B 2027/0174* (2013.01); *G02B 2027/0178* (2013.01)

(58) Field of Classification Search
CPC .... G02B 2027/0172; G02B 2027/0174; G02B 2027/0175; G02B 1/10; G02B 1/105
See application file for complete search history.

(56) References Cited

FOREIGN PATENT DOCUMENTS

| | | |
|---|---|---|
| JP | 2007-094175 A | 4/2007 |
| JP | 2007-524112 A | 8/2007 |
| WO | WO 2013/111471 A1 | 8/2013 |

OTHER PUBLICATIONS

International Preliminary Report on Patentability and English translation thereof dated Feb. 1, 2018 in connection with International Application No. PCT/JP2016/067794.

International Search Report and English translation thereof dated Aug. 30, 2016 in connection with International Application No. PCT/JP2016/067794.

* cited by examiner

REFLECTIVE VOLUME HOLOGRAM
DIFFRACTION GRATING FILM

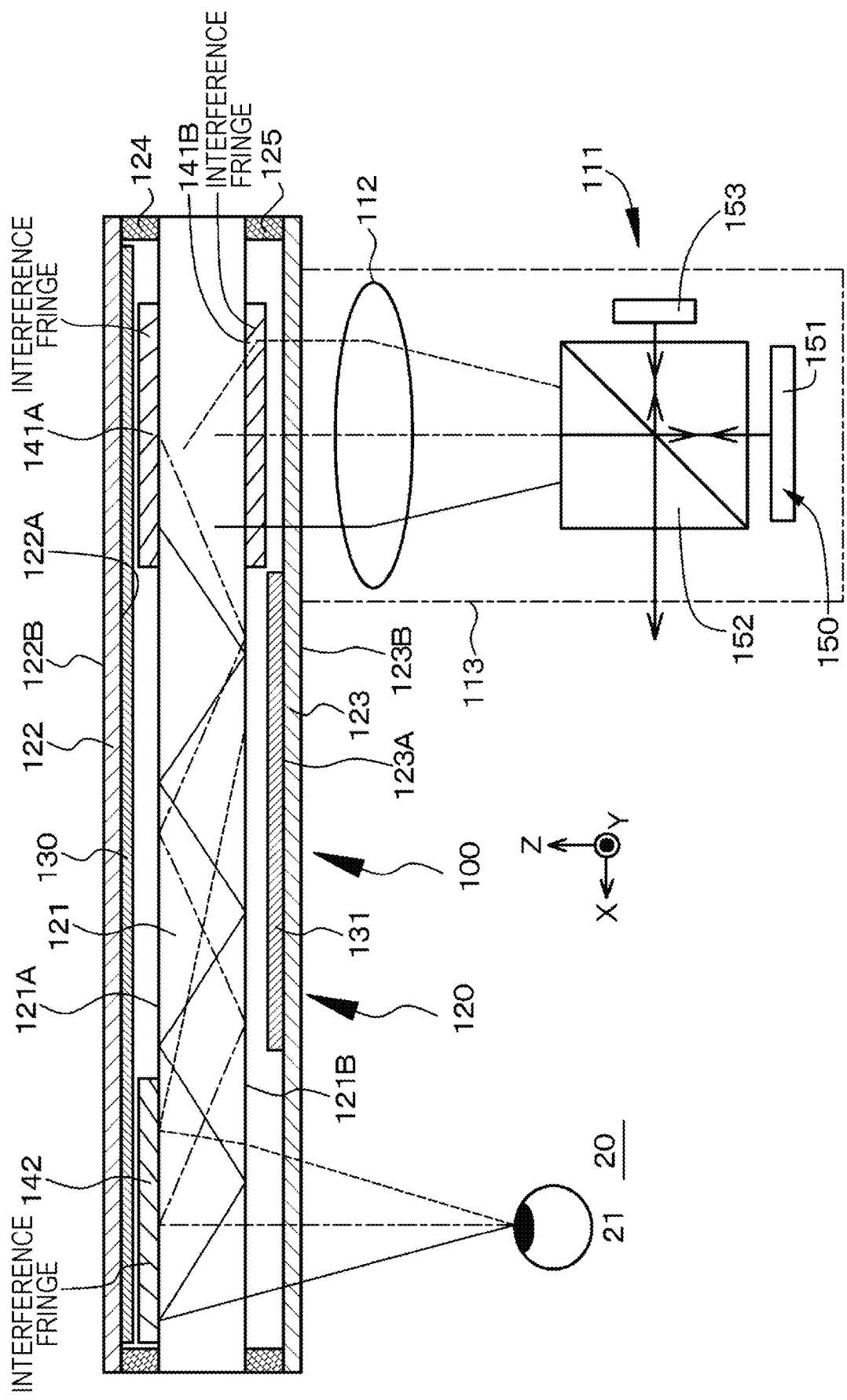

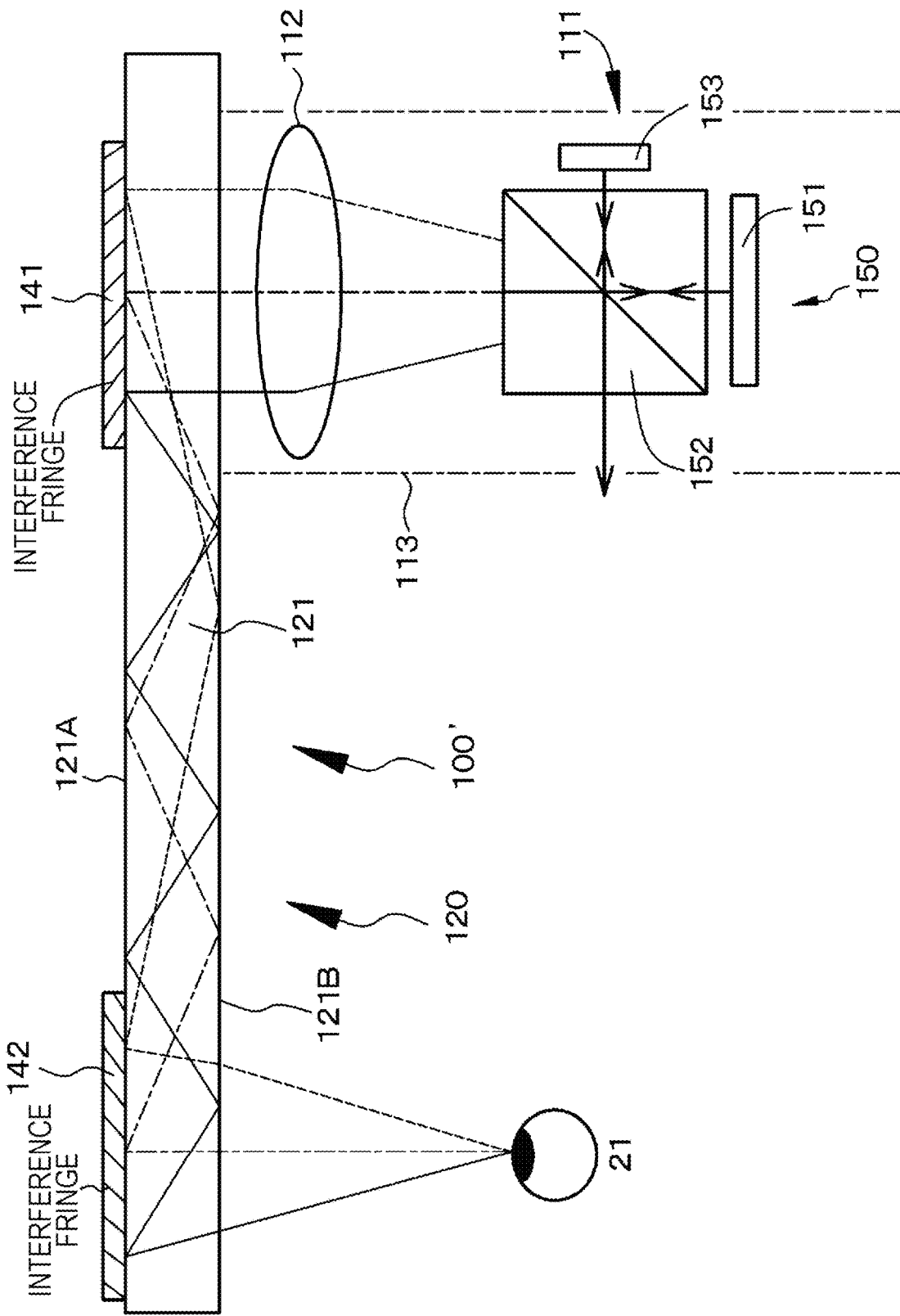

OPTICAL DEVICE, IMAGE DISPLAY DEVICE, AND DISPLAY DEVICE

CROSS-REFERENCE TO RELATED APPLICATIONS

This application claims the benefit under 35 U.S.C. § 371 as a U.S. National Stage Entry of International Application No. PCT/JP2016/067794, filed in the Japanese Patent Office as a Receiving Office on Jun. 15, 2016, which claims priority to Japanese Patent Application Number JP2015-144593, filed in the Japanese Patent Office on Jul. 22, 2015, each of which is hereby incorporated by reference in its entirety.

TECHNICAL FIELD

The present disclosure relates to an optical device, and an image display device including the optical device. Further, the present disclosure relates to a display device including the image display device, and more specifically, relates to a display device used in a head mounted display (HMD).

BACKGROUND ART

Recently, an augmented reality technology (an AR technology) has attracted attention in which a virtual object or various information items are synthesized or presented to an actual environment (or a part of the actual environment) as electronic information as additional information. In order to realize such an augmented reality technology, for example, a head mounted display is considered as a device presenting visual information. Then, in an application field, operation support in an actual environment is expected, and for example, route guidance information can be provided, or technology information with respect to an engineer performing maintenance can be provided. In particular, the head mounted display is extremely convenient since the display can be used without hands. In addition, even in the case of obtaining various information items or the like while moving the outdoors, it is possible to simultaneously capture both of various information items or the like configured of a video or an image and an external environment in a visual range, and thus, smooth movement can be performed.

In order for an observer to observe a two-dimensional image formed by an image forming device by a virtual image optical system as an enlarged virtual image, a virtual image display device (a display device) using a deflection unit including a hologram diffraction grating, for example, is known from Japanese Patent Application Laid-Open No. 2007-094175.

As a conceptual diagram is illustrated in FIG. 31, basically, an image display device 100' includes an image forming device 111 which displays an image, a collimation optical system 112, and an optical device 120 in which light displayed on the image forming device 111 is incident and is guided to a pupil 21 of the observer. Here, the optical device 120 includes a light guide plate (a first substrate) 121, and a deflection unit which is disposed on the light guide plate 121. Specifically, the deflection unit is configured of a first diffraction grating member 141 and a second diffraction grating member 142 which include a reflective volume hologram diffraction grating film. Then, light exiting from each pixel of the image forming device 111 is incident on the collimation optical system 112, and a plurality of parallel light rays having different incident angles with respect to the light guide plate 121 are generated by the collimation optical system 112, and are incident on the light guide plate 121. The parallel light is incident from a second surface 121B of the light guide plate 121, and exits. On the other hand, the first diffraction grating member 141 and the second diffraction grating member 142 are attached onto a first surface 121A of the light guide plate 121, which is parallel to the second surface 121B of the light guide plate 121. Furthermore, for reference numerals representing other constituents in FIG. 31, refer to an image display device of Example 1 described with reference to FIG. 1. Then, in the image display device 100', a virtual image is formed on the basis of the image, and thus, the observer is capable of observing the external image and the formed virtual image in a superimposed manner.

However, in the case of using the display device in the head mounted display, a reduction in weight is an extremely important factor. Therefore, as described in Japanese Patent Application Laid-Open No. 2007-094175, it is general that the deflection unit is configured of the hologram diffraction grating film which includes a photopolymer material.

CITATION LIST

Patent Document

Patent Document 1: Japanese Patent Application Laid-Open No. 2007-094175
Patent Document 2: Japanese Patent Application Laid-Open No. 2002-107658

SUMMARY OF THE INVENTION

Problems to be Solved by the Invention

However, in the case of configuring the deflection unit with a photopolymer material, the deflection unit may swell due to moisture absorption of the photopolymer material, and as a result thereof, a change in the characteristics of the deflection unit, for example, a pitch of an interference fringe and an inclined angle (a slant angle) of the interference fringe are changed. Specifically, for example, a desired reproducing center wavelength (a diffraction center wavelength) and a bandwidth thereof are changed from a design value. The influence of the moisture on optical characteristics of the deflection unit is considerable. A technology of storing the deflection unit in a space including a box and a transparent cover, for example, is known from Japanese Patent Application Laid-Open No. 2002-107658. However, even in the case of storing the deflection unit in such space, it is difficult to sufficiently suppress the influence of the moisture on the optical characteristics of the deflection unit.

Accordingly, an object of the present disclosure is to provide an optical device having a configuration and a structure in which the influence of the moisture on the optical characteristics of the deflection unit can be sufficiently suppressed, an image display device including the optical device, and a display device including the image display device.

Solutions to Problems

An optical device of the present disclosure to achieve the object, includes:
a first substrate which includes a first surface, and a second surface facing the first surface;
a second substrate which includes a first surface, and a second surface facing the first surface, the first surface being disposed to face the first surface of the first substrate;

a deflection unit which is disposed on the first surface of the first substrate;

a sealing member which seals an outer edge portion of the first surface of the first substrate and an outer edge portion of the first surface of the second substrate; and a moisture absorption member which is disposed in a space surrounded by the first substrate, the second substrate, and the sealing member.

An image display device of the present disclosure in order to attain the object described above, including: (A) an image forming device; and (B) an optical device in which light exiting from the image forming device is incident and exits, in which the optical device is configured of the optical device of the present disclosure described above.

A display device of the present disclosure in order to attain the object described above, including: (a) a frame which is mounted on a head portion of an observer; and (b) an image display device which is attached to the frame, in which the image display device includes (A) an image forming device, and (B) an optical device in which light exiting from the image forming device is incident and exits, and the optical device is configured of the optical device of the present disclosure described above.

Effects of the Invention

In the optical device of the present disclosure, the optical device configuring the image display device of the present disclosure, and the optical device configuring the display device of the present disclosure (hereinafter, such optical devices will be collectively referred to as the "optical device or the like of the present disclosure"), the moisture absorption member is disposed in the space surrounded by the first substrate, the second substrate, and the sealing member. Therefore, in the optical device or the like of the present disclosure, it is possible to sufficiently suppress the influence of the moisture on the optical characteristics of the deflection unit. Furthermore, the effect described herein is merely an example, and is not limited thereto, and an additional effect may be obtained.

Figure 2:
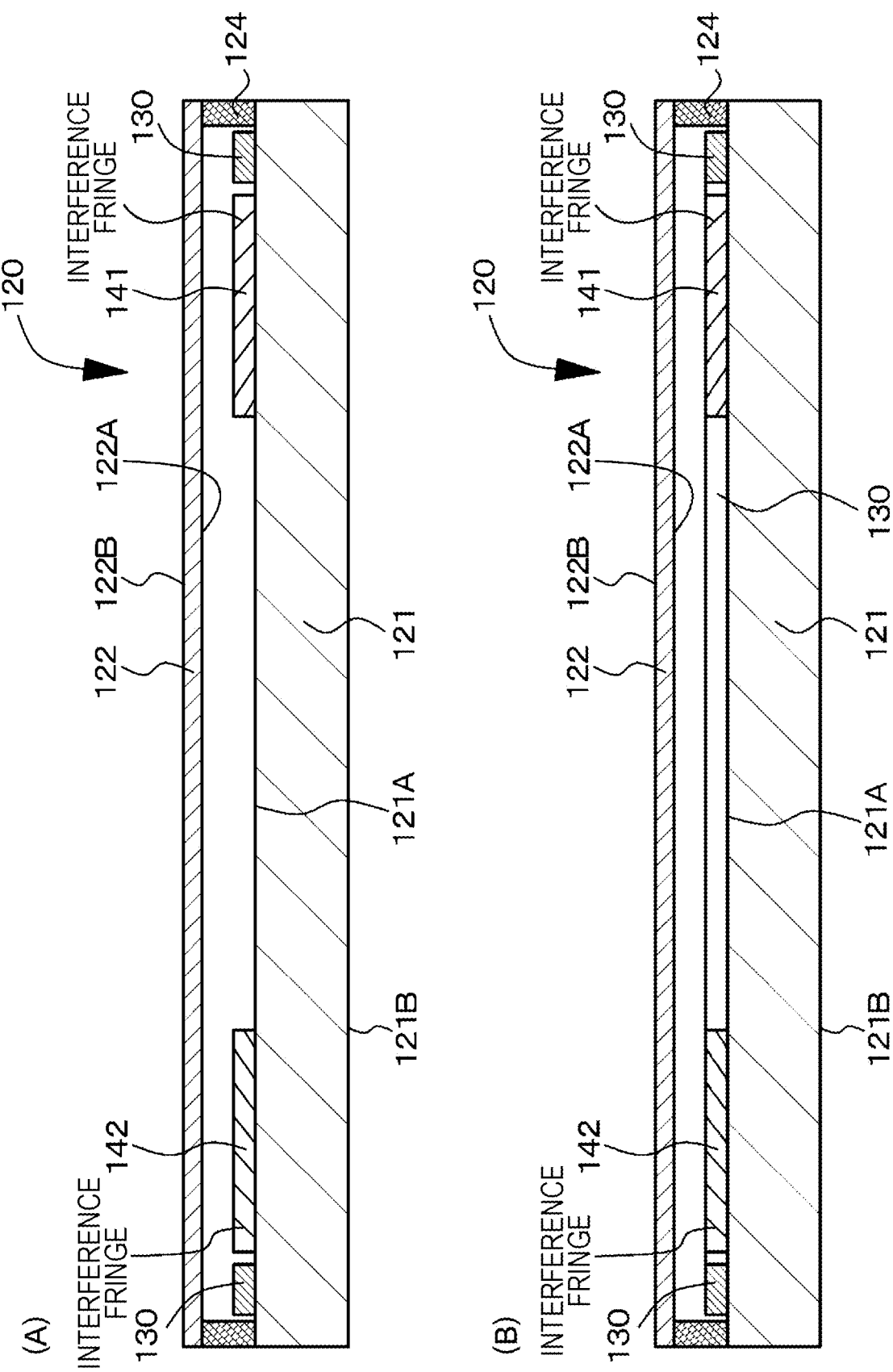

(A) and (B) of FIG. 2 are conceptual diagrams of a modification example of the optical device of the display device of Example 1.

Figure 3:
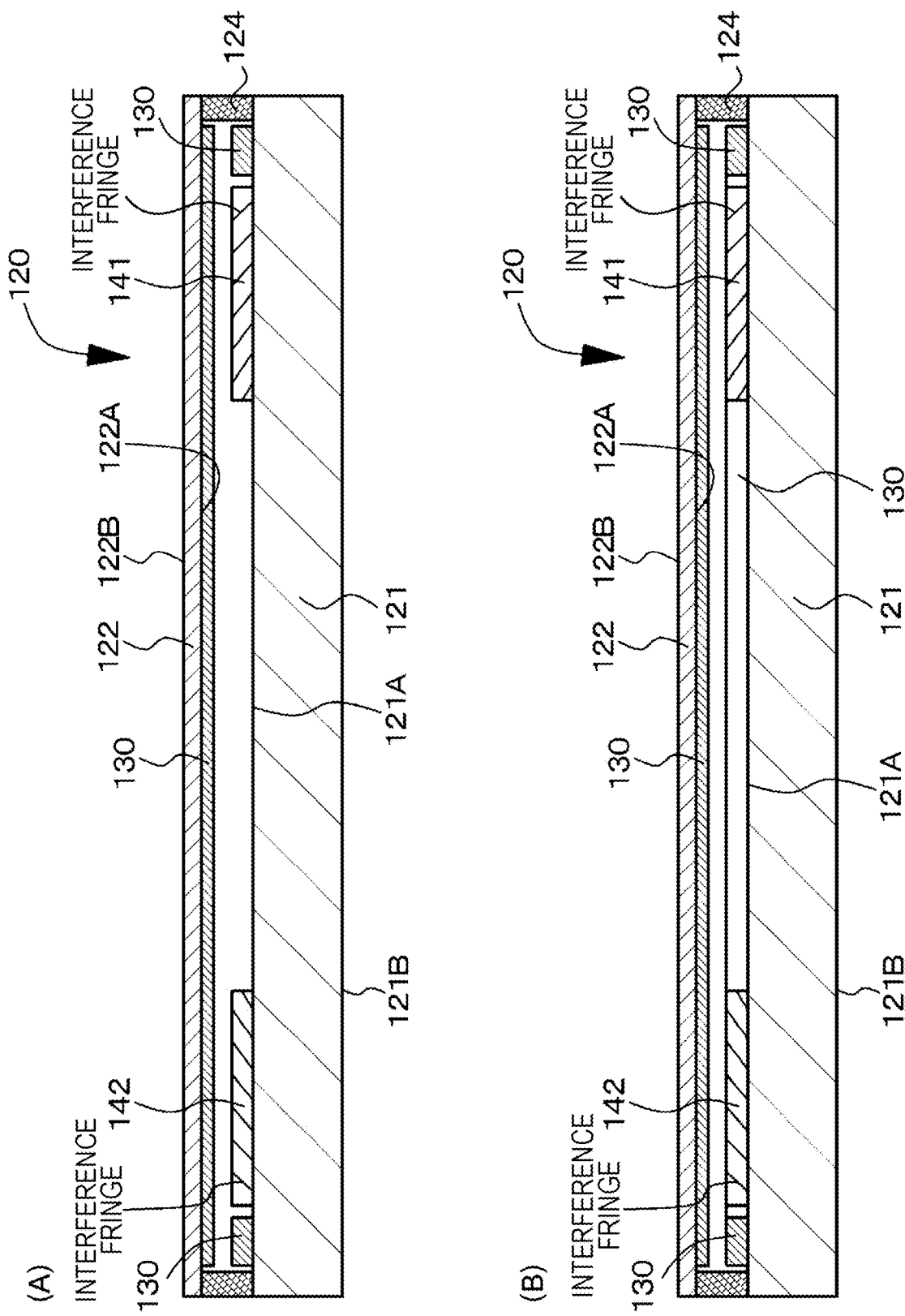

(A) and (B) of FIG. 3 are conceptual diagrams of another modification example of the optical device of the display device of Example 1.

Figure 4:
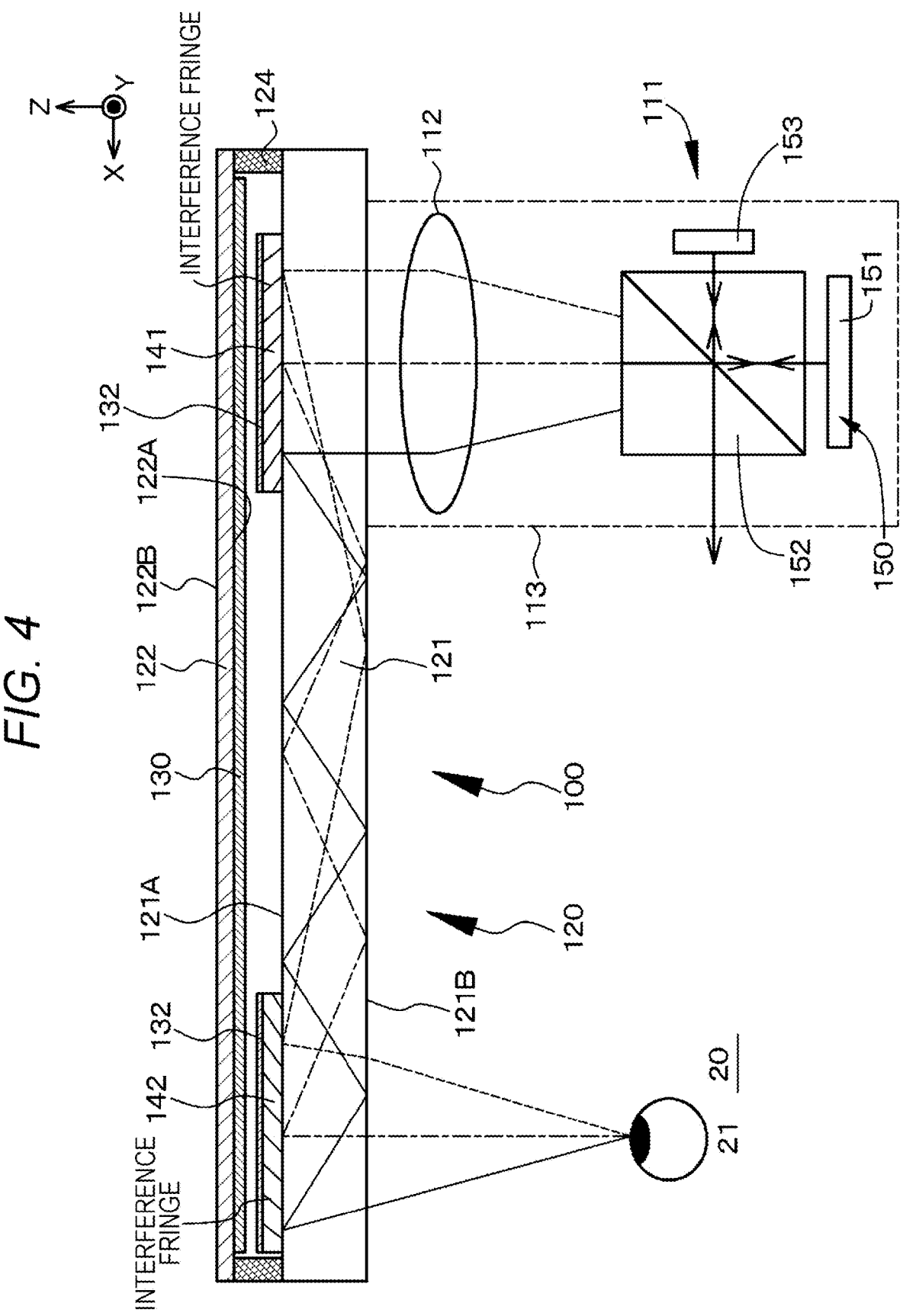

FIG. 4 is a conceptual diagram of still another modification example of the image display device of the display device of Example 1.

Figure 5:
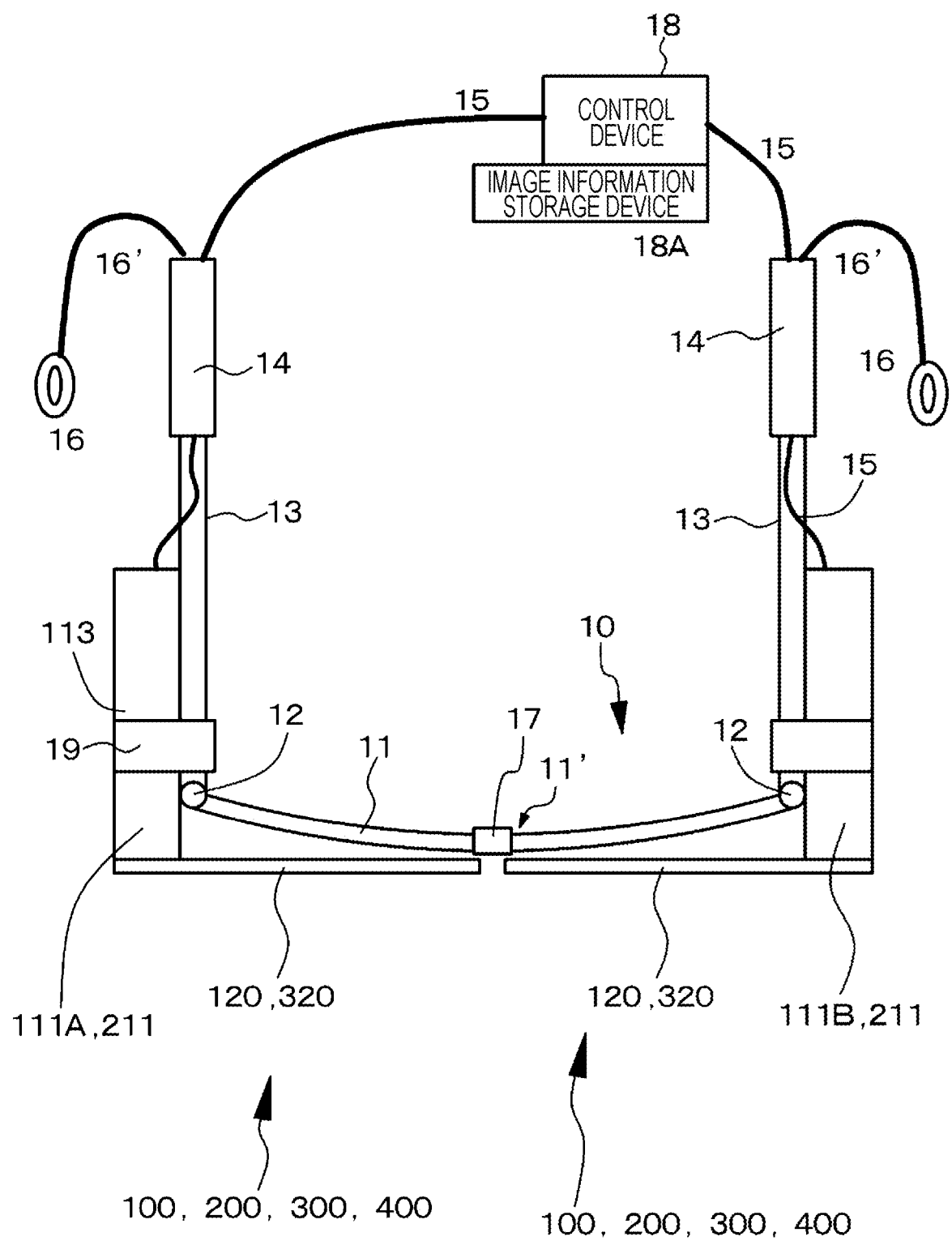

FIG. 5 is a schematic view of the display device of Example 1 as seen from the above.

Figure 6A:
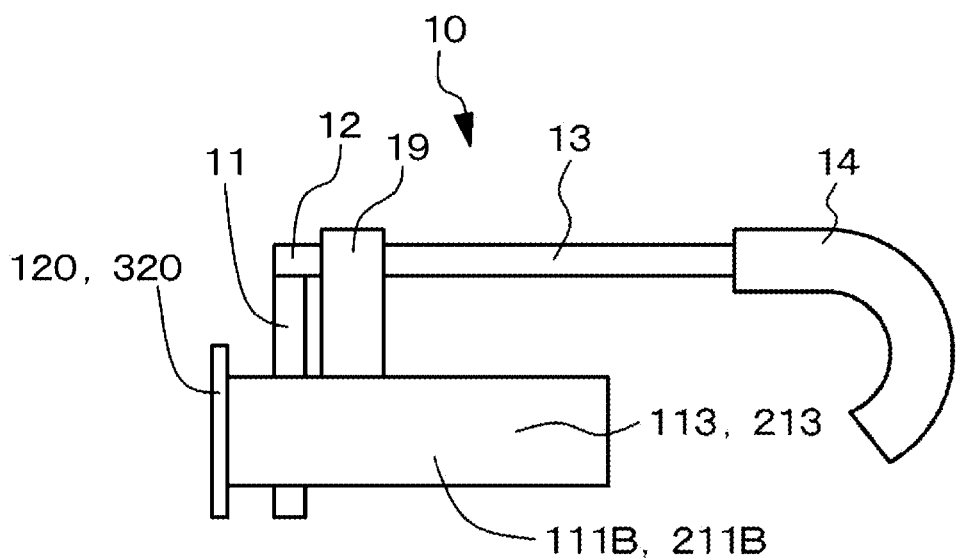
Figure 6B:
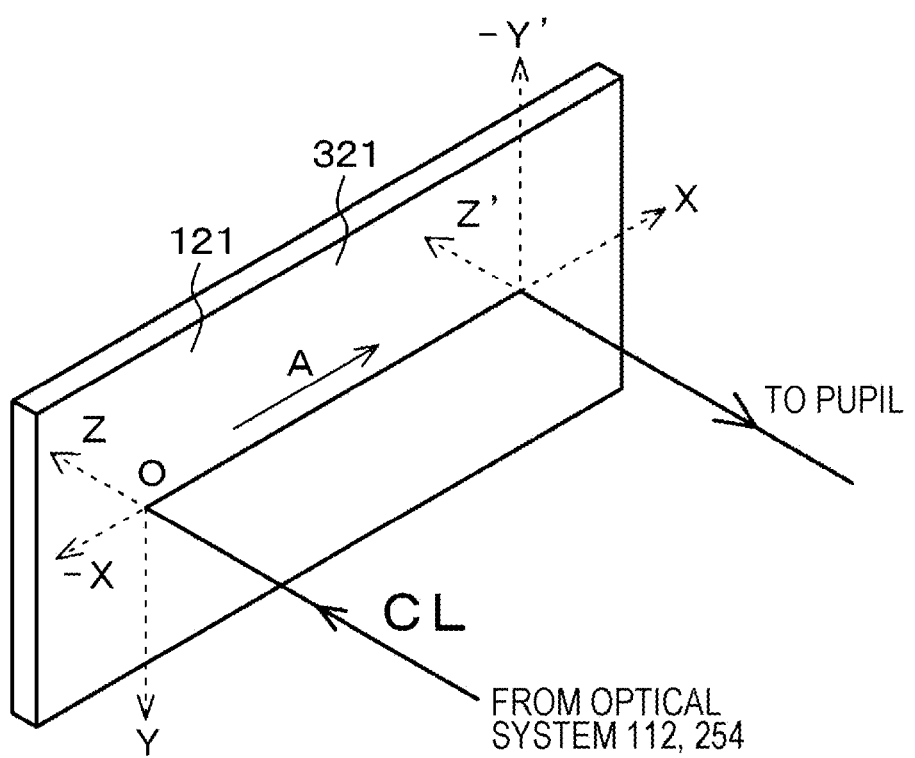

FIG. 6A and FIG. 6B are a schematic view of the display device of Example 1 as seen from the side, and a diagram schematically illustrating a propagation state of light in a first substrate configuring the image display device, respectively.

Figure 7:
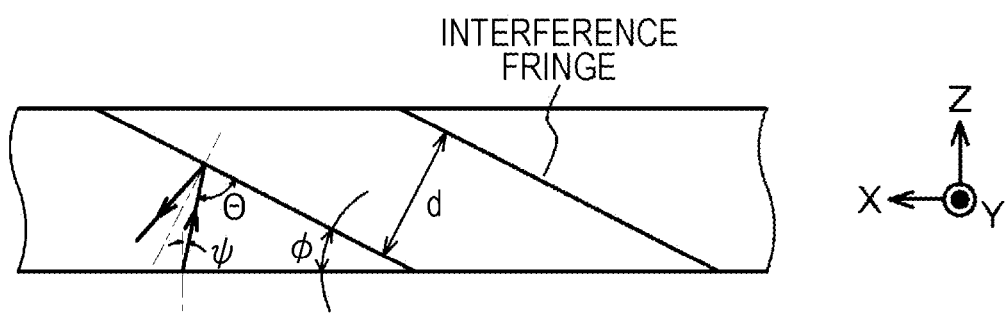

FIG. 7 is a schematic sectional view illustrating a part of a reflective volume hologram diffraction grating film of the display device of Example 1 in an enlarged manner.

Figure 8:
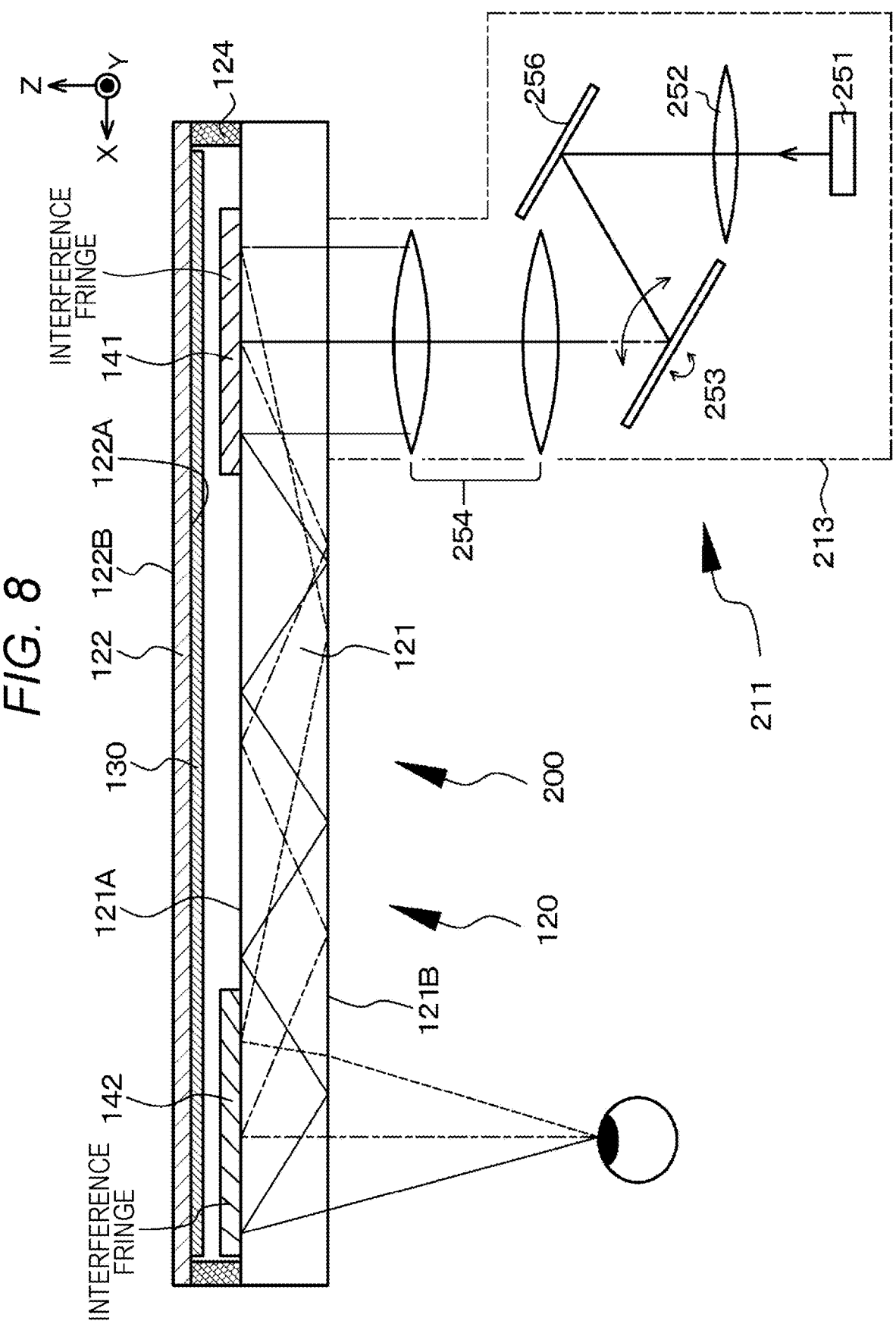

FIG. 8 is a conceptual diagram of an image display device of a display device of Example 2.

Figure 9:
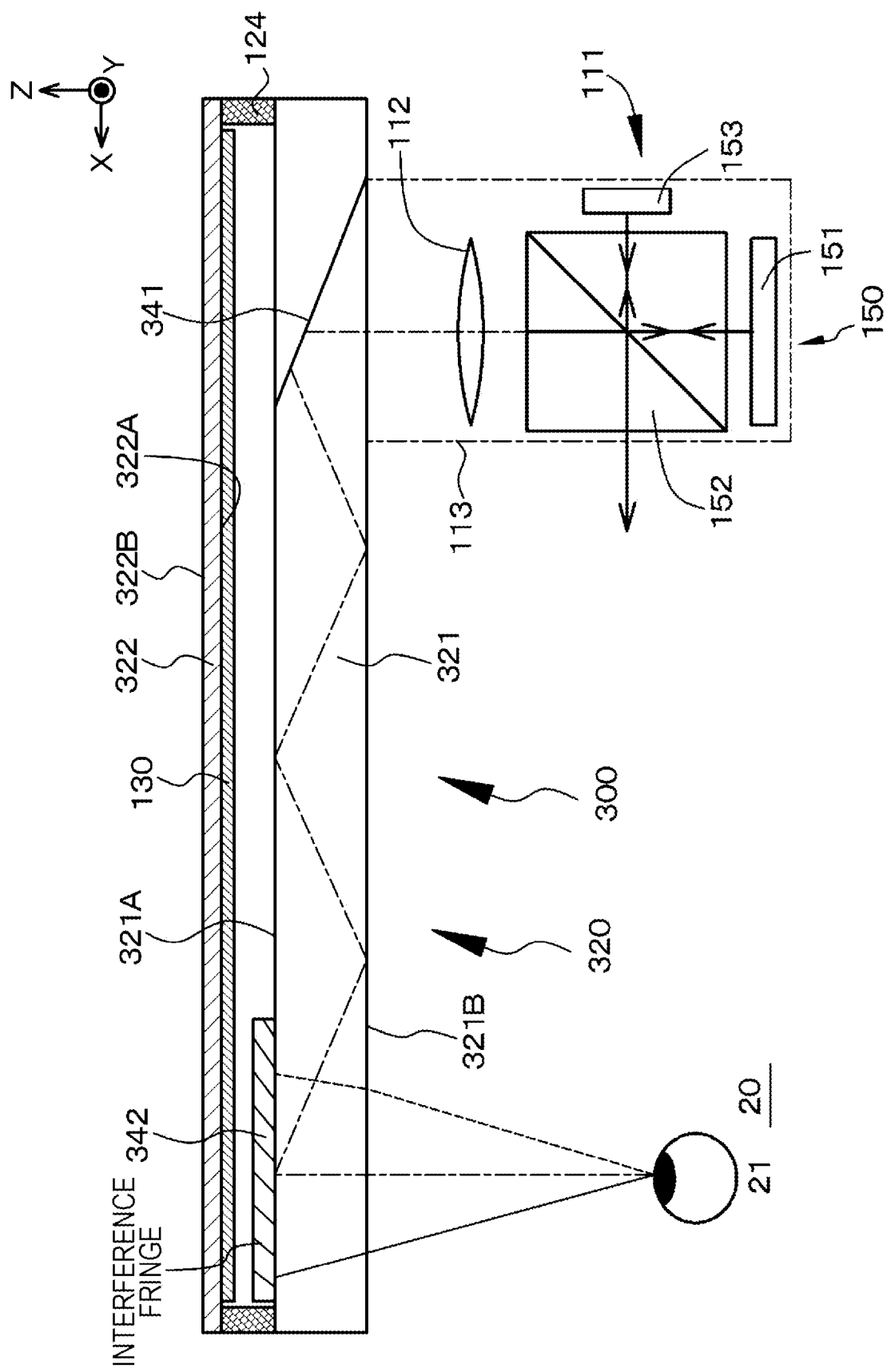

FIG. 9 is a conceptual diagram of an image display device of a display device of Example 3.

Figure 10:
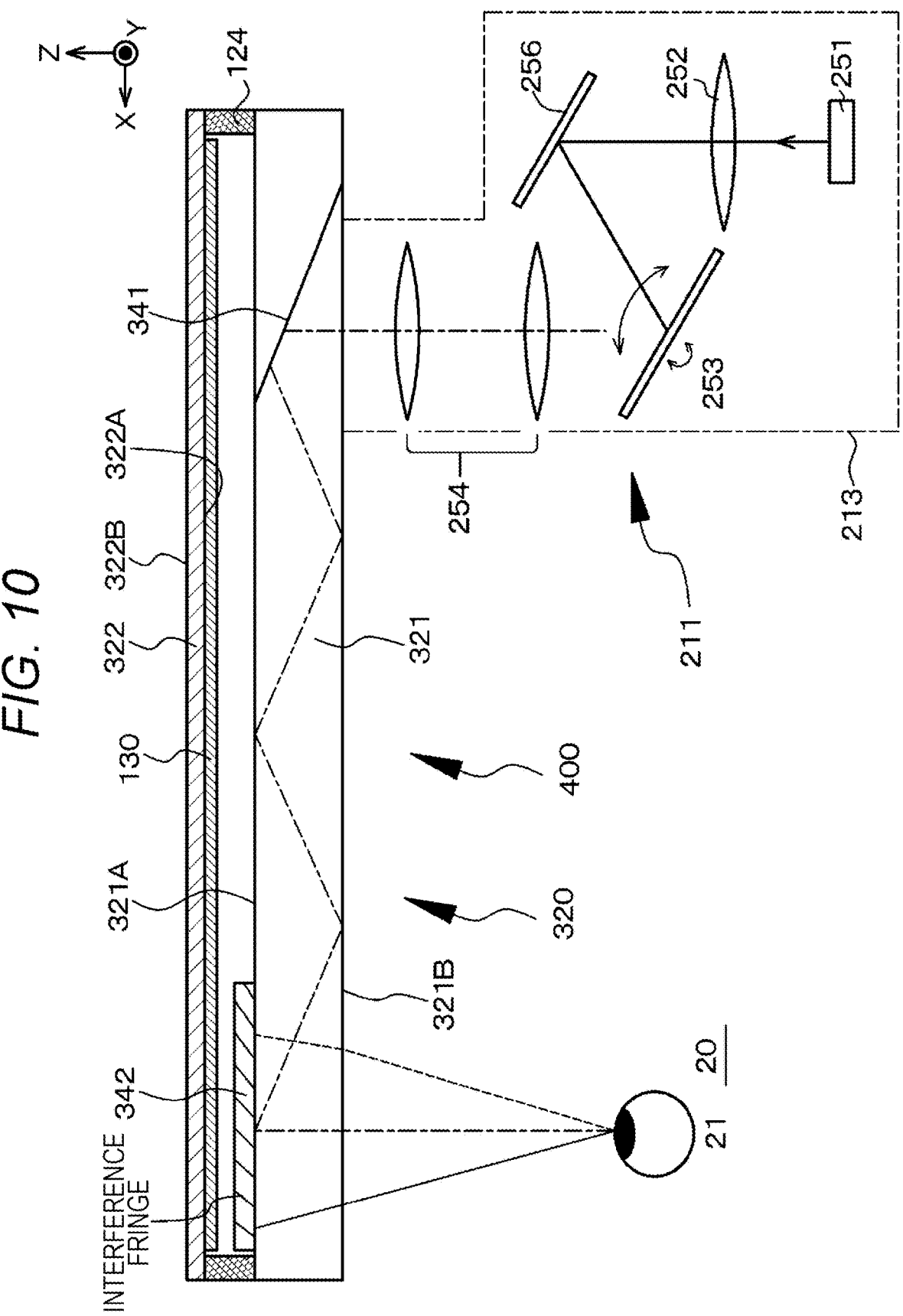

FIG. 10 is a conceptual diagram of an image display device of a display device of Example 4.

Figure 11:
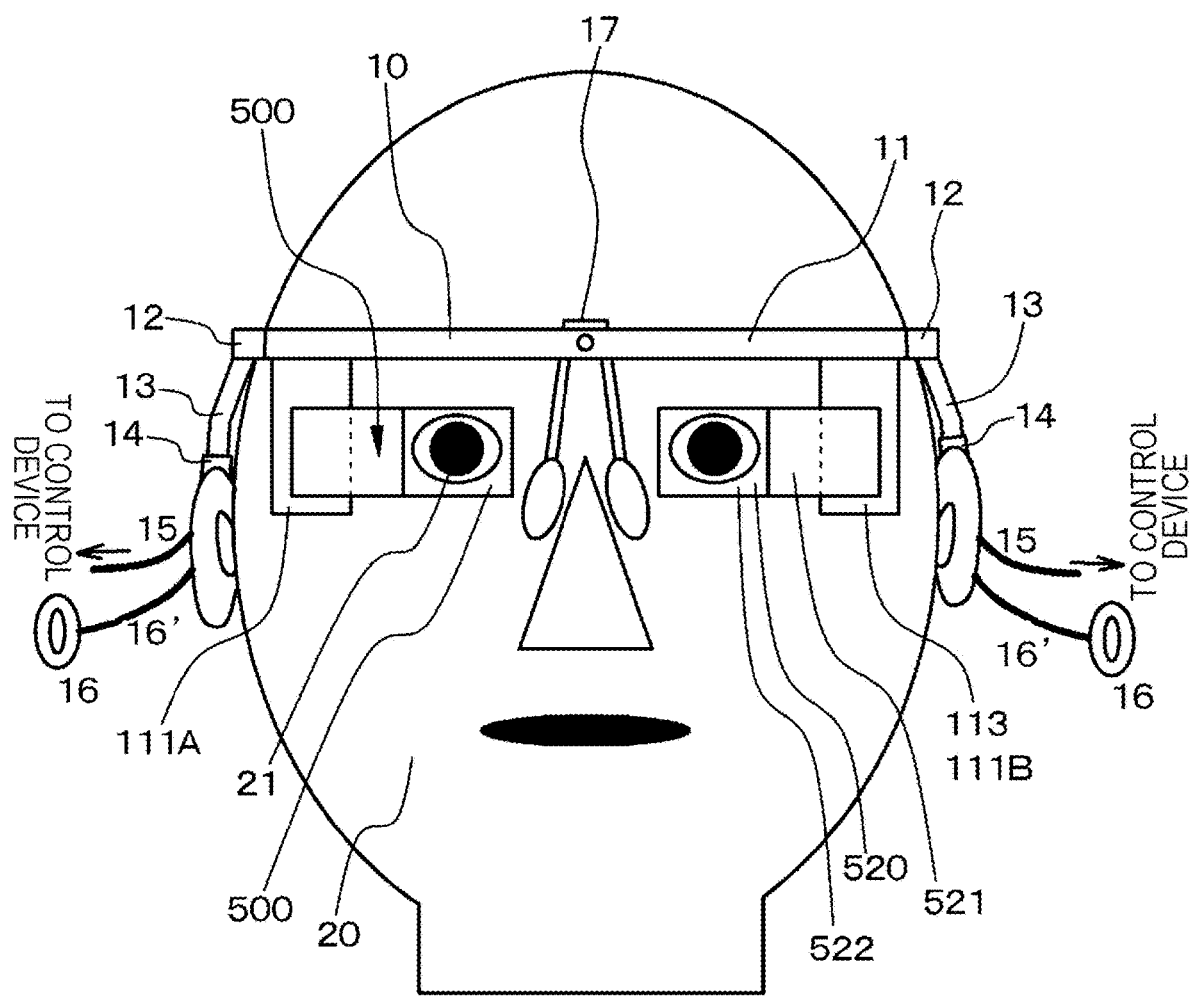

FIG. 11 is a schematic view of a display device of Example 5 as seen from the front.

Figure 12:
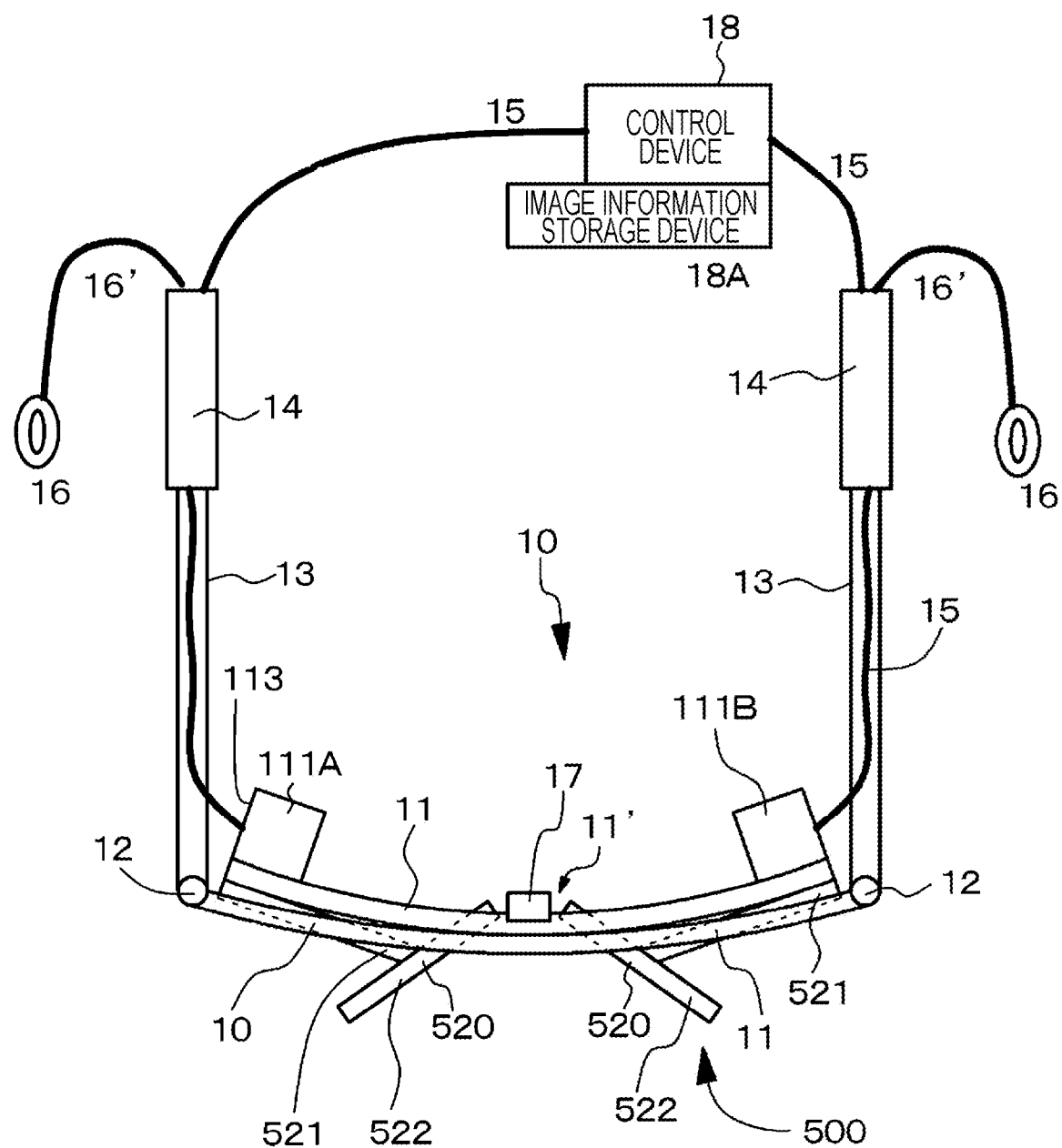

FIG. 12 is a schematic view of the display device of Example 5 as seen from the above.

Figure 13:
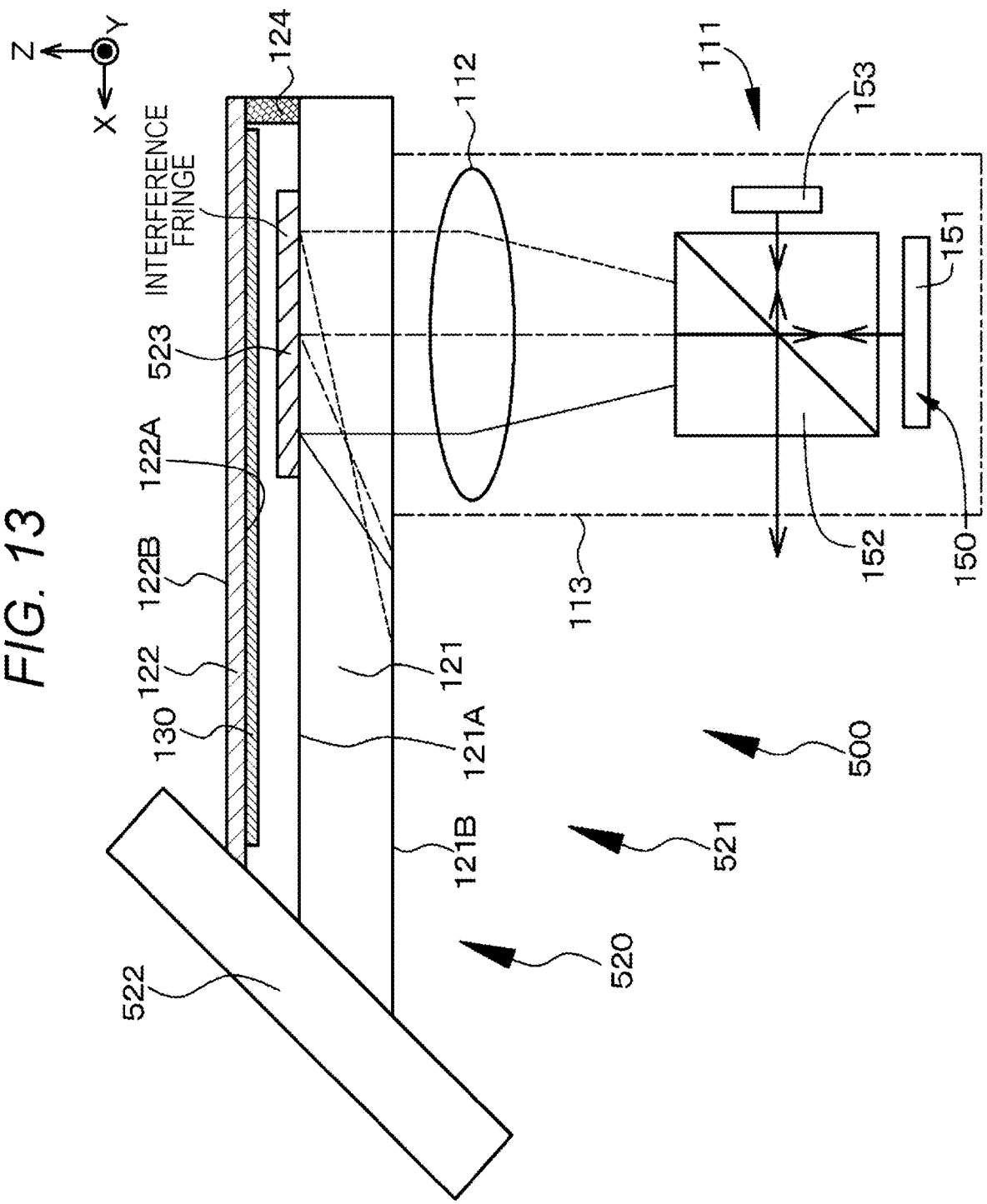

FIG. 13 is a conceptual diagram of an image display device of the display device of Example 5.

Figure 14:
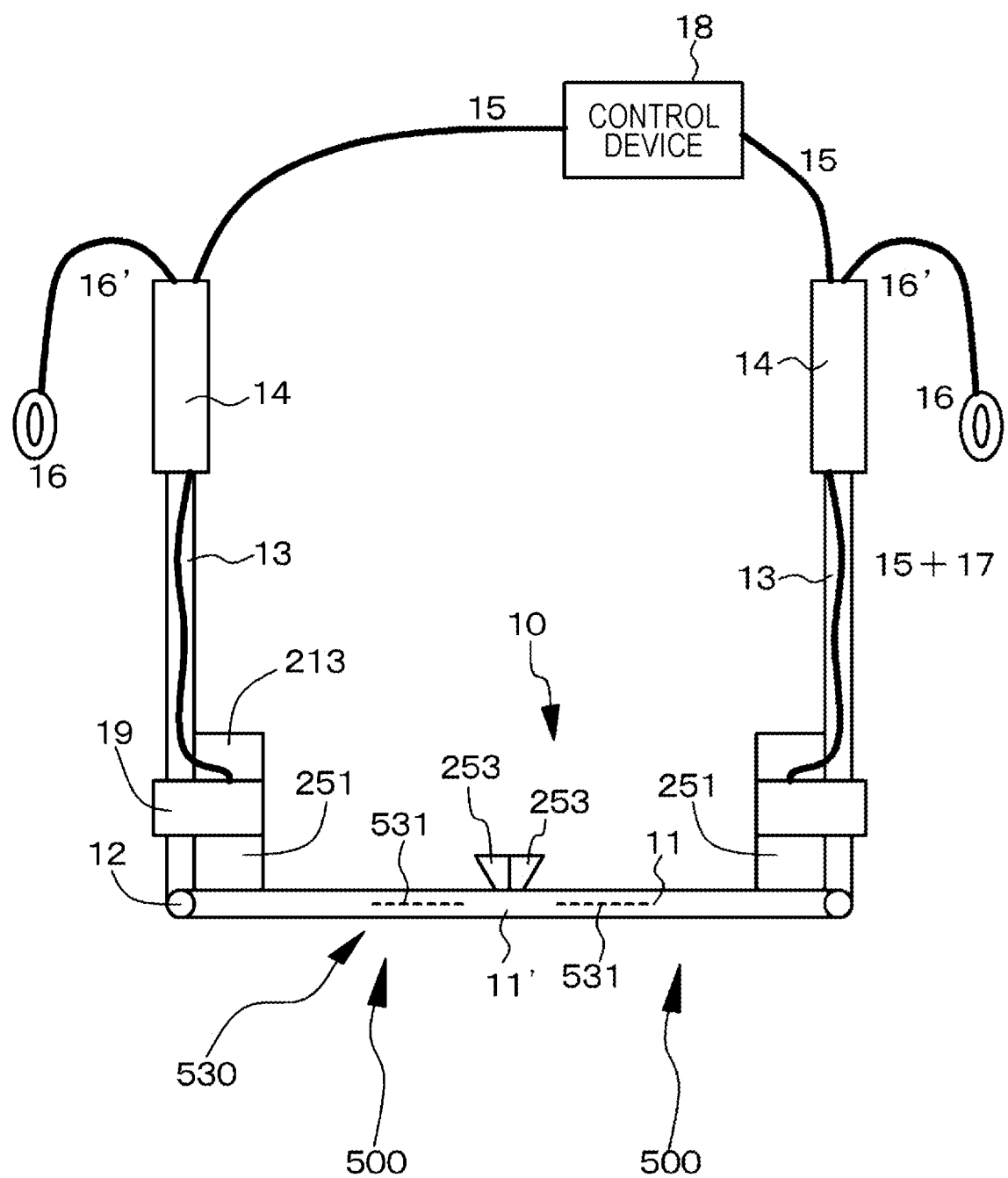

FIG. 14 is a schematic view of a display device of Example 6 as seen from the above.

Figure 15:
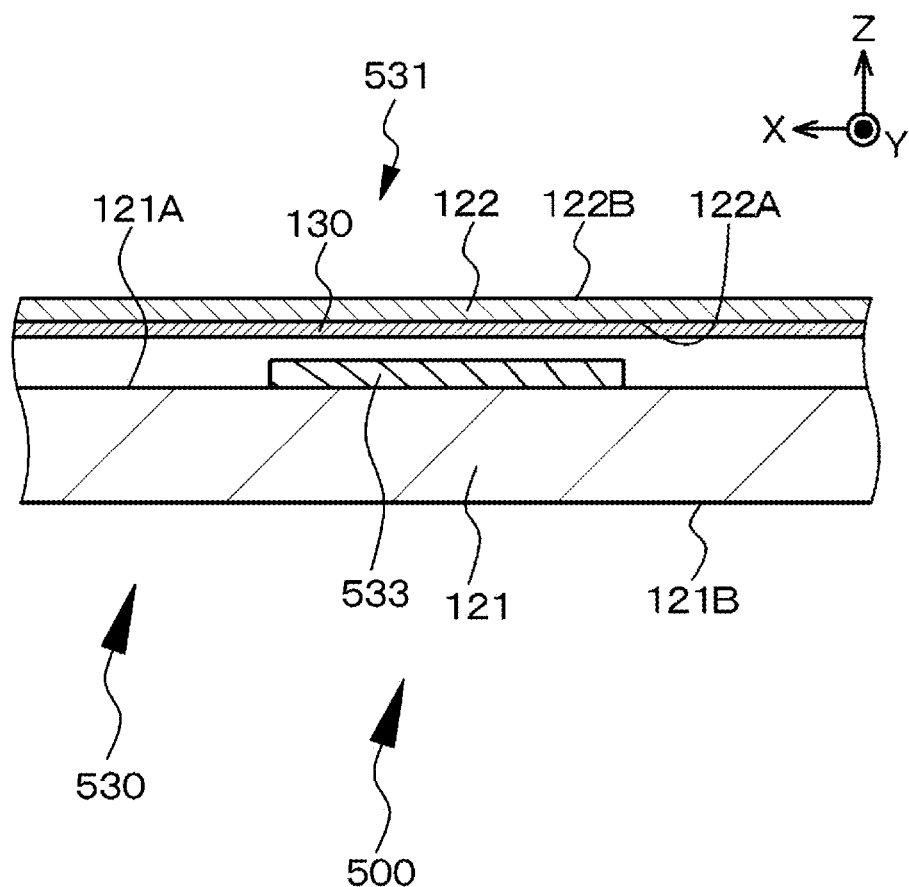

FIG. 15 is a conceptual diagram of a part of an optical device of the display device of Example 6.

Figure 16:
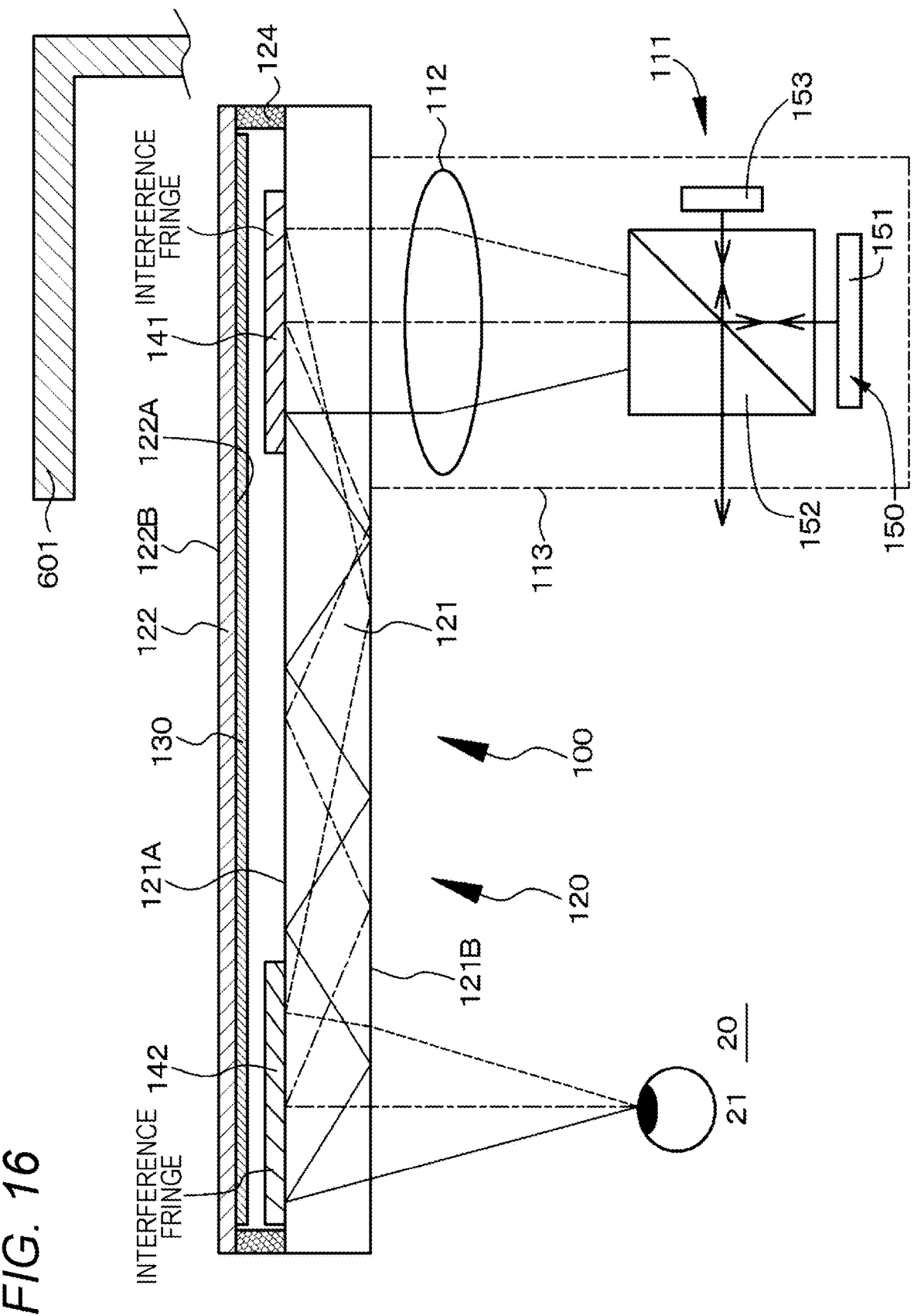

FIG. 16 is a conceptual diagram of an image display device of a display device of Example 7.

Figure 17:
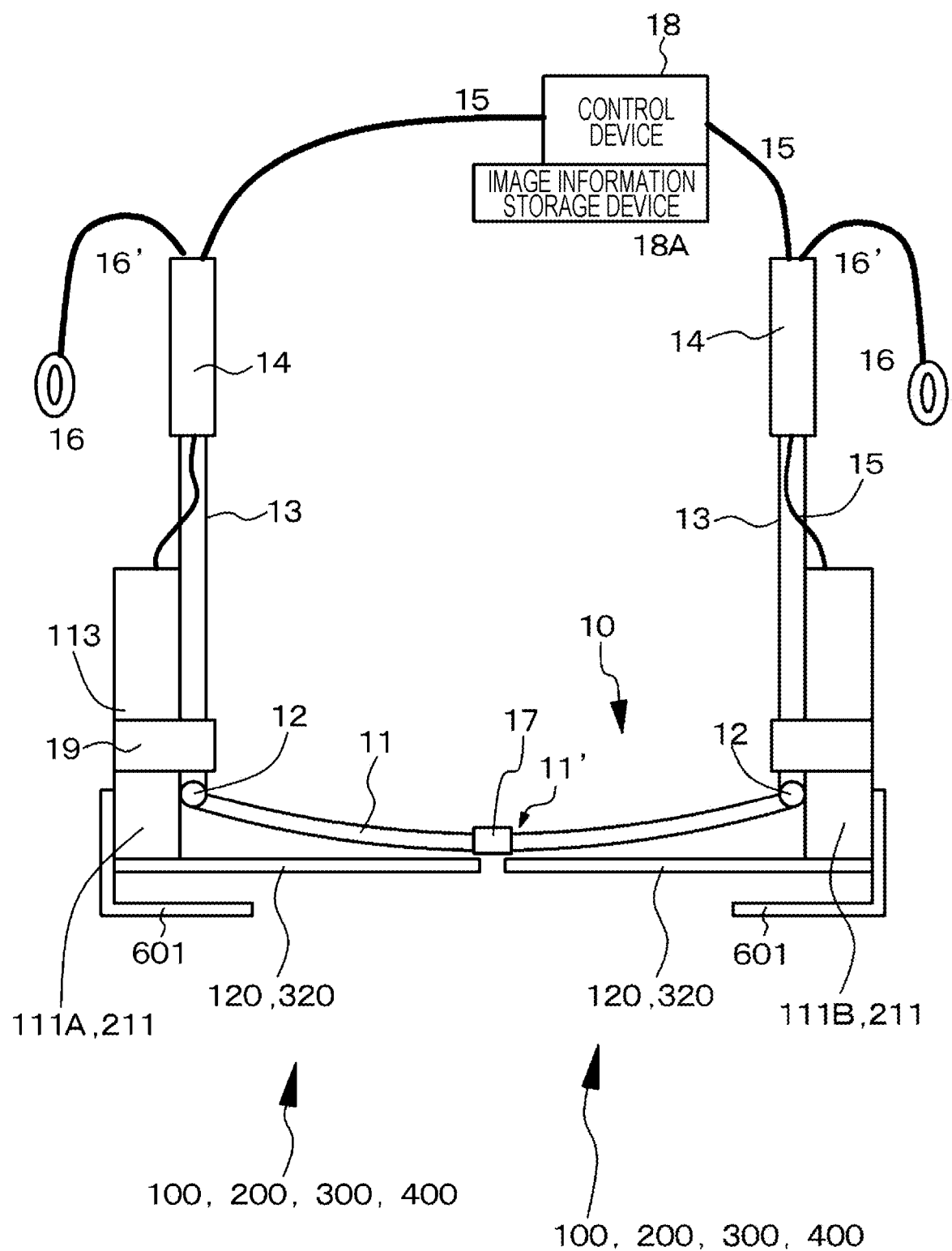

FIG. 17 is a schematic view of the display device of Example 7 as seen from the above.

Figure 18:
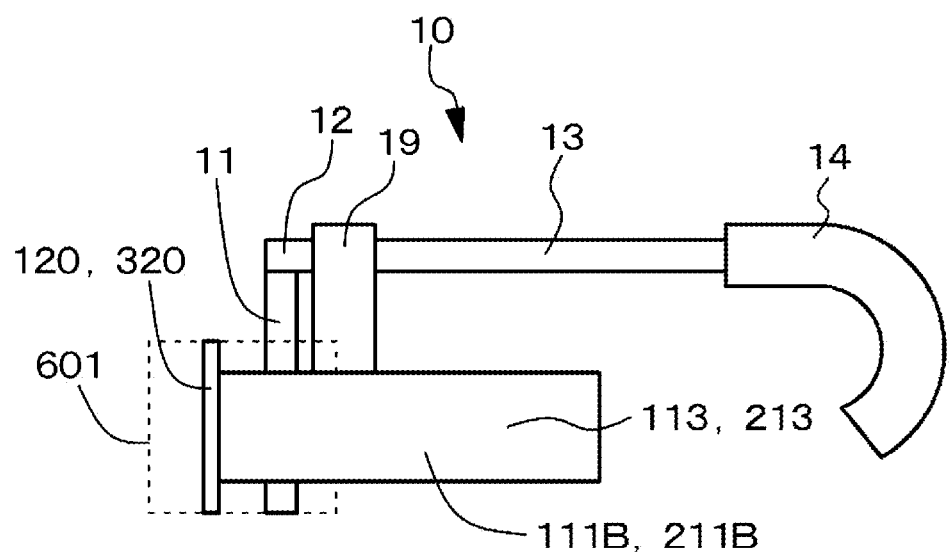

FIG. 18 is a schematic view of the display device of Example 7 as seen from the side.

Figure 19:
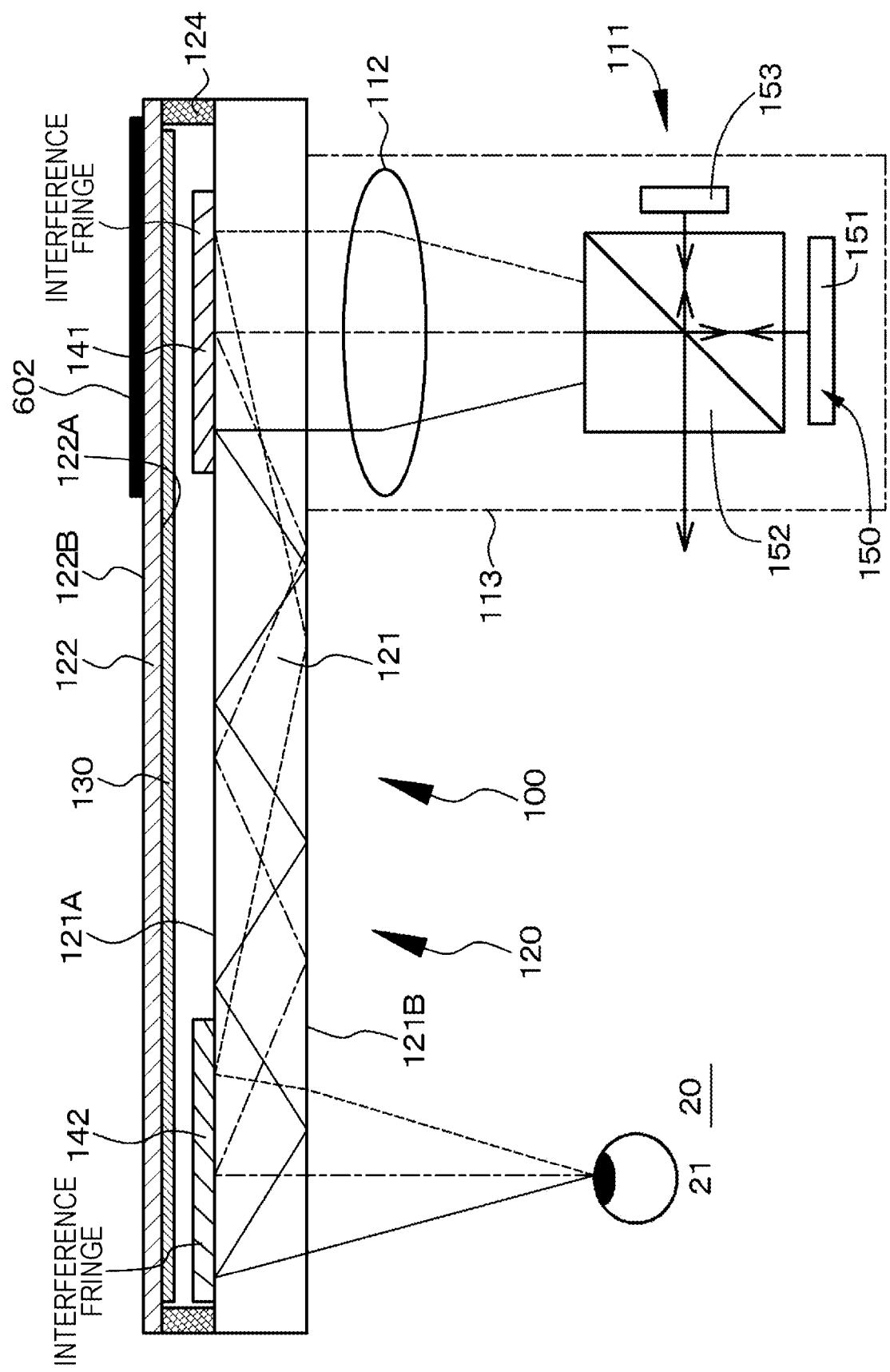

FIG. 19 is a conceptual diagram of a modification example of the image display device of the display device of Example 7.

Figure 20:
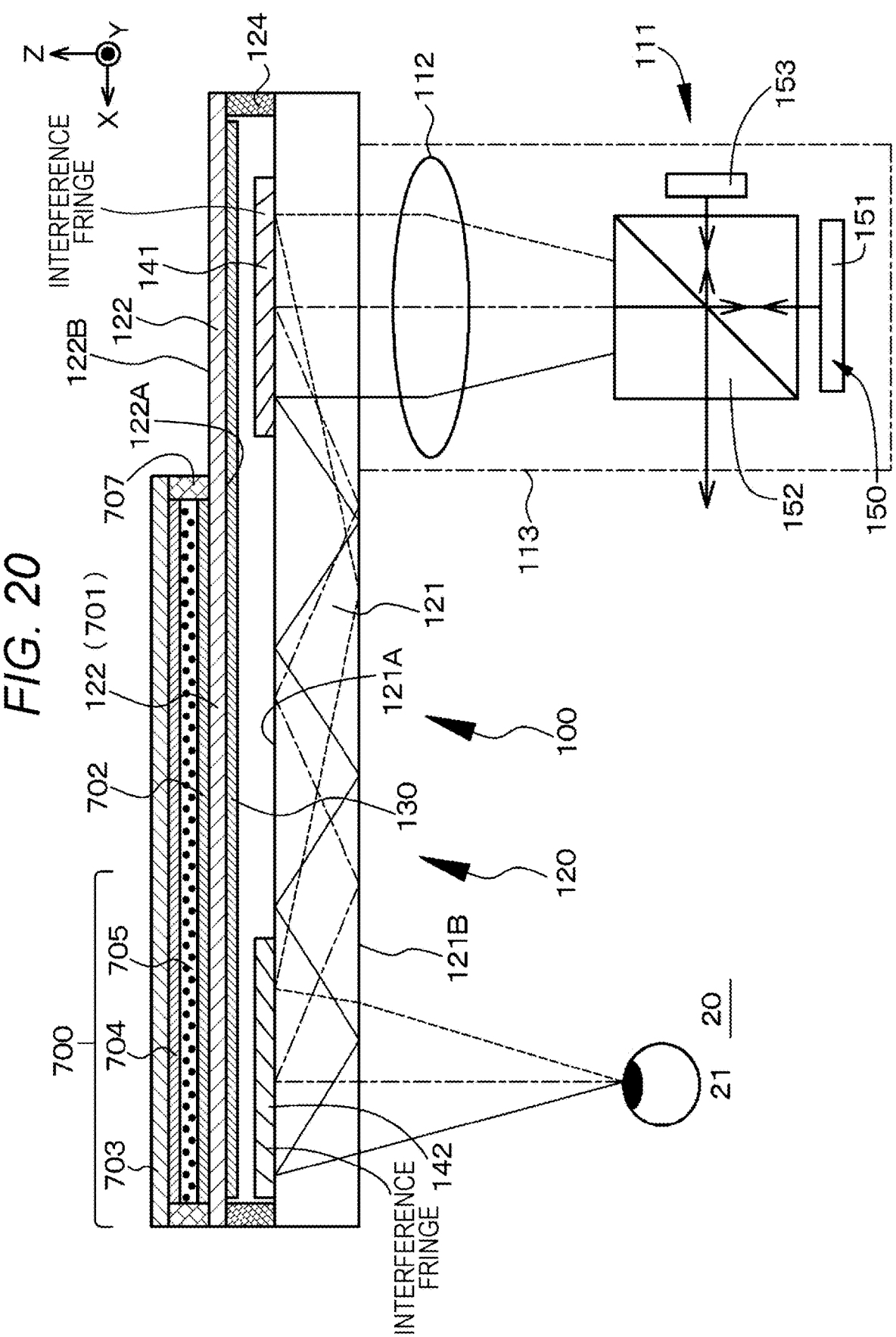

FIG. 20 is a conceptual diagram of an image display device of a display device of Example 8.

Figure 21:
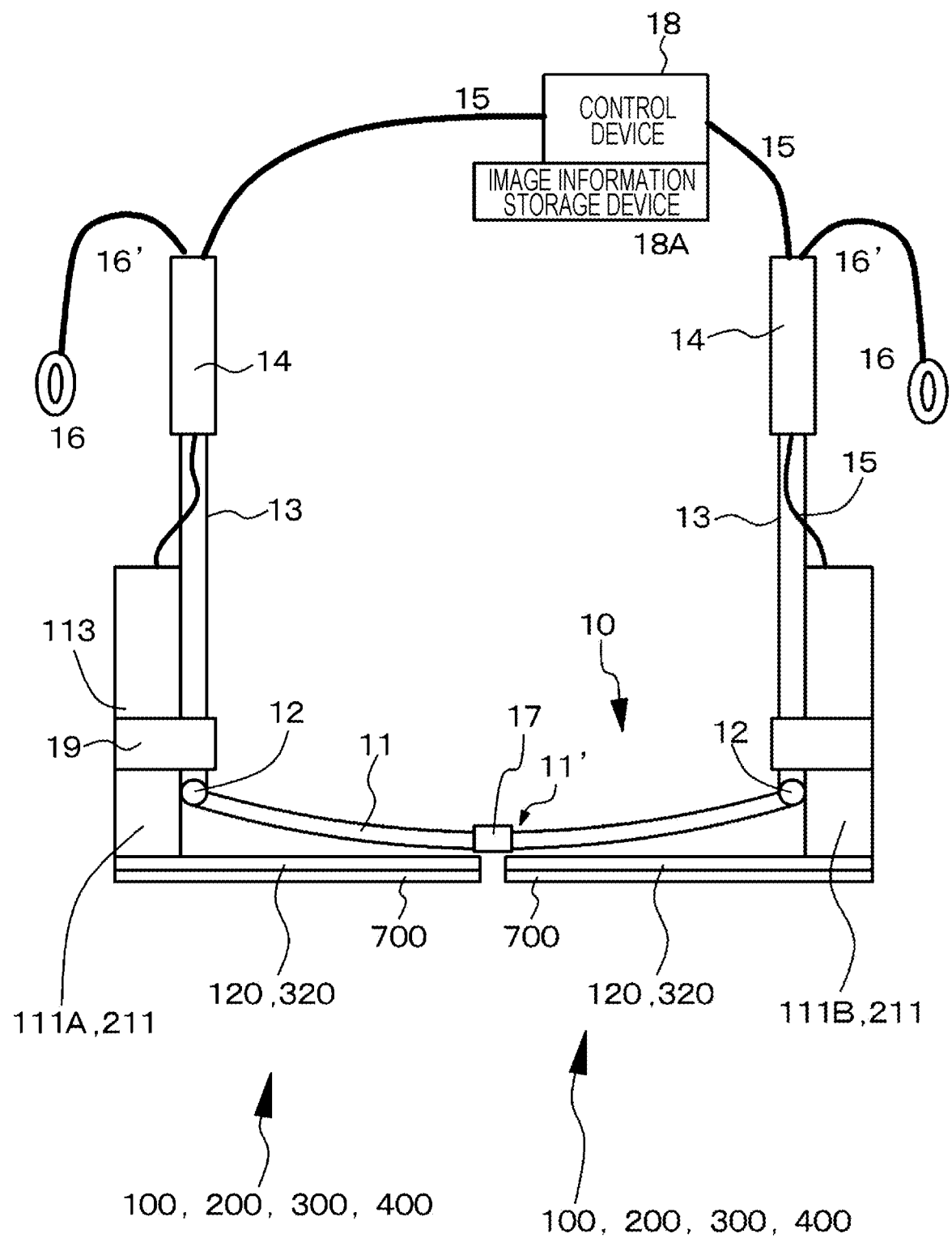

FIG. 21 is a schematic view of the display device of Example 8 as seen from the above.

Figure 22A:
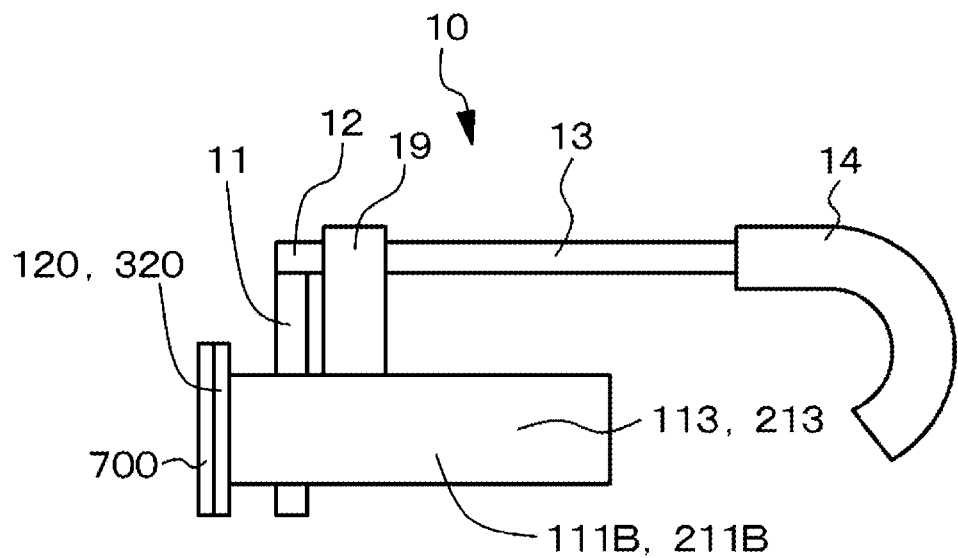
Figure 22B:
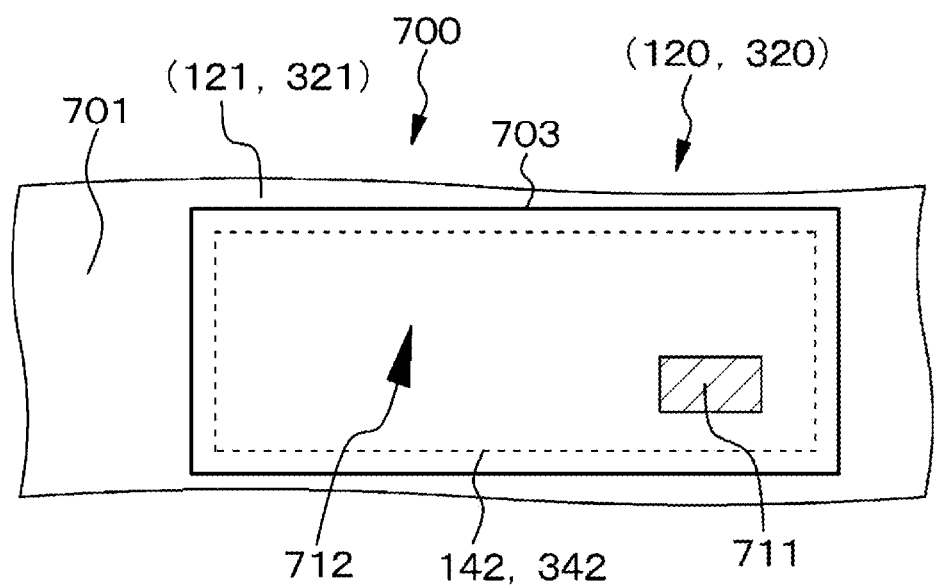

FIG. 22A and FIG. 22B are a schematic view of the display device of Example 8 as seen from the side, and a schematic view of a portion of an optical device and a dimming device of the display device of Example 8 as seen from the front, respectively.

Figure 23A:
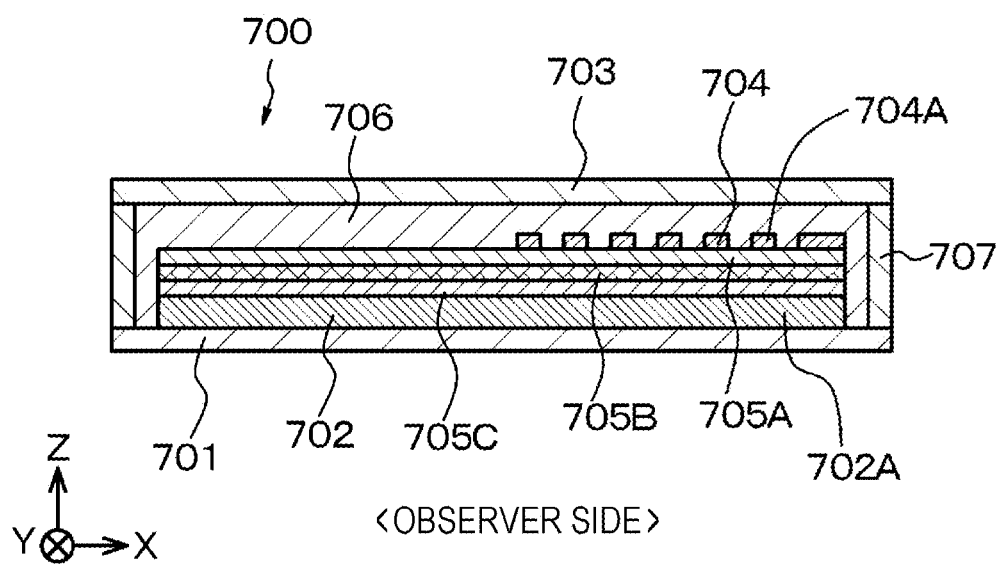
Figure 23B:
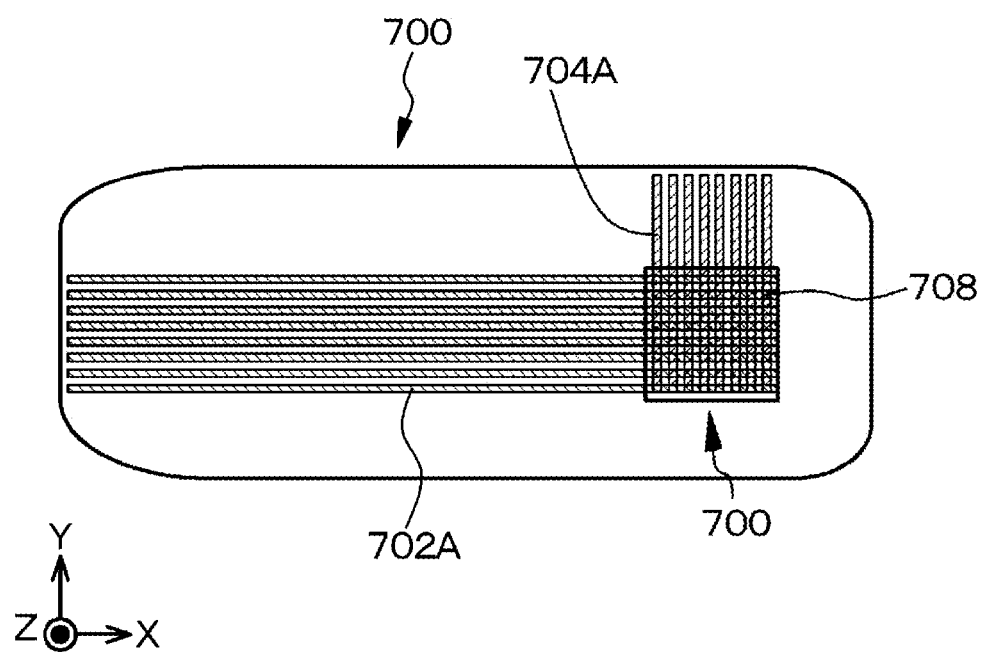

FIG. 23A and FIG. 23B are a schematic sectional view of the dimming device of the display device of Example 8, and a schematic front view of the dimming device.

Figure 24:

FIG. 24 is a diagram illustrating the outside world seen by an observer.

Figure 25A:
Figure 25B:

FIG. 25A and FIG. 25B are diagrams illustrating a state in which the dimming device is controlled such that a light shielding rate of a virtual image projection region of the dimming device, which includes a projection image of a virtual image with respect to the dimming device, is higher than a light shielding rate of the other region of the dimming device.

Figure 26A:
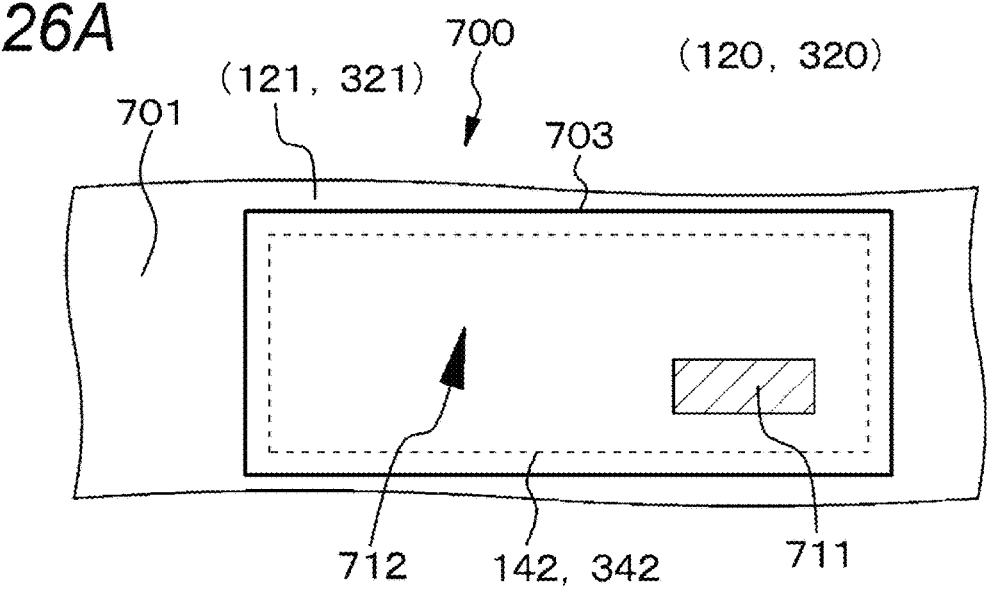
Figure 26B:
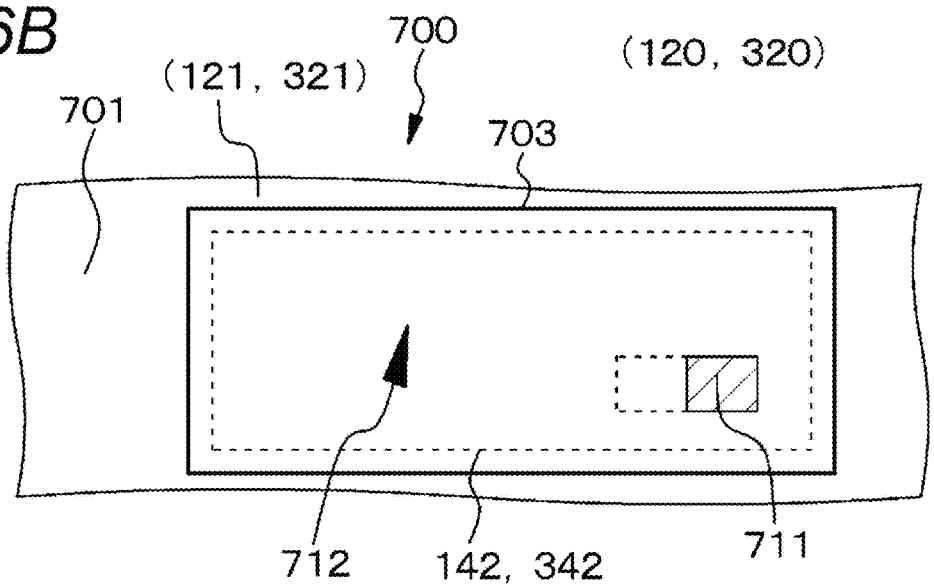
Figure 26C:
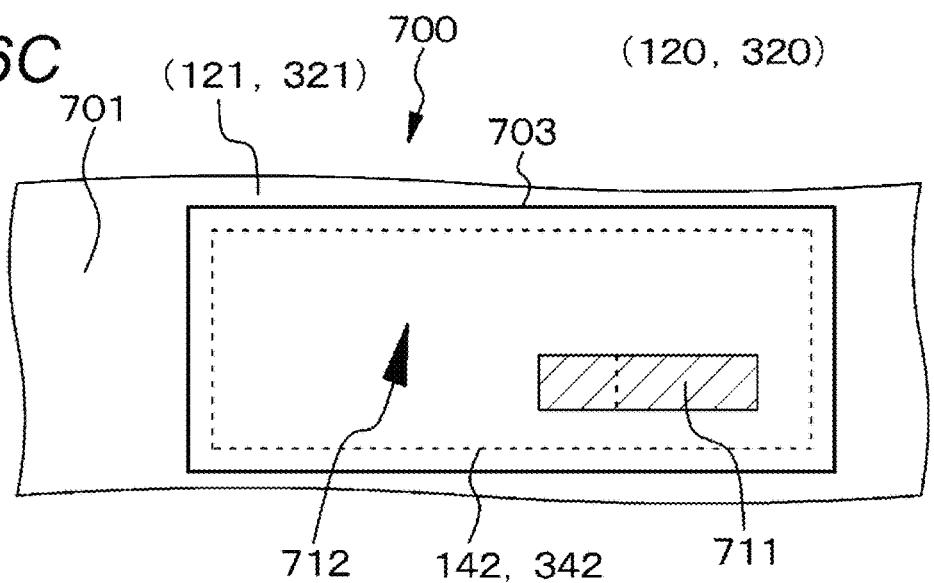

FIG. 26A, FIG. 26B, and FIG. 26C are diagrams schematically illustrating a change or the like in the virtual image projection region of the dimming device.

Figure 27:
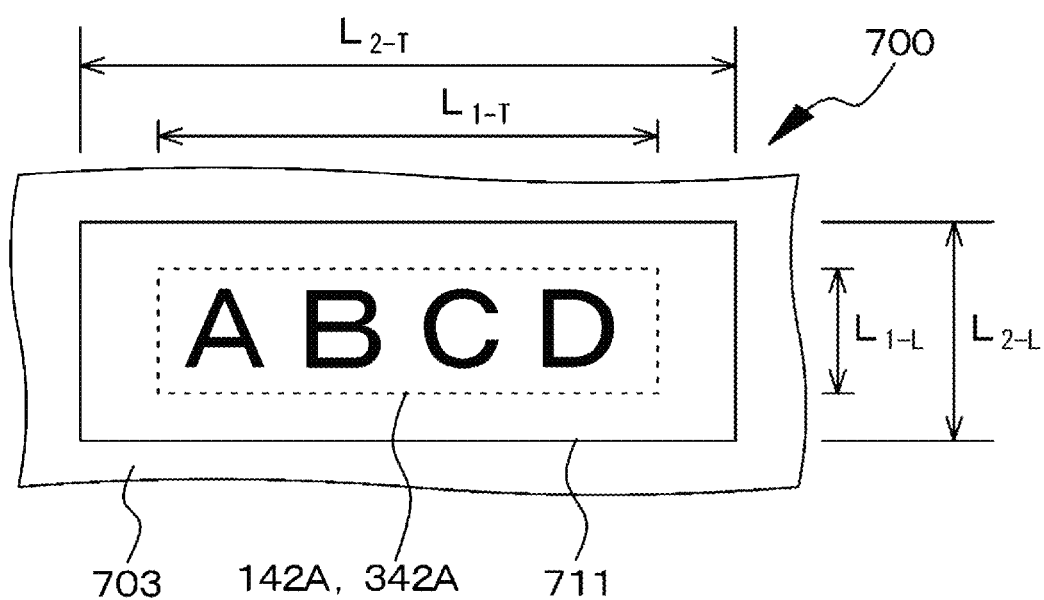

FIG. 27 is a diagram schematically illustrating a virtual rectangle circumscribed on the virtual image formed in the optical device, and a rectangular shape of the virtual image projection region of the dimming device.

Figure 28A:
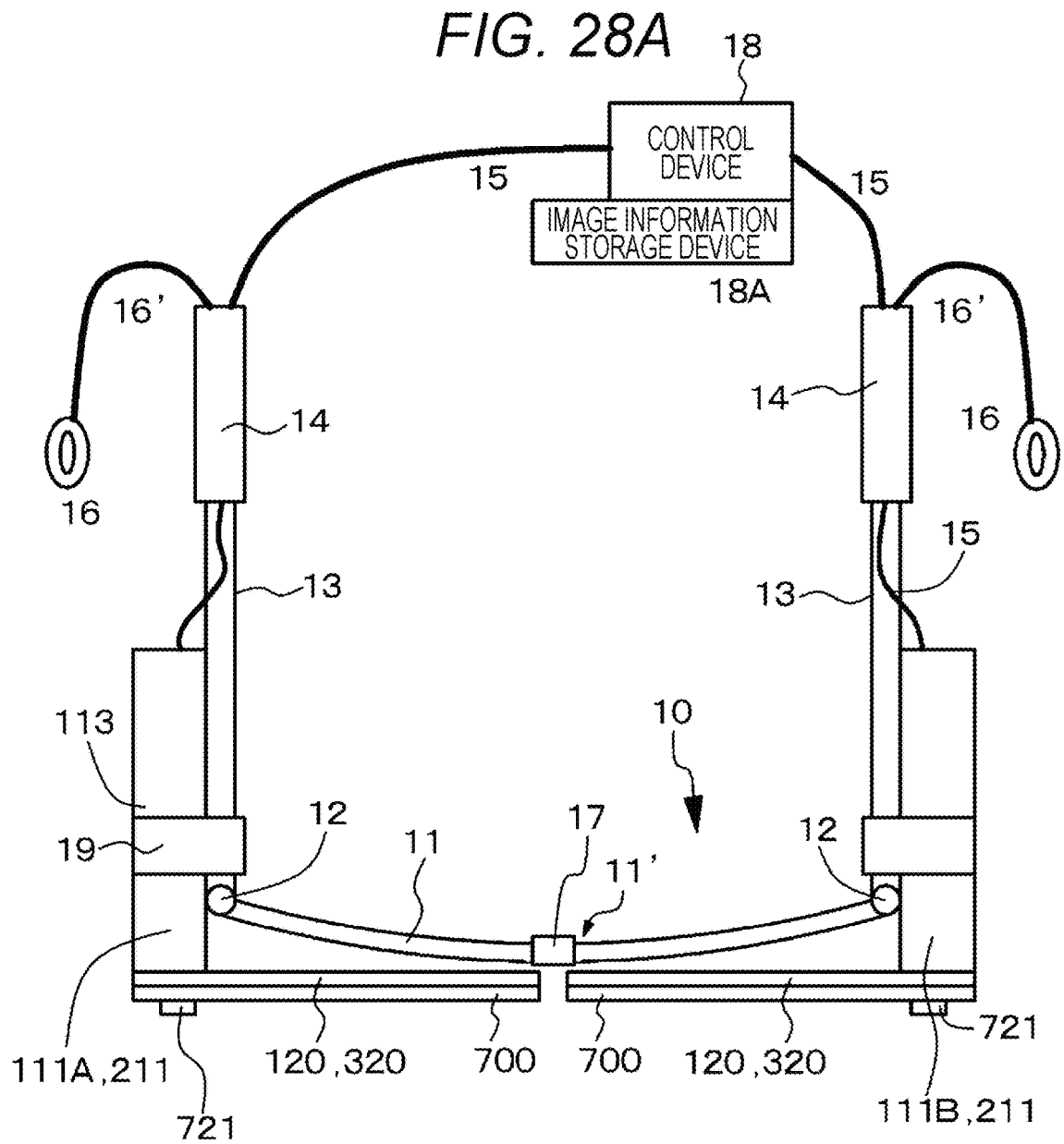
Figure 28B:
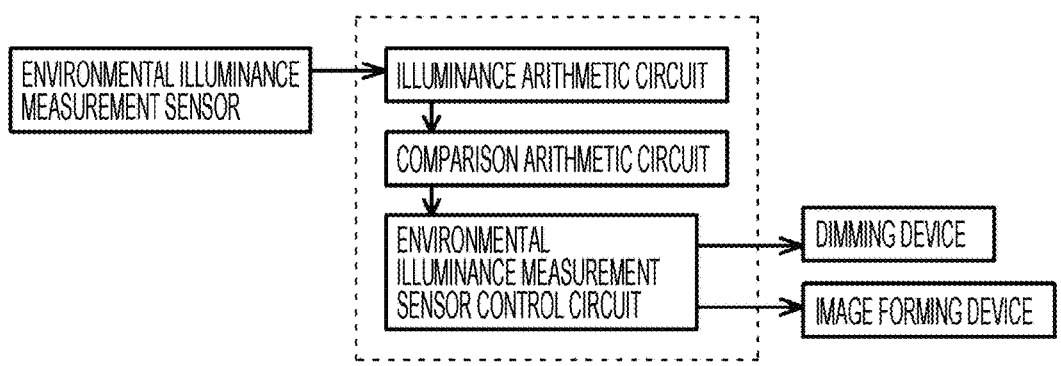

FIG. 28A and FIG. 28B are a schematic view of a display device of Example 9 as seen from the above, and a schematic view of circuit controlling an environmental illuminance measurement sensor, respectively.

Figure 29A:
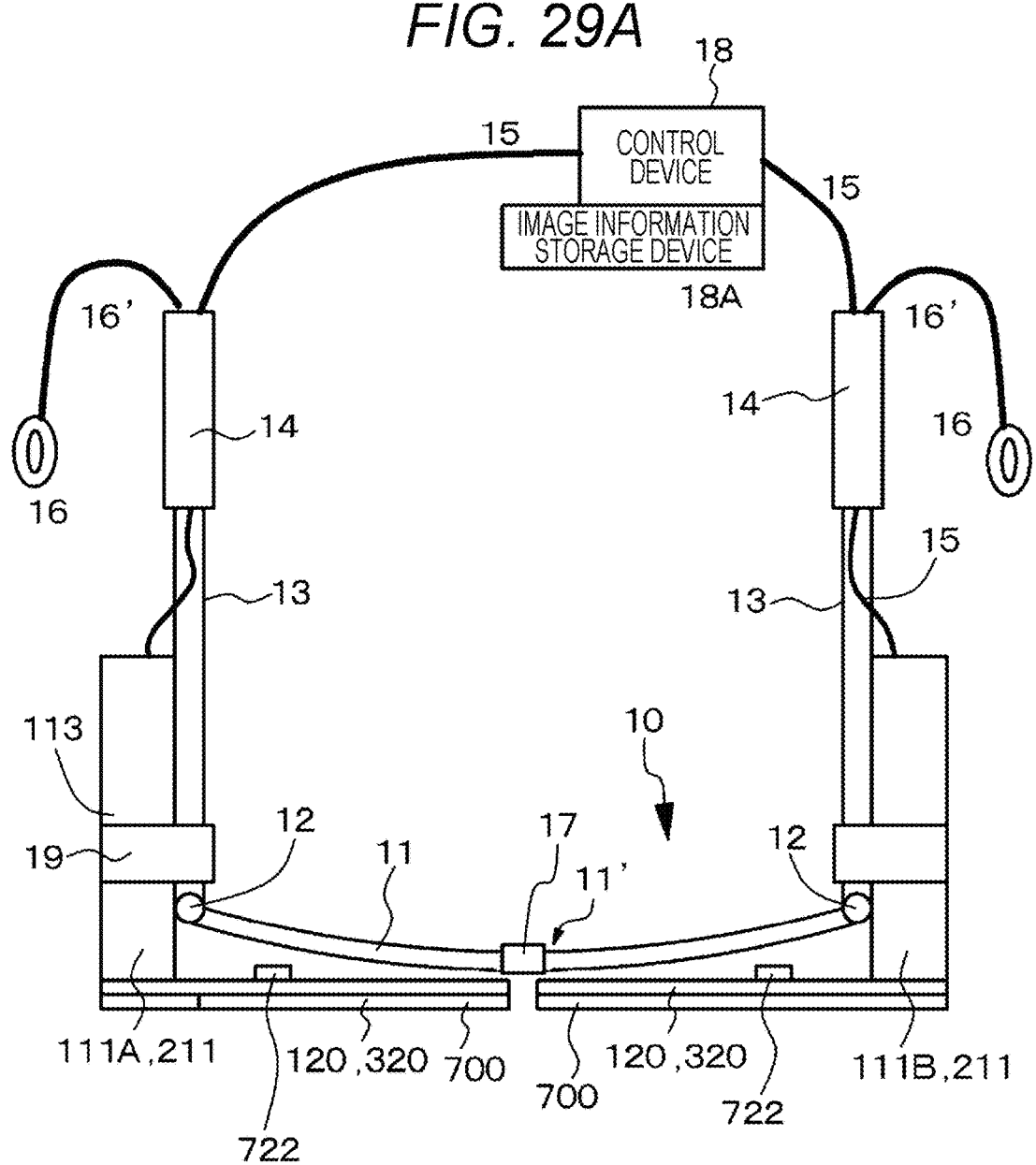
Figure 29B:
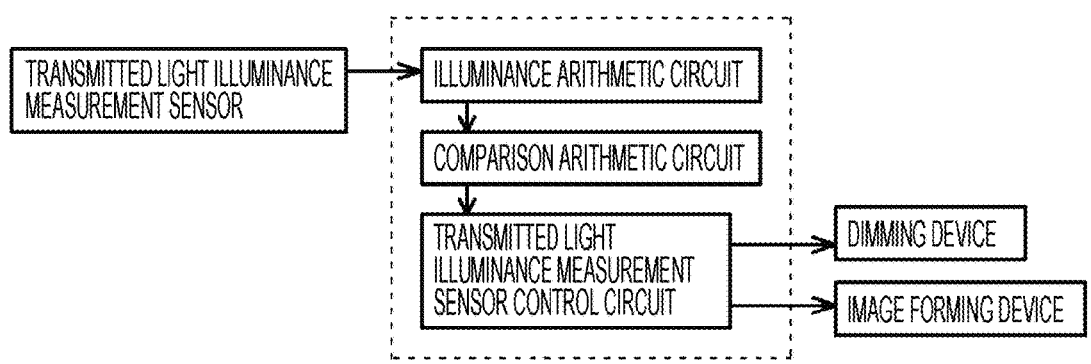

FIG. 29A and FIG. 29B are a schematic view of a display device of Example 10 as seen from the above, and a schematic view of a circuit controlling a transmitted light illuminance measurement sensor, respectively.

FIG. 30 is a conceptual diagram of an image display device of a display device of Example 13.

FIG. 31 is a conceptual diagram of an image display device of a display device of the related art.

MODE FOR CARRYING OUT THE INVENTION

Hereinafter, the present disclosure will be described on the basis of examples, with reference to the drawings, but the present disclosure is not limited to the examples, and various numerical values or materials in the examples are merely an example. Furthermore, the present disclosure will be described in the following order.

1. General Description of Optical Device, Image Display Device, and Display Device of Present Disclosure
2. Example 1 (Optical Device, Image Display Device, and Display Device of Present Disclosure)
3. Example 2 (Modification of Example 1)
4. Example 3 (Another Modification of Example 1)
5. Example 4 (Modification of Example 3)
6. Example 5 (Modification of Example 1 to Example 4)
7. Example 6 (Another Modification of Example 1 to Example 4)
8. Example 7 (Modification of Example 1 to Example 6)
9. Example 8 (Modification of Example 1 to Example 7)
10. Example 9 (Modification of Example 8)
11. Example 10 (Modification of Example 8 to Example 9)
12. Example 11 (Modification of Example 8 to Example 10)
13. Example 12 (Modification of Example 11)
14. Example 13 (Modification of Example 1 to Example 12)
15. Others <General Description of Optical Device, Image Display Device, and Display Device of Present Disclosure>

In the optical device or the like of the present disclosure, a moisture absorption member can be disposed on a first surface of a second substrate. Then, in this case, it is possible to set an aspect in which a moisture absorption member is bonded to the entire first surface of the second substrate.

In the optical device or the like of the present disclosure having the preferred aspect described above, the moisture absorption member can be disposed in a region other than a region of a first surface of a first substrate in which a deflection unit is disposed. That is, it is possible to set an aspect in which the moisture absorption member is disposed into the shape of a frame in order to surround the deflection unit. It is desirable that a gap of greater than or equal to 1 µm is provided between the moisture absorption member and the deflection unit.

Alternatively, in the optical device or the like of the present disclosure, it is possible to set an aspect in which the moisture absorption member is disposed in a region along the inside of a sealing member on the first surface of the second substrate, a region along the inside of the sealing member on the first surface of the first substrate, or a region along the inside of the sealing member on the first surface of the second substrate, and a region along the inside of the sealing member on the first surface of the first substrate. It is desirable that a gap of greater than or equal to 1 µm is provided between the moisture absorption member and the sealing member.

Alternatively, in the optical device or the like of the present disclosure, it is possible to set a configuration in which a light shielding member is disposed on the outside of a second surface of the second substrate in order to cover the deflection unit. Then, in this case, an orthogonal projection image of the deflection unit with respect to the second substrate can be included in an orthogonal projection image of the light shielding member with respect to the second substrate, and in such a case, it is possible to set a configuration in which the moisture absorption member is disposed in a region in the orthogonal projection image of the light shielding member with respect to the second substrate, which is a region of the first surface of the second substrate, a region other than the region of the first surface of the first substrate in which the deflection unit is disposed, or the region of the first surface of the second substrate and the region other than the region of the first surface of the first substrate in which the deflection unit is disposed. It is desirable that a gap of greater than or equal to 1 µm is provided between the moisture absorption member and the first deflection unit.

In the optical device or the like of the present disclosure having various preferred aspects and configurations as described above, the deflection unit can include a material having water absorbability. Specifically, it is preferable that the deflection unit is configured of a hologram diffraction grating film which includes a resin material. Then, in such a case, a protective film can be disposed on a surface of the deflection unit facing the second substrate, furthermore, the moisture absorption member and the protective film can include the same material, and in this case, a thickness $t_1$ of the moisture absorption member can be greater than a thickness $t_2$ of the protective film. Specifically, it is preferable to satisfy $$t_2 \leq 10 \text{ µm, and}$$

$$t_2 < t_1 \leq 1 \text{ mm},$$

preferably, $$1 \times 10^{-7} \text{ m} \leq t_1 \leq 3 \times 10^{-4} \text{ m}$$

more preferably, $$1 \times 10^{-6} \text{ m} \leq t_1 \leq 1 \times 10^{-4} \text{ m, and}$$

even more preferably, $$1 \times 10^{-6} \text{ m} \leq t_1 \leq 1 \times 10^{-6} \text{ m}.$$

By being covered with the protective film, it is possible to prevent the deflection unit from being damaged.

Alternatively, in the optical device or the like of the present disclosure, it is possible to set an aspect in which the deflection unit includes a first deflection unit and a second deflection unit, the first deflection unit deflects light which is incident on the first substrate such that the light incident on the first substrate is totally reflected in the first substrate, and the second deflection unit deflects light which propagates through the first substrate by total reflection such that the light propagating through the first substrate by the total reflection exits from the first substrate. Furthermore, the optical device or the like of the present disclosure having such an aspect, for convenience, will be referred to as an "optical device-A of the present disclosure".

In the optical device-A of the present disclosure, the first substrate functions as a light guide plate. That is, the light incident from the image forming device propagates through the first substrate (the light guide plate) by the total reflection, and then, exits towards an observer. In addition, a virtual image forming region of the optical device is configured by the second deflection unit. Furthermore, the term of the "total reflection" indicates internal total reflection, or total reflection in the first substrate (the light guide plate).

In the optical device-A of the present disclosure, it is possible to set an aspect in which the moisture absorption member is disposed on the first surface of the second substrate. Then, in this case, it is possible to set an aspect in which the moisture absorption member is bonded to the entire first surface of the second substrate.

In the optical device-A of the present disclosure having such an aspect, it is possible to set an aspect in which the moisture absorption member is disposed in a region other than the region of the first surface of the first substrate in which the first deflection unit and the second deflection unit are disposed. Further, it is preferable that the moisture absorption member is disposed in a region other than the region of the first substrate (a light guide region of the first substrate) to which light from the first deflection unit to the second deflection unit is guided. That is, it is possible to set an aspect in which the moisture absorption member is disposed into the shape of a frame to surround the first deflection unit, the second deflection unit, and the light guide region of the first substrate. It is desirable that a gap of greater than or equal to 1 µm is provided between the moisture absorption member and the deflection unit.

Alternatively, in the optical device-A of the present disclosure, it is possible to set an aspect in which the moisture absorption member is disposed in the region along the inside of the sealing member on the first surface of the second substrate, the region along the inside of the sealing member on the first surface of the first substrate, or the region along the inside of the sealing member on the first surface of the second substrate, and the region along the inside of the sealing member on the first surface of the first substrate. It is desirable that a gap of greater than or equal to 1 µm is provided between the moisture absorption member and the sealing member.

Alternatively, in the optical device-A of the present disclosure, it is possible to set a configuration in which the light shielding member is disposed on the outside of the second surface of the second substrate in order to cover the first deflection unit. Then, in this case, it is possible to set a configuration in which an orthogonal projection image of the first deflection unit with respect to the second substrate is included in the orthogonal projection image of the light shielding member with respect to the second substrate. Further, in such a case, it is possible to seta configuration in which the moisture absorption member is disposed in a region which is the region in the orthogonal projection image of the light shielding member with respect to the second substrate and the region of the first surface of the second substrate, a region other than the region of the first surface of the first substrate in which the first deflection unit is disposed, or a region other than the region of the first surface of the second substrate, and the region of the first surface of the first substrate in which the first deflection unit is disposed. It is desirable that a gap of greater than or equal to 1 µm is provided between the moisture absorption member and the first deflection unit.

In addition, in the display device of the present disclosure, it is possible to set a configuration in which the light shielding member shielding the incidence of the external light on the optical device is disposed in a region of the optical device in which light exiting from the image forming device is incident. By disposing the light shielding member shielding the incidence of the external light on the optical device in the region of the optical device in which the light exiting from the image forming device is incident, the external light is not incident in the region of the optical device in which the light exiting from the image forming device is incident, and thus, there is no case where undesired stray light or the like occurs, or image display quality of the display device decreases. Furthermore, it is preferable to set an aspect in which the orthogonal projection image of the light shielding member with respect to the optical device includes the region of the optical device in which the light exiting from the image forming device is incident.

Specifically, it is possible to set a configuration in which the light shielding member is disposed on a side opposite to a side where the image forming device of the optical device is disposed, in a state of being separated from the optical device. In the display device having such a configuration or the optical device-A of the present disclosure, the light shielding member, for example, may be formed by including an opaque plastic material. Then, it is possible to set an aspect in which such a light shielding member integrally extends from a housing of the image display device, is attached to the housing of the image display device, integrally extends from the frame, or is attached to the frame. Alternatively, it is possible to set a configuration in which the light shielding member is attached to the optical device, or is attached or disposed into a portion of the optical device on a side opposite to the side where the image forming device is disposed, or the light shielding member is disposed in a dimming device described later. Furthermore, the light shielding member including an opaque material, and for example, may be formed on the surface of the optical device on the basis of a physical vapor deposition method (a PVD method) or a chemical vapor deposition method (a CVD method), or may be formed by a printing method or the like, or a film or a sheet including an opaque material (a plastic material or a metal material, an alloy material, and the like), and a foil may be bonded. It is preferable to set a configuration in which the orthogonal projection image of the light shielding member with respect to the optical device includes an orthogonal projection image of an end portion of the dimming device described later with respect to the optical device.

Further, in the optical device-A of the present disclosure having various preferred aspects and configurations described above, it is possible to set a configuration in which at least one of the first deflection unit and the second deflection unit includes a material having water absorbability. Specifically, for example, it is preferable that the first deflection unit is configured of a hologram diffraction grating film including a resin material, and the second deflection unit is configured of a hologram diffraction grating film including a resin material. Then, in such a case, it is possible to set a configuration in which the protective film is disposed on a surface of the first deflection unit facing the second substrate and a surface of the second deflection unit, and a configuration in which the moisture absorption member and the protective film include the same material, and in this case, it is possible to set a configuration in which the thickness $t_1$ of the moisture absorption member is greater than the thickness $t_2$ of the protective film. Specifically, it is preferable to satisfy $t_2 \leq 10$ µm, and $t_2 < t_1 \leq 1$ mm preferably, $1 \times 10^{-7}$ m $\leq t_1 \leq 3 \times 10^{-4}$ m more preferably, $1 \times 10^{-6}$ m $\leq t_1 \leq 1 \times 10^{-4}$ m, and even more preferably, $1 \times 10^{-6}$ m $\leq t_1 \leq 1 \times 10^{-5}$ m.

By being covered with the protective film, it is possible to prevent the deflection unit from being damaged.

In a case where the first deflection unit is configured of the hologram diffraction grating film, the first deflection unit diffractively reflects light incident on the first substrate (the light guide plate), and the second deflection unit diffractively reflects the light propagating through the first substrate by total reflection over a plurality of times. It is possible to set a configuration in which the hologram diffraction grating film includes a reflective hologram diffraction grating film, a configuration in which the hologram diffraction grating film includes a transmissive hologram diffraction grating film, or a configuration in which one hologram diffraction grating film includes a reflective hologram diffraction grating film, and the other hologram diffraction grating film includes a transmissive hologram diffraction grating film. Furthermore, an example of the reflective hologram diffraction grating film is capable of including a reflective volume hologram diffraction grating film. There is a case where the first deflection unit including the reflective volume hologram diffraction grating film, for convenience, is referred to as a "first diffraction grating member", and the second deflection unit including the reflective volume hologram diffraction grating film, for convenience, is referred to as a "second diffraction grating member".

Alternatively, in a case where the first deflection unit reflects the entire light incident on the first substrate (the light guide plate), the first deflection unit, for example, can be configured of a light reflective film (a type of mirror) which is configured of a metal including an alloy and reflects the light incident on the first substrate. In addition, in a case where the first deflection unit reflects a part of the light incident on the first substrate, the first deflection unit, for example, can be configured of a multilayer laminate structure in which a plurality of dielectric laminated films are laminated, a half mirror, a polarization beam splitter, or a diffraction grating (for example, a hologram diffraction grating film). On the other hand, in the second deflection unit, parallel light propagating through the first substrate by total reflection is reflected or diffracted over a plurality of times, and exits from the first substrate in a state of the parallel light. The second deflection unit can be configured of a multilayer laminate structure in which a plurality of dielectric laminated films are laminated, a half mirror, a polarization beam splitter, or a hologram diffraction grating film. Here, even in such a case, at least one of the first deflection unit and the second deflection unit includes a material having water absorbability. In addition, one of the first deflection unit and the second deflection unit may be disposed in the first substrate according to a case.

Further, in the optical device or the like of the present disclosure provided with the optical device-A of the present disclosure having various preferred configuration and aspects described above, it is possible to set an aspect in which a water absorption rate of the moisture absorption member is higher than a water absorption rate of a material configuring the deflection unit. However, the present disclosure is not limited thereto. The water absorption rate, for example, can be measured on the basis of JIS K 7209: 2000 "Obtaining Method of Plastic-Water Absorption Rate". Alternatively, it is possible to set an aspect in which the moisture absorption member includes polyvinyl alcohol (PVA). PVA is a preferred material in which a residual organic solvent is not volatilized, a damage with respect to a photopolymer material described later is small, and a high transparency is obtained. Alternatively, it is possible to set an aspect in which the moisture absorption member includes at least one type of material selected from the group consisting of nanoporous silica, molecular sieve, zeolite, active carbon, active alumina, diatomaceous earth, montmorillonite, and bentonite, and the material may be an inorganic material or an organic material insofar as having moisture absorbency. A physical moisture absorbent, for example, has a honeycomb structure in which fine pores having a nanosize (in general, 0.1 nm to 10 nm) exist, and has a moisture absorption function by trapping water molecules with the pores. The diameter of the pore, for example, can be suitably adjusted by a method such as changing a molecular structure of a surfactant agent as a template, and as a result thereof, the moisture absorbency can also be suitably adjusted. Examples of a particularly preferred physical moisture absorbent are capable of including nanoporous silica, molecular sieve, and zeolite. Alternatively, it is possible to set an aspect in which the moisture absorption member includes a resin film having a light transmission rate of greater than or equal to 50%. Specifically, examples of a material configuring the resin film are capable of including a polyolefin-based resin (PO), for example, a homopolymer or a copolymer, such as ethylene, polypropylene, and butene, an amorphous polyolefin resin (COP) or a copolymer resin (COC) referred to as cyclic polyolefin, such as a cyclopentadiene and a derivative thereof, dicyclopentadiene and a derivative thereof, and norbornadiene and a derivative thereof, a polyester-based resin such as polyethylene terephthalate (PET) or polyethylene 2,6-naphthalate (PEN), a polyamide-based resin such as nylon 6, nylon 12, and copolymer nylon, an ethylene.vinyl alcohol copolymer resin (EVOH), a polyimide resin (PI), a polyether imide resin (PEI), a polysulfone resin (PS), a polyether sulfone resin (PES), a polyether ether ketone resin (PEEK), a polycarbonate resin (PC), a polyvinyl butyrate resin (PVB), a polyarylate resin (PAR), a polytetrafluoroethylene resin (PTFE), an ethylene (propylene)-ethylene tetrafluoride copolymer resin (ETFE), a trifluorochloroethylene resin (PFA), an ethylene tetrafluoride-perfluoroalkyl vinyl ether copolymer resin (FEP), a vinylidene fluoride resin (PVDF), a vinyl fluoride resin (PVF), perfluoroethylene-perfluoropropylene-perfluorovinyl ether-copolymer resin (EPA), an ethylene tetrafluoride-perfluoroalkyl vinyl ether-propylene hexafluoride copolymer resin (EPE), a polychloroethylene trifluoride resin (PCTFE), an ethylene-chloroethylene trifluoride copolymer resin (ECTFE), a polyvinyl chloride resin (PVC), a polyvinylidene chloride resin (PVDC), and the like.

Further, in the optical device or the like of the present disclosure provided with the optical device-A of the present disclosure having various preferred configurations and aspects described above, it is possible to set an aspect in which the first substrate and the second substrate include a transparent substrate.

The first substrate (the light guide plate) includes two parallel surfaces (the first surface and the second surface) extending in parallel to an axis line of the first substrate (a longitudinal direction and a horizontal direction, corresponding to an X-axis direction). Furthermore, a width direction of the first substrate (a height direction and a perpendicular direction) corresponds to a Y-axis direction. When the surface of the first substrate on which light is incident is set to a first substrate incident surface, and the surface of the first substrate from which light exits is set to a first substrate exit surface, the first substrate incident surface and the first substrate exit surface may be configured of the second surface, or the first substrate incident surface may be configured of the first surface, and the first substrate exit surface may be configured of the second surface. An interference fringe of the hologram diffraction grating film extends approximately in parallel to the Y-axis direction. Examples of a material configuring the first substrate or the second substrate are capable of including glass including optical glass such as quartz glass or BK7, soda lime glass, and white glass, or a plastic material (for example, a polycarbonate resin, a laminate structure of a polycarbonate resin and an acrylic resin, a cycloolefin polymer, an amorphous polypropylene-based resin, and a styrene-based resin including an AS resin). The shape of the first substrate and the second substrate is not limited to a flat plate, and may be in a curved shape.

Further, in the optical device or the like of the present disclosure provided with the optical device-A of the present disclosure having various preferred configurations and aspects described above, it is possible to set an aspect in which the dimming device is disposed on the second surface side of the second substrate.

It is possible to set an aspect in which the dimming device, for example, includes a first substrate for a dimming device, a second substrate for a dimming device facing the first substrate for a dimming device, a first transparent electrode disposed on a facing surface of the first substrate for a dimming device facing the second substrate for a dimming device, a second transparent electrode disposed on a facing surface of the second substrate for a dimming device facing the first substrate for a dimming device, and a dimming layer interposed between the first transparent electrode and the second transparent electrode. Then, in this case, for example, the first transparent electrode is configured of a plurality of strip-like first transparent electrode segments extending in a first direction, the second transparent electrode is configured of a plurality of strip-like second transparent electrode segments extending in a second direction different from the first direction, it is possible to set an aspect in which a light shielding rate of a portion of the dimming device corresponding to an overlap region between the first transparent electrode segment and the second transparent electrode segment (a minimum unit region in which a light shielding rate of the dimming device is changed) is controlled on the basis of the control of a voltage which is applied to the first transparent electrode segment and the second transparent electrode segment. That is, the light shielding rate can be controlled on the basis of a simple matrix method. An aspect can be exemplified in which the first direction and the second direction are orthogonal to each other.

Alternatively, in order to control alight shielding rate of the minimum unit region in which the light shielding rate of the dimming device is changed, a thin film transistor (TFT) may be disposed on each minimum unit region. That is, the light shielding rate may be controlled on the basis of an active matrix method. Alternatively, it is possible to set at least one of the first transparent electrode and the second transparent electrode to a so-called solid electrode (an electrode which is not patterned).

It is possible to configure the second substrate to function as the first substrate for a dimming device, and according to such a configuration, it is possible to reduce the weight of the entire display device, and there is no concern that a user of the display device to feel discomfort. The second substrate for a dimming device can be configured to be thinner than the first substrate for a dimming device. In the display device including the dimming device, the size and the position of an actual dimming region of the dimming device is determined on the basis of a signal for displaying an image on the image forming device. The size of the dimming device may be the same size as that of the optical device, or may be larger or smaller than the size of the optical device. The point is that the second deflection unit (a virtual image forming region) may be positioned in the orthogonal projection image of the dimming device.

It is possible to configure a maximum light transmission rate of the dimming device to be greater than or equal to 50%, and a minimum light transmission rate of the dimming device to be less than or equal to 30%. Furthermore, the upper limit value of the maximum light transmission rate of the dimming device can be 99%, and the lower limit value of the minimum light transmission rate of the dimming device can be 1%. Here, a relationship (Light Transmission Rate)=1−(Light Shielding Rate)
is obtained.

It is possible to configure light passing through the dimming device to be colored with a desired color by the dimming device according to a case. Then, in this case, it is possible to set an aspect in which the coloring color of the dimming device is variable, or an aspect in which the coloring color of the dimming device is fixed. Furthermore, in the former case, for example, an aspect may be set in which a dimming device coloring the light with red, a dimming device coloring the light with green, and a dimming device coloring the light with blue are laminated. In addition, in the latter case, the coloring color of the dimming device is not limited, and brown can be exemplified as the coloring color.

Further, it is possible to set an aspect in which the dimming device is detachably disposed according to a case. In order to detachably dispose the dimming device, for example, the dimming device, for example, can be attached to the frame by using screws prepared from transparent plastic, or a groove is formed on the frame, and thus, the dimming device is capable of engaging with the groove, or dimming device can be attached to the frame by attaching a magnet to the frame, or a slide portion may be disposed on the frame, and thus, the dimming device may fit into the slide portion. In addition, a connector may be attached to the dimming device, and the dimming device may be electrically connected to a control circuit for controlling the light shielding rate (the light transmission rate) of the dimming device (for example, included in a control device for controlling the image forming device) through the connector and the wiring. The dimming device may be curved.

In the display device of the present disclosure including the dimming device, it is possible to set an aspect in which an environmental illuminance measurement sensor measuring an illuminance of the environment where the display device is disposed is further provided, and the light shielding rate of the dimming device can be controlled on the basis of a measurement result of the environmental illuminance measurement sensor. Alternatively, it is possible to set an aspect in which the environmental illuminance measurement sensor measuring the illuminance of the environment where the display device is disposed is further provided, and a brightness of an image formed by the image forming device is controlled on the basis of the measurement result of the environmental illuminance measurement sensor. Such aspects may be combined with each other.

Alternatively, in the display device of the present disclosure including the dimming device, it is possible to set an aspect in which a transmitted light illuminance measurement sensor measuring an illuminance based on light transmitted through the dimming device from the external environment is further provided, and the light shielding rate of the dimming device can be controlled on the basis of a measurement result of the transmitted light illuminance measurement sensor. Alternatively, it is possible to set an aspect in which the transmitted light illuminance measurement sensor measuring the illuminance based on the light transmitted through the dimming device from the external environment is further provided, and the brightness of the image formed by the image forming device is controlled on the basis of the measurement result of the transmitted light illuminance measurement sensor. Furthermore, it is desirable to set an aspect in which the transmitted light illuminance measurement sensor is disposed on the observer side from the optical device. At least two transmitted light illuminance measurement sensors are arranged, and an illuminance based on light passing through a portion of a high light shielding rate and an illuminance based on light passing through a portion of a low light shielding rate may be measured. Such aspects may be combined with each other. Further, such aspects, and an aspect of performing the control on the basis of the measurement result of the environmental illuminance measurement sensor described above may be combined with each other.

The environmental illuminance measurement sensor and the transmitted light illuminance measurement sensor may be configured of a known illuminance sensor, and the environmental illuminance measurement sensor and the transmitted light illuminance measurement sensor may be controlled on the basis of a known control circuit.

The optical device is a semi-transmissive (see-through) optical device. Specifically, a portion of the optical device facing at least the ocular bulb (the pupil) of the observer is set to a semi-transmissive (see-through), the external scenery can be seen through the portion of the optical device (and, through the dimming device, in a case where the dimming device is disposed). The display device of the present disclosure may include one image display device (a monocular display device), and may include two image display devices (a binocular display device). In a case where the dimming device is disposed, by the binocular display device, a light transmission rate in a region of a part of the dimming device in both of the image display devices may be changed, or a light transmission rate in a region of a part of the dimming device may be changed in one image display device, on the basis of the signal for displaying an image.

Herein, there is the case of using the term of "semi-transmissive", and the term of "semi-transmissive" is used for indicating that a part of incident light is transmitted, and the remnant is reflected, but not indicating that ½ (50%) of the incident light is transmitted or reflected.

The first surface of the first substrate and the first surface of the second substrate are sealed by a sealing member in an outer edge portion, and adhere to each other. Various resins of a thermosetting resin, a photocurable resin, a moisture-curable resin, an anaerobic curable resin, and the like, such as an epoxy resin, a urethane-based resin, an acrylic resin, a vinyl acetate-based resin, an ene-thiol-based resin, a silicone-based resin, and a modified polymer resin, can be used as the sealing member referred to as a sealing agent.

Monochroic (for example, green) image display can be performed by the image display device of the present disclosure. Then, in this case, for example, it is possible to set a configuration in which an angular field, for example, is divided into two fields (more specifically, for example, equally divided into two fields), and the first deflection unit is formed by laminating two hologram diffraction grating films respectively corresponding to angular field groups divided into two fields. Alternatively, the first deflection unit may be disposed on each of the first surface and the second surface of the first substrate. In addition, in the case of performing color image display, it is possible to set a configuration in which the first diffraction grating member or the second diffraction grating member is formed by laminating reflective volume hologram diffraction grating films of P layers, in order to deal with the diffractive reflection of P types of light rays having P types (for example, P=3, and three types of red, green, and blue) of different wavelength bands (or wavelengths). An interference fringe corresponding to one type of wavelength band (or wavelength) is formed on each of the hologram diffraction grating films. Alternatively, it is possible to set a configuration in which P types of interference fringes are formed on one hologram diffraction grating film in order to deal with the diffractive reflection of the P types of light rays having P types of different wavelength bands (or wavelengths). Alternatively, for example, a structure may be adopted in which a reflective volume hologram diffraction grating film diffractively reflecting light having a red wavelength band (or wavelength) is disposed on a first light guide plate, a reflective volume hologram diffraction grating film diffractively reflecting light having a green wavelength band (or wavelength) is disposed on a second light guide plate, a reflective volume hologram diffraction grating film diffractively reflecting light having a blue wavelength band (or wavelength) is disposed on a third light guide plate, and the first light guide plate, the second light guide plate, and the third light guide plate may be laminated with a gap. The first light guide plate or the third light guide plate corresponds to the first substrate. Alternatively, it is possible to set a configuration in which the angular field, for example, is divided into three fields, and the first diffraction grating member or the second diffraction grating member is formed by laminating the hologram diffraction grating films corresponding to each of the angular fields. Then, by adopting such a configuration, it is possible to obtain an increase in a diffraction efficiency when the light having each wavelength band (or wavelength) is diffractively reflected by the first diffraction grating member or the second diffraction grating member, an increase in a diffraction receiving angle, and the optimization of a diffraction angle.

Examples of a material configuring the diffraction grating member are capable of including a photopolymer material. A configuration material or a basic structure of the first diffraction grating member and the second diffraction grating member including the reflective volume hologram diffraction grating film may be identical to a configuration material or a structure of a reflective volume hologram diffraction grating film of the related art. The reflective volume hologram diffraction grating film indicates a hologram diffraction grating film diffractively reflecting only +1-order diffraction light. The interference fringe is formed over a front surface of the diffraction grating member from the inside thereof, and a forming method of the interference fringe itself may be identical to a forming method of the related art. Specifically, for example, a member configuring the diffraction grating member (for example, a photopolymer material) may be irradiated with object light from a first predetermined direction on one side, and simultaneously, the member configuring the diffraction grating member may be irradiated with reference light from a second predetermined direction on the other side, and the interference fringe formed by the object light and the reference light may be recorded in the member configuring the diffraction grating member. By suitably selecting the first predetermined direction, the second predetermined direction, and the wavelength of the object light and the reference light, it is possible to obtain a desired pitch of the interference fringe on the front surface of the diffraction grating member, and a desired inclined angle (a slant angle) of the interference fringe. The inclined angle of the interference fringe indicates an angle between the front surface of the diffraction grating member and the interference fringe. In a case where the first diffraction grating member and the second diffraction grating member are configured in a laminate structure of the reflective volume hologram diffraction grating films of P layers, a laminate of such hologram diffraction grating films may be formed by separately preparing each of the hologram diffraction grating films of P layers, and then, by laminating (performing adhesion with respect to) the hologram diffraction grating films of P layers, for example, by using a ultraviolet curable adhesive agent. In addition, a hologram diffraction grating film is prepared by preparing a hologram diffraction grating film of one layer by using a photopolymer material having adhesion properties, and then, by sticking a photopolymer material having sequential adhesion properties onto the hologram diffraction grating film of one layer, and thus, the hologram diffraction grating films of P layers may be prepared. The prepared hologram diffraction grating film is irradiated with an energy ray, as necessary, and thus, a monomer of the photopolymer material, which remains without being polymerized at the time of irradiating the hologram diffraction grating film with the object light and the reference light, is polymerized and fixed. In addition, as necessary, a heat treatment is performed, and thus, stabilization is performed.

In the image display device of the present disclosure having various preferred aspects and configurations described above, it is possible to set an aspect in which the image forming device includes a plurality of pixels arranged in a two-dimensional matrix. Furthermore, such a configuration of the image forming device, for convenience, will be referred to as an "image forming device of a first configuration".

Examples of the image forming device of the first configuration are capable of including an image forming device configured of a reflective spatial light modulation device and a light source; an image forming device configured of a transmissive spatial light modulation device and a light source; and an image forming device configured of a light emitting element such as an organic electro luminescence (EL), an inorganic EL, a light emitting diode (LED), and a semiconductor laser element, and among them, the image forming device configured of the reflective spatial light modulation device and the light source is preferable. Examples of the spatial light modulation device are capable of including a light valve, for example, a transmissive or reflective liquid crystal display device such as liquid crystal on silicon (LCOS), and a digital micro mirror device (DMD), and examples of the light source are capable of including a light emitting element. Further, it is possible to set a configuration in which the reflective spatial light modulation device includes a polarization beam splitter which reflects a part of light from the liquid crystal display device and the light source and guides the light to the liquid crystal display device, allows a part of light reflected by the liquid crystal display device to pass therethrough, and guides the light to an optical system. Examples of the light emitting element configuring the light source are capable of including a red light emitting element, a green light emitting element, a blue light emitting element, and a white light emitting element, or red light, green light, and blue light exiting from the red light emitting element, the green light emitting element, and the blue light emitting element are mixed or subjected to brightness homogenization by using a light pipe, and thus, white light may be obtained. For example, a semiconductor laser element, a solid laser, or an LED can be exemplified as the light emitting element. The number of pixels may be determined on the basis of the specification to be required in the image display device, and 320×240, 432×240, 640×480, 854×480, 1024×768, 1920×1080, and the like can be exemplified as a specific value of the number of pixels.

Alternatively, in the image display device of the present disclosure having preferred aspects and configurations described above, it is possible to set an aspect in which the image forming device includes the light source, and a scanning unit scanning parallel light exiting from the light source. Furthermore, such a configuration of the image forming device, for convenience, will be referred to as an "image forming device of a second configuration".

Examples of the light source in the image forming device of the second configuration are capable of including a light emitting element, and specifically, are capable of including a red light emitting element, a green light emitting element, a blue light emitting element, and a white light emitting element, or red light, green light, and blue light exiting from the red light emitting element, the green light emitting element, and the blue light emitting element are mixed or subjected to brightness homogenization by using a light pipe, and thus, white light may be obtained. For example, a semiconductor laser element, a solid laser, or an LED can be exemplified as the light emitting element. The number of pixels (virtual pixels) in the image forming device of the second configuration may be determined on the basis of the specification to be required in the image display device, and 320×240, 432×240, 640×480, 854×480, 1024×768, 1920×1080, and the like can be exemplified as a specific value of the number of pixels (virtual pixels). In addition, in a case where color image display is performed, and the light source is configured of the red light emitting element, the green light emitting element, and the blue light emitting element, for example, it is preferable to perform color synthesis by using a cross prism. Examples of the scanning unit are capable of including a micro electro mechanical systems (MEMS) including a micro mirror which is capable of performing horizontal scanning and perpendicular scanning with respect to light exiting from the light source, for example, rotating the light in a two-dimensional direction, or a Galvano mirror.

In the image forming device of the first configuration or the image forming device of the second configuration, light including a plurality of parallel light rays is incident on the first substrate (the light guide plate) by the optical system (an optical system in which exiting light is set to parallel light, there is the case of being referred to as a "parallel light exiting optical system", and specifically, for example, a collimation optical system or a relay optical system), and such a requirement of being the parallel light is on the basis of the fact that optical wavefront information when such light is incident on the first substrate is required to be stored even after exiting from the first substrate through the first deflection unit and the second deflection unit. Furthermore, in order to generate the plurality of parallel light rays, specifically, for example, a light exiting unit of the image forming device may be positioned, for example, in a site (a position) on a focal point distance in the parallel light exiting optical system. The parallel light exiting optical system has a function of converting position information of the pixel into angle information in the optical system of the optical device. An optical system, which is a single or a combination of a convex lens, a concave lens, an adjustable surface prism, and a hologram lens, and has positive optical power as a whole, can be exemplified as the parallel light exiting optical system. A light shielding unit including an opening portion may be disposed between the parallel light exiting optical system and the first substrate such that undesired light does not exit from the parallel light exiting optical system, and is not incident on the first substrate.

In the display device of the present disclosure having various preferred aspects and configurations described above, the frame includes a front portion disposed on the front side of the observer, and two temple portions rotatably attached to both ends of the front portion through a hinge. Furthermore, a drop end portion is attached to a tip end portion of each of the temple portions. The front portion may include a rim. The image display device is attached to the frame, and specifically, for example, the image forming device may be attached to the temple portion. In addition, it is possible to set a configuration in which the front portion and two temple portions are integrated. That is, the frame has a structure which is approximately identical to that of general eye glasses at the time of seeing the entire display device of the present disclosure. A material configuring the frame including the pad portion can be configured of the same material as that configuring the general eye glasses, such as a metal or an alloy, plastic, and a combination thereof. Further, it is possible to set a configuration in which a nose pad is attached to the front portion. That is, an assembly of the frame (there is a case where the frame includes the rim) and the nose pad has a structure which approximately identical to that of the general eye glasses at the time of seeing the entire display device of the present disclosure. The nose pad is also capable of having a known configuration and structure.

In the case of including the dimming device, it is possible to set an aspect in which the dimming device is disposed in the front portion. In addition, it is possible to set an aspect in which the optical device is attached to the dimming device. Furthermore, the optical device may be attached to the dimming device in a cohesive state, or may be attached to the dimming device in a state having a gap. In addition, it is possible to set an aspect in which the dimming device is fitted into the rim. Alternatively, at least one of the first substrate for a dimming device and the second substrate for a dimming device, for example, may be attached to the frame. However, the present disclosure is not limited thereto. The optical device and the dimming device may be disposed in this order from the observer side, or the dimming device and the optical device may be disposed in this order.

In the display device of the present disclosure, it is desirable to set an aspect in which wiring (a signal line, a power source line, or the like) from one or two image forming devices extends to the outside from the tip end portion of the drop end portion through the temple portion and the inside of the drop end portion, and is connected to the control device (the control circuit or the control unit), on design or from the viewpoint of mountability. Further, it is possible to set an aspect in which each of the image forming devices includes a headphone portion, and wiring for a headphone portion from each of the image forming devices extends to the headphone portion from the tip end portion of the drop end portion through the temple portion and the inside of the drop end portion. Examples of the headphone portion are capable of including an inner ear type headphone portion and a canal type headphone portion. More specifically, it is preferable to set an aspect in which the wiring for a headphone portion extends to the headphone portion from the tip end portion of the drop end portion to wrap around the behind of the auricle (the ear shell). In addition, it is possible to set an aspect in which the imaging device is attached to a center portion or an end portion of the front portion, and the temple portion. Specifically, the imaging device, for example, is configured of a solid imaging element including a CCD or a CMOS sensor, and a lens. The wiring from the imaging device, for example, may be connected to one image display device (or the image forming device) through the front portion, and may be included in the wiring extending from the image display device (or the image forming device).

Alternatively, in the case of setting the display device of the present disclosure to the binocular display device, it is possible to set a configuration in which the first substrate (the light guide plate) is disposed on the face of the observer on the center side from the image forming device as a whole, a bonding member bonding two image display devices together is further provided, the bonding member is attached to a surface of the center portion of the frame positioned between two pupils of the observer, on a side facing the observer, and a projection image of the bonding member is included in a projection image of the frame.

Thus, by having a structure in which the bonding member is attached to the center portion of the frame positioned between two pupils of the observer, that is, by not having a structure in which the image display device is directly attached to the frame, the temple portion is in a state of being widened towards the outside when the observer mounts the frame on the head portion, and as a result thereof, even in a case where the frame is modified, displacement (a position change) in the image forming device or the first substrate does not occur according to the modification of the frame, or even in a case where the displacement occurs, the displacement is extremely small. Therefore, it is possible to reliably prevent a convergence angle between right and left images from being changed. Furthermore, it is not necessary to increase rigidity of the front portion of the frame, and thus, an increase in the weight of the frame, a decrease in the design properties, and an increase in the cost are not caused. In addition, the image display device is not directly attached to the frame, and thus, it is possible to freely select the design, the color, or the like of the frame according to the taste of the observer, there are few restrictions on the design of the frame, and a freedom degree on design is high. In addition, the bonding member is disposed between the observer and the frame, and the projection image of the bonding member is included in the projection image of the frame. In other words, the bonding member is hidden by the frame at the time of seeing head mounted display from the front side of the observer. Accordingly, it is possible to impart high design properties and designability to the head mounted display.

Furthermore, it is preferable to set a configuration in which the bonding member is attached to the center portion (corresponding to a bright portion of general eye glasses) of the front portion positioned between two pupils of the observer, on a side facing the observer.

Two image display devices are bonded together by the bonding member, and specifically, it is possible to set an aspect in which the image forming device is attached to each end portion of the bonding member such that an attachment state can be adjusted. Then, in this case, it is preferable to set a configuration in which each of the image forming devices is positioned on the outside from the pupil of the observer. Further, in such a configuration, when a distance between the center of an attachment portion of one image forming device and one end portion of the frame (one sense, an endpiece) is set to $\alpha$, a distance between the center of the bonding member to one end portion of the frame (one sense) is set to $\beta$, a distance between the center of an attachment portion of the other image forming device and one end portion of the frame (one sense) is set to $\gamma$, and the length of the frame is set to L, it is desirable to satisfy $0.01 \times L \leq \alpha \leq 0.30 \times L$, preferably $0.05 \times L \leq \alpha \leq 0.25 \times L$ and $0.35 \times L \leq \beta \leq 0.65 \times L$, preferably $0.45 \times L$ $\beta \leq 0.55 \times L$ and $0.70 \times L \leq \gamma \leq 0.99 \times L$, and preferably $0.75 \times L \leq \gamma \leq 0.95 \times L$. In the attachment of the image forming device with respect to each of the end portions of the bonding member, specifically, for example, through holes are provided in three portions of each of the end portions of the bonding member, screwing portions corresponding to the through holes are provided in the image forming device, screws pass through each of the through holes, and the through holes are screwed to the screwing portions provided in the image forming device. A spring is inserted between the screws and the screwing portions. Thus, it is possible to adjust the attachment state of the image forming device (the inclination of the image forming device with respect to the bonding member) according to a fastening state of the screws.

Here, the center of the attachment portion of the image forming device indicates a bisection point along an axis line direction of the frame in a portion where the projection image of the image forming device obtained at the time of projecting the image forming device and the frame to a virtual flat surface, overlaps with the projection image of the frame, in a state where the image forming device is attached to the bonding member. In addition, the center of the bonding member indicates a bisection point along the axis line direction of the frame in a portion where the bonding member is in contact with the frame, in a state where the bonding member is attached to the frame. The length of the frame is the length of the projection image of the frame in a case where the frame is curved. Furthermore, a projection direction is a direction perpendicular to the face of the observer.

Alternatively, two image display devices are bonded together by the bonding member, and specifically, it is possible to set an aspect in which two first substrates are bonded together by the bonding member. Furthermore, there is a case where two first substrates are integrally prepared, and in such a case, the bonding member is attached to the first substrate which is integrally prepared, and the aspect is also included in the aspect in which two first substrates are bonded together by the bonding member. When a distance between the center of one image forming device and one end portion of the frame is set to $\alpha'$, and a distance between the center of the other image forming device and one end portion of the frame is set to $\gamma'$, it is desirable that the values of $\alpha'$ and $\gamma'$ are similar to the values of $\alpha$ and $\gamma$ described above. Furthermore, the center of the image forming device indicates a bisection point along the axis line direction of the frame in a portion where the projection image of the image forming device obtained at the time of projecting the image forming device and the frame to a virtual flat surface, overlaps with the projection image of the frame, in a state where the image forming device is attached to the first substrate.

The shape of the bonding member is essentially arbitrary insofar as the projection image of the bonding member is included in the projection image of the frame, and for example, a rod-like bonding member and a long and thin plate-like bonding member can be exemplified. Examples of a material configuring the bonding member are also capable of including a metal or an alloy, plastic, and a combination thereof.

In the display device of the present disclosure, it is possible to set an aspect in which a signal for displaying an image on the image display device (a signal for forming a virtual image in the optical device) is received from the outside. In such an aspect, information or data relevant to the image displayed on the image display device, for example, is recorded, managed, and stored in a so-called cloud computer or a server, and the display device includes a communication unit, for example, a mobile phone or a smart phone, or combines the display device with the communication unit, and thus, the delivery and the exchange of various information items or data items between the cloud computer or the server and the display device can be performed, and a signal based on various information items or data items, that is, the signal for displaying an image on the image display device (the signal for forming a virtual image in the optical device) can be received. Alternatively, it is possible to set an aspect in which the signal for displaying an image on the image display device (the signal for forming a virtual image in the optical device) is stored in the display device. Furthermore, the image displayed on the image display device includes various information items or various data items. Alternatively, the display device may include an imaging device, an image imaged by the imaging device may be transmitted to the cloud computer or the server through the communication unit, various information items or data items corresponding to the image imaged by the imaging device may be searched in the cloud computer or the server, various information items or data items, which have been searched, may be transmitted to the display device through the communication unit, and various information items or data items, which have been searched, may be displayed on the image display device as an image.

When the image imaged by the imaging device is transmitted to the cloud computer or the server through the communication unit, the image imaged by the imaging device may be displayed on the image display device, and may be confirmed in the optical device. Specifically, it is possible to set an aspect in which an outer edge of a space region to be imaged by the imaging device is displayed on the dimming device in the shape of a frame. Alternatively, it is possible to set an aspect in which a light shielding rate of a region of the dimming device corresponding to the space region to be imaged by the imaging device is higher than a light shielding rate of a region of the dimming device corresponding to the outside of the space region to be imaged by the imaging device. In such an aspect, the space region to be imaged by the imaging device is observed darker than the outside of the space region to be imaged by the imaging device, by the observer. Alternatively, it is possible to set an aspect in which the light shielding rate of the region of the dimming device corresponding to the space region to be imaged by the imaging device is lower than the light shielding rate of the region of the dimming device corresponding to the outside of the space region to be imaged by the imaging device. In such an aspect, the space region to be imaged by the imaging device is observed brighter than the outside of the space region to be imaged by the imaging device, by the observer. Accordingly, the observer is capable of easily and reliably recognizing where in the outside is imaged by the imaging device.

It is preferable that the position of the region of the dimming device corresponding to the space region to be imaged by the imaging device is corrected. Specifically, the display device, for example, includes a mobile phone or a smart phone, or combines the display device with the mobile phone or the smart phone, and a personal computer, and thus, it is possible to display the space region imaged by the imaging device on the mobile phone or the smart phone, and the personal computer. Then, in a case where there is a difference between the space region displayed on the mobile phone or the smart phone, and the personal computer, and the region of the dimming device corresponding to the space region to be imaged by the imaging device, a difference between the space region displayed on the mobile phone or the smart phone, and the personal computer, and the region of the dimming device corresponding to the space region to be imaged by the imaging device may be eliminated by moving and rotating the region of the dimming device corresponding to the space region to be imaged by the imaging device, or by enlarging/reducing the region, by using the control circuit for controlling the light shielding rate of the dimming device (the light transmission rate) (which can be substituted with the mobile phone or the smart phone, and the personal computer).

The display device of the present disclosure including the various modification examples described above, for example, can be used for receiving and displaying an electronic mail, displaying various information items or the like in various sites on the internet, and displaying various descriptions, symbols, signs, marks, emblems, designs, and the like at the time of driving, manipulating, maintaining, and disassembling an observation target of various devices or the like; displaying various descriptions, symbols, signs, marks, emblems, designs, and the like relevant to the observation target such as a person or articles; displaying a moving image or a still image; displaying the subtitle of a motion picture or the like; displaying the descriptive text and the closed caption relevant to a video synchronized with the video; or displaying various descriptions relevant to the observation target in the play or the kabuki, the Japanese traditional masked dance-drama, the comic drama, the opera, the concert, the ballet, various theatrical plays, the amusement park, the museum, the sightseeing spot, the resort, the tourist information, and the like, and the descriptive text or the like for describing the contents or the progress status, the background, and the like, and can be used for displaying the closed caption. In the play or the kabuki, the Japanese traditional masked dance-drama, the comic drama, the opera, the concert, the ballet, various theatrical plays, the amusement park, the museum, the sightseeing spot, the resort, the tourist information, and the like, a character as an image relevant to the observation target may be displayed on the display device at a suitably timing. Specifically, for example, an image control signal is transmitted on the display device according to the manipulation of the operator or under the control of a computer or the like, on the basis of a predetermined schedule and time allocation, according to the progress status of the motion picture or the like or according to the progress status of the play or the like, and the image is displayed on the display device. In addition, various descriptions relevant to the observation target of various devices, the person or the articles, and the like are displayed, but the observation target of various devices, the person or the articles, and the like is shot (imaged) by the imaging device, and the shot (imaged) contents are analyzed in the display device, and thus, various descriptions relevant to the observation target of various devices, the person or the articles, and the like, prepared in advance, can be displayed on the display device.

The image signal with respect to the image forming device is capable of including not only the image signal (for example, character data), but also, for example, brightness data (brightness information), chromaticity data (chromaticity information), or brightness data and chromaticity data relevant to an image to be displayed. The brightness data can be brightness data corresponding to a brightness of a predetermined region including the observation target seen through the optical device, and the chromaticity data can be a chromaticity data corresponding to a chromaticity of a predetermined region including the observation target seen through the optical device. Thus, it is possible to control the brightness of the image to be displayed by including the brightness data relevant to the image, it is possible to control the chromaticity (the color) of the image to be displayed by including the chromaticity data relevant to the image, and it is possible to control the brightness and the chromaticity (the color) of the image to be displayed by including the brightness data and the chromaticity data relevant to the image. In the case of the brightness data corresponding to the brightness of the predetermined region including the observation target seen through the image display device, the value of the brightness data may be set such that the value of the brightness of the image increases (that is, the image is displayed brighter) as the value of the brightness of the predetermined region including the observation target seen through the image display device increases. In addition, in the case of the chromaticity data corresponding the chromaticity of the predetermined region including the observation target seen through the image display device, the value of the chromaticity data may be set such that the chromaticity of the predetermined region including the observation target seen through the image display device and the chromaticity of the image to be displayed are approximately in a complementary relationship. The complementary indicates a combination of colors in a relationship of being positioned on opposite sides in a color circle. Complementary colors such as green with respect to red, purple with respect to yellow, and orange with respect to blue can be set. One color is mixed with another color at a suitable ratio, and such that a color causing a decrease in a chromaticness is also represented such as the light is referred to as white, and the object is referred to as black, but complementarity of a visual effect at the time of juxtaposing colors is different from complementarity at the time of mixing colors. The color is also referred to as a complementary color, a contrast color, and an opposite color. Here, the opposite color directly indicates a color that the complementary opposes, but an indicating range of the complementary is slightly wide. A combination of the complementary colors has a synergetic effect of picking out the colors from each other, and this is referred to as a complementary balance.

For example, a head mounted display (HMD) can be configured according to the display device of the present disclosure. Accordingly, it is possible to reduce the weight and the size of the display device, it is possible to considerably reduce the discomfort at the time of mounting the display device, and it is possible to reduce the manufacturing cost. Alternatively, the display device of the present disclosure can be applied to a head-up display (HUD) provided in a cockpit or the like of a vehicle or an aircraft. Specifically, in a case where the dimming device is provided in an HUD provided with the virtual image forming region, in which the virtual image is formed on the basis of the light exiting from the image forming device, on front glass of the cockpit or the like of the vehicle or the aircraft, or in an HUD provided with a combiner including the virtual image forming region, in which the virtual image is formed on the basis of the light exiting from the image forming device, on the front glass of the cockpit or the like of the vehicle or the aircraft, the virtual image forming region or the combiner may overlap with at least a part of the dimming device. Alternatively, the display device of the present disclosure can be used as a stereoscopic display device. In this case, as necessary, a polarization plate or a polarization film may be detachably attached to the optical device, or the polarization plate or the polarization film may be bonded to the optical device.

Example 1

Figure 1:
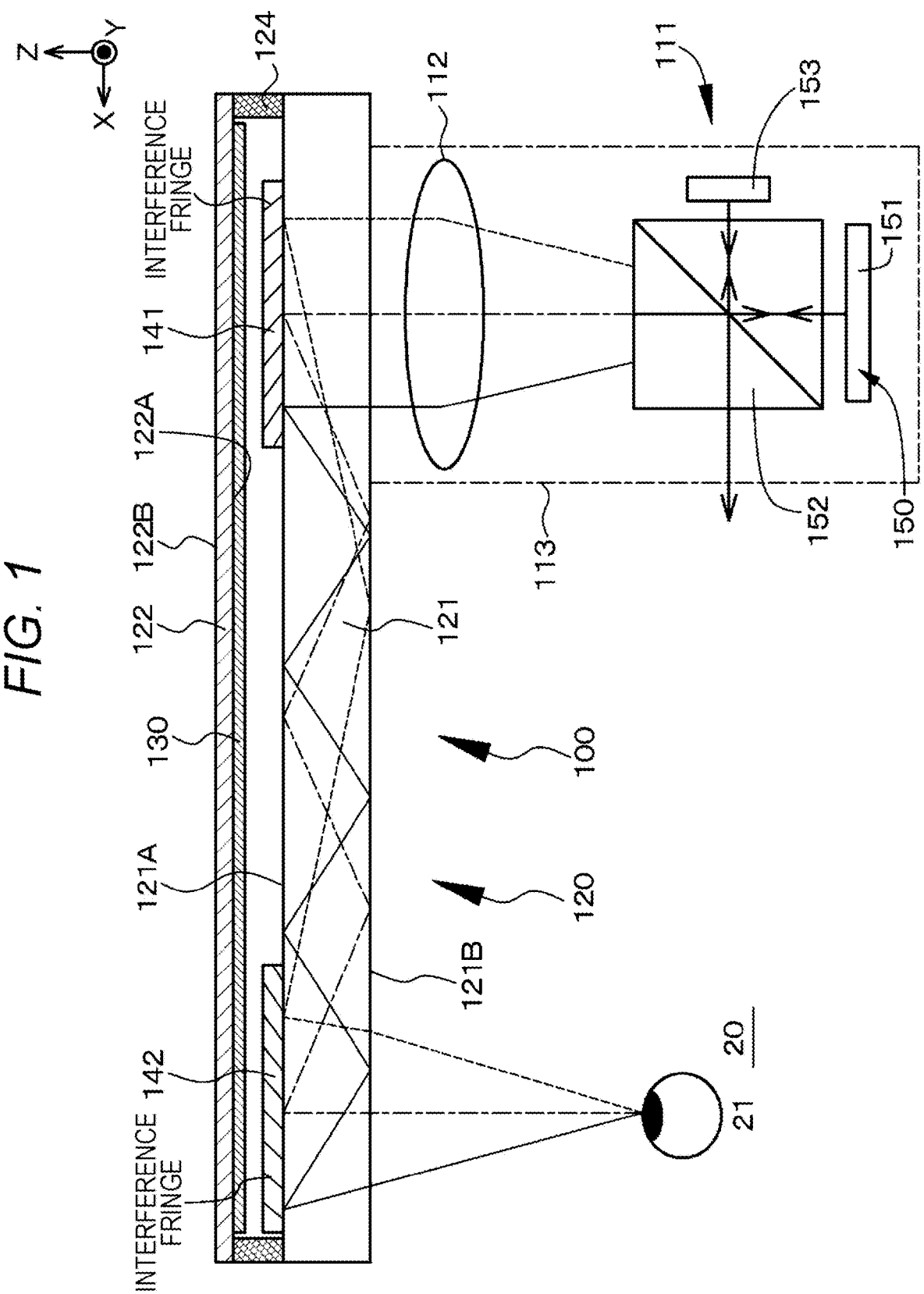
FIG. 1 is a conceptual diagram of an image display device of a display device of Example 1.

Example 1 relates to the optical device of the present disclosure, and specifically, the optical device-A of the present disclosure, furthermore, relates to the image display device of the present disclosure, and the display device of the present disclosure. A conceptual diagram of an image display device of Example 1 is illustrated in FIG. 1, a schematic view of a display device of Example 1 (specifically, a head mounted display (HMD)) as seen from the above is illustrated in FIG. 5, a schematic view of the display device of Example 1 as seen from the side is illustrated in FIG. 6A, and a propagation state of light on a first substrate (a light guide plate) configuring the image display device is schematically illustrated in FIG. 6B. Further, a schematic sectional view illustrating a part of a reflective volume hologram diffraction grating film of the display device of Example 1 in an enlarged manner is illustrated in FIG. 7.

More specifically, display devices of Example 1 or Example 2 to Example 13 described later are a head mounted display (HMD), and includes:

(a) a frame 10 (for example, an eye glass type frame 10) to be mounted on a head portion of an observer 20; and (b) image display devices 100, 200, 300, 400, and 500 attached to the frame 10.

Furthermore, specifically, the display devices of Example 1 or Example 2 to Example 13 described later is a binocular display device including two image display devices, and may be a monocular display device including one image display device. Image forming devices 111 and 211, for example, display a monochroic (for example, green) image (a virtual image). Then, the image display devices 100, 200, 300, 400, and 500 of Example 1 or Example 2 to Example 13 described later, include:

(A) image forming devices 111 and 211; and (B) optical devices 120, 320, 520, and 530 in which light exiting from the image forming devices 111 and 211 is incident, and exits.

Further, the display devices of Example 1 or Example 2 to Example 13 described later, include:

(C) optical systems (parallel light exiting optical systems) 112 and 254 setting the light exiting from the image forming devices 111 and 211 to parallel light, and a light flux set to the parallel light by the optical systems 112 and 254, is incident on the optical devices 120, 320, 520, and 530, and exits.

Furthermore, the image display devices 100, 200, 300, 400, and 500 may be fixedly attached to the frame 10, or may be detachably attached to the frame 10. Here, the optical systems 112 and 254 are disposed between the image forming devices 111 and 211 and the optical devices 120, 320, 520, and 530. Then, the light flux set to the parallel light by the optical systems 112 and 254, is incident on the optical devices 120, 320, 520, and 530, and exits. In addition, the optical devices 120, 320, 520, and 530 are a semi-transmissive (see-through) optical device. Specifically, a portion of the optical device facing at least both eyes of the observer 20 (more specifically, first substrates 121 and 321, second substrates 122 and 322, and second deflection units 142 and 342 described later) is a semi-transmissive (see-through) portion.

Then, the optical devices 120 and 320 of the Example 1 or Example 2 to Example 13 described later, includes:

the first substrates 121 and 321 including first surfaces 121A and 321A, and second surfaces 121B and 321B facing the first surfaces 121A and 321A;

the second substrates 122 and 322 including first surfaces 122A and 322A, and second surfaces 122B and 322B facing the first surfaces 122A and 322A, the first surfaces 122A and 322A being disposed to face the first surfaces 121A and 321A of the first substrates 121 and 321;

deflection units 141, 142, 341, and 342 disposed on the first surface of the first substrates 121 and 321;

a sealing member 124 sealing outer edge portions of the first surfaces 121A and 321A of the first substrates 121 and 321 and outer edge portions of the first surfaces 122A and 322A of the second substrates 122 and 322; and a moisture absorption member 130 disposed in a space surrounded by the first substrates 121 and 321, the second substrates 122 and 322, and the sealing member 124.

In the optical devices of Example 1 or Example 2 to Example 13 described later, the first substrates 121 and 321 function as a light guide plate. That is, the light incident from the image forming devices 111 and 211 propagates through the first substrates 121 and 321 (the light guide plate) by total reflection, and then, exits towards the observer. The first substrates 121 and 321 including optical glass or a plastic material include two parallel surfaces (the first surfaces 121A and 321A and the second surfaces 121B and 321B) which extend in parallel to a light propagation direction (an X axis) by internal total reflection of the first substrates 121 and 321. The first surfaces 121A and 321A face the second surfaces 121B and 321B.

In the optical devices of Example 1 or Example 2 to Example 4 described later, the deflection units are configured of first deflection units 141 and 341 and second deflection units 142 and 342, the first deflection units 141 and 341 deflect light incident on the first substrates 121 and 321 such that the light incident on the first substrates 121 and 321 is totally reflected in the first substrates 121 and 321, and the second deflection units 142 and 342 deflect light propagating through the first substrates 121 and 321 by total reflection in order to allow the light propagating through the first substrates 121 and 321 by the total reflection to exit from the first substrates 121 and 321. That is, the optical devices of Example 1 or Example 2 to Example 4 described later are the optical device-A of the present disclosure. Then, virtual image forming regions of the optical devices 120 and 320 are configured by the second deflection units 142 and 342.

That is, the display devices of Example 1 or Example 2 to Example 4 described later include the optical devices 120 and 320, including:

(B-1) the first substrates (the light guide plates) 121 and 321 in which the light incident from the image forming devices 111 and 211 propagates through the first substrates 121 and 321 by the total reflection, and then, exits towards the observer 20;

(B-2) the first deflection units 141 and 341 deflecting the light incident on the first substrates 121 and 321 such that the light incident on the first substrates (light guide plates) 121 and 321 is totally reflected in the first substrates 121 and 321; and (B-3) the second deflection units 142 and 342 deflecting the light propagating through the first substrates 121 and 321 by the total reflection over a plurality of times in order to allow the light propagating through the first substrates (the light guide plates) 121 and 321 by the total reflection to exit from the first substrates 121 and 321, and the virtual image forming region of the optical device is configured by the second deflection units 142 and 342.

In Example 1 or Example 2 to Example 4 described later, in a light ray (a center light ray CL) which exits from the center of the image forming devices 111 and 211, and passes through a nodal point of the optical systems 112 and 254 on the image forming device side, a point where a center incident light ray which is perpendicularly incident on the optical devices 120 and 320 is incident on the optical devices 120 and 320 is set to an optical device center point O, an axis line which passes through the optical device center point O, and is parallel to the axis line direction of the optical devices 120 and 320 is set to the X axis, and an axis line which passes through the optical device center point O, and is coincident with the normal line of the optical devices 120 and 320 is set to a Z axis. Furthermore, a center point of the first deflection units 141 and 341 is the optical device center point O. That is, as illustrated in FIG. 6B, in the image display devices 100, 200, 300, and 400, the center incident light ray CL which exits from the center of the image forming devices 111 and 211, and passes through the nodal point of the optical systems 112 and 254 on the image forming device side, perpendicularly collides with the first substrates 121 and 321. In other words, the center incident light ray CL is incident on the first substrates 121 and 321 at an incident angle of 0 degrees. Then, in this case, the center of an image (a virtual image) to be displayed is coincident with a perpendicular line direction of the first surfaces 121A and 321A of the first substrates 121 and 321.

In Example 1, the first deflection unit 141 and the second deflection unit 142 are disposed on (bonded onto) the first surface 121A of the first substrate 121. Then, the first deflection unit 141 diffractively reflects parallel light incident on the first substrate 121 from the second surface 121B such that the parallel light is totally reflected in the first substrate 121. The second deflection unit 142 diffractively reflects the light propagating through the first substrate 121 by the total reflection over a plurality of times, and allows the light to exit from the second surface 121B in a state of the parallel light from the first substrate 121. Here, at least one of the first deflection unit 141 and the second deflection unit 142, specifically in Example 1, the first deflection unit 141 and the second deflection unit 142 include respectively a material having water absorbability (a photopolymer material). That is, each of the first deflection unit 141 and the second deflection unit 142 includes, specifically, one hologram diffraction grating film prepared from a resin material, and more specifically, one reflective volume hologram diffraction grating film. In the following description, the first deflection unit 141 including a reflective volume hologram diffraction grating film, for convenience, is referred to as the "first diffraction grating member 141", and the second deflection unit 142 including a reflective volume hologram diffraction grating film, for convenience, is referred to as the "second diffraction grating member 142". Furthermore, in each of the reflective volume hologram diffraction grating films including a photopolymer material, an interference fringe corresponding to one type of wavelength band (or wavelength) is formed, and is prepared by a method of the related art. The pitch of the interference fringe formed in the reflective volume hologram diffraction grating film is constant, and the interference fringe is in a linear shape, and is parallel to a Y axis. Furthermore, the axis lines of the first diffraction grating member 141 and the second diffraction grating member 142 are in parallel to the X axis, and the normal lines are parallel to the Z axis.

FIG. 7 illustrates a schematic partial sectional view in which the reflective volume hologram diffraction grating film is enlarged. An interference fringe having an inclined angle (a slant angle) $\phi$ is formed on the reflective volume hologram diffraction grating film. Here, the inclined angle $\phi$ indicates an angle between a front surface of the reflective volume hologram diffraction grating film and the interference fringe. The interference fringe is formed over a front surface of the reflective volume hologram diffraction grating film from the inside thereof. The interference fringe satisfies a Bragg's condition. Here, the Bragg's condition indicates a condition of satisfying Expression (A) described below. In Expression (A), m represents a positive integer, $\lambda$ represents a wavelength, d represents a pitch of a grating surface (an interval of a virtual flat surface including the interference fringe in a normal line direction), $\Theta$ represents a complementary angle of the angle incident on the interference fringe. In addition, a relationship of $\Theta$ in a case where light enters the diffraction grating member at an incident angle $\psi$, the inclined angle $\phi$, and the incident angle $\psi$ is represented by Expression (B).

$$m \cdot \lambda = 2 \cdot d \cdot \sin(\Theta) \tag{A}$$

$$\Theta = 90° - (\phi + \psi) \tag{B}$$

In the first substrate 121, the parallel light propagates through the first substrate 121 by the total reflection, and then, exits. At this time, the first substrate 121 is thin, and an optical path passing through the first substrate 121 is long, and thus, the number of times of total reflection up to the second diffraction grating member 142 is different according to each angular field. More specifically, in the parallel light incident on the first substrate 121, the number of times of reflection of the parallel light incident at an angle in a direction close to the second diffraction grating member 142 is less than the number of times of reflection of the parallel light incident on the first substrate 121 at an angle in a direction separated from the second diffraction grating member 142. This is because, the parallel light diffractively reflected on the first diffraction grating member 141, which is the parallel light incident on the first substrate 121 at the angle in the direction close to the second diffraction grating member 142 has a smaller angle with respect to the normal line of the first substrate 121 when the light propagating through the first substrate 121 collides with an inner surface of the first substrate 121, than the parallel light incident on the first substrate 121 at an angle in the reverse direction. In addition, the shape of the interference fringe formed in the second diffraction grating member 142 and the shape of the interference fringe formed in the first diffraction grating member 141 are in a symmetric relationship with respect to a virtual flat surface which is perpendicular to the axis line of the first substrate 121.

In Example 1 or Example 3 described later, the image forming device 111 is the image forming device of the first configuration, and includes a plurality of pixels arranged in the shape of a two-dimensional matrix. Specifically, the image forming device 111 is configured of a reflective spatial light modulation device 150, and a light source 153 including a light emitting diode allowing white light to exit. The entire respective image forming devices 111 is stored in a housing 113 (in FIG. 1, illustrated by a dot-and-dash line), an opening portion (not illustrated) is provided on the housing 113, and light exits from the optical system (the parallel light exiting optical system and the collimation optical system) 112 through the opening portion. The reflective spatial light modulation device 150 is configured of a liquid crystal display device (LCD) 151 including LCOS as a light valve, and a polarization beam splitter 152 which reflects a part of the light from the light source 153 and guides the light to the liquid crystal display device 151, and allows a part of the light reflected by the liquid crystal display device 151 to pass therethrough, and guides the light to the optical system 112. The liquid crystal display device 151 includes a plurality of (for example, 640×480) pixels (liquid crystal cells) arranged in the shape of a two-dimensional matrix. The polarization beam splitter 152 has a known configuration and structure. Non-polarized light exiting from the light source 153 collides with the polarization beam splitter 152. In the polarization beam splitter 152, a P polarization component passes therethrough, and exits to the outside. On the other hand, an S polarization component is reflected by the polarization beam splitter 152, is incident on the liquid crystal display device 151, is reflected in the liquid crystal display device 151, and exits from the liquid crystal display device 151. Here, in the light exiting from the liquid crystal display device 151, a plurality of P polarization components are included in the light exiting from a pixel displaying "white", a plurality of S polarization components are included in the light exiting from a pixel displaying "black". Accordingly, in the light which exits from the liquid crystal display device 151, and collides with the polarization beam splitter 152, the P polarization component passes through the polarization beam splitter 152, and is guided to the optical system 112. On the other hand, the S polarization component is reflected by the polarization beam splitter 152, and is returned to the light source 153. The optical system 112, for example, is configured of a convex lens, and in order to generate parallel light, the image forming device 111 (more specifically, the liquid crystal display device 151) is disposed in a site (a position) of the optical system 112 with a focal point distance.

The frame 10 includes a front portion 11 disposed on the front of the observer 20, two temple portions 13 rotatably attached to both ends of the front portion 11 through a hinge 12, and a drop end portion (also referred to as a tip cell, an earmuff, and an ear pad) 14 attached to the tip end portion of each temple portion 13. In addition, a nose pad (not illustrated in FIG. 5) is attached. That is, an assembly of the frame 10 and the nose pad, basically, has a structure approximately identical to that of general eye glasses. Further, each housing 113 is detachably attached to the temple portion 13 by an attaching member 19. The frame 10 is prepared from a metal or plastic. Furthermore, each of the housings 113 may be attached to the temple portion 13 by the attaching member 19 not to be detachable. In addition, in the observer who has and mounts the eye glasses, each of the housings 113 may be detachably attached to the temple portion 13 of the frame 10 of the eye glasses of the observer by the attaching member 19. Each of the housings 113 may be attached to the outside of the temple portion 13, or may be attached to the inside of the temple portion 13. Alternatively, the first substrates 121 and 321 may be fitted into a rim provided in the front portion 11.

Further, wiring (a signal line, a power source line, or the like) 15 extending from one image forming device 111A, extends to the external from a tip end portion of the drop end portion 14 through the temple portion 13, and the inside of the drop end portion 14, and is connected to a control device (a control circuit and a control unit) 18. Further, each of image forming devices 111A and 111B includes a headphone portion 16, and wiring 16' for a headphone portion extending from each of the image forming devices 111A and 111B, extends to the headphone portion 16 from the tip end portion of the drop end portion 14 through the temple portion 13, and the inside of the drop end portion 14. More specifically, the wiring 16' for a headphone portion extends to the headphone portion 16 from the tip end portion of the drop end portion 14 in order to wrap around the behind of the auricle (the ear shell). According to such a configuration, it is possible to obtain a clear display device without making an impression that the headphone portion 16 or the wiring 16' for a headphone portion is disordered.

As described above, the wiring (the signal line, the power source line, or the like) 15 is connected to the control device (the control circuit) 18. The control device 18, for example, is provided with an image information storage device 18A. Then, in the control device 18, processing for displaying an image is performed. The control device 18 and the image information storage device 18A can be configured of a known circuit.

An imaging device 17 configured of a solid imaging element including a CCD or a CMOS sensor, and a lens (not illustrated), is attached to a center portion 11' of the front portion 11 by a suitable attaching member (not illustrated). A signal from the imaging device 17 is transmitted to the control device (the control circuit) 18 through wiring (not illustrated) extending from the imaging device 17.

As illustrated in FIG. 1, in the optical devices of Example 1 or Example 2 to Example 13 described later, a moisture absorption member 130 is disposed on the first surfaces 122A and 322A of the second substrates 122 and 322. Specifically, the moisture absorption member 130 is bonded to the entire first surfaces 122A and 322A of the second substrates 122 and 322. In addition, a water absorption rate of the moisture absorption member 130 is higher than a water absorption rate of a material configuring the deflection units 141, 142, 341, and 342. The moisture absorption member 130 includes polyvinyl alcohol (PVA) in the shape of a film or a sponge. The deflection units 141, 142, 341, and 342 include a photopolymer material. Furthermore, the moisture absorption member 130 can include at least one type of material selected from the group consisting of nanoporous silica, molecular sieve, zeolite, active carbon, active alumina, diatomaceous earth, montmorillonite, and bentonite, and specifically, for example, can include nanoporous silica. Such a solid moisture absorption member may be fixed to the first surfaces 122A and 322A of the second substrates 122 and 322, for example, by using an adhesive agent. Alternatively, the moisture absorption member 130 can include a resin film having a light transmission rate of greater than or equal to 50%, and specifically, for example, can include PVA, and may be fixed to the first surfaces 122A and 322A of the second substrates 122 and 322, for example, by using an adhesive agent, and the fixation can be performed on the basis of a transfer method.

The first substrates 121 and 321 and the second substrates 122 and 322 include a transparent substrate. Specifically, the first substrates 121 and 321, for example, include a cycloolefin polymer, and the second substrates 122 and 322, for example, include a polycarbonate resin, or a laminate structure of a polycarbonate resin and an acrylic resin. In addition, the sealing member 124, for example, includes an epoxy-based resin. When the surface of the first substrates 121 and 321 on which light is incident is set to a first substrate incident surface, and the surface of the first substrates 121 and 321 from which light exits is set to a first substrate exit surface, the first substrate incident surface and the first substrate exit surface are configured of the second surfaces 121B and 321B.

Alternatively, as illustrated in (A) and (B) of FIG. 2, and (A) and (B) of FIG. 3, in the optical devices of Example 1 or Example 2 to Example 13 described later, the moisture absorption member 130 may be disposed in a region other than a region in which the first deflection units 141 and 341 and the second deflection units 142 and 342 of the first surfaces 121A and 321A of the first substrates 121 and 321 are provided. Furthermore, in examples illustrated in (A) of FIG. 2 and (A) of FIG. 3, the moisture absorption member 130 is disposed in a region along the inside of a part of the sealing member 124 of the first surfaces 121A and 321A of the first substrates 121 and 321. On the other hand, in examples illustrated in (B) of FIG. 2 and (B) of FIG. 3, the moisture absorption member 130 is also disposed in a region other than a region of the first substrates 121 and 321 to which the light from the first deflection units 141 and 341 to the second deflection units 142 and 342 is guided (the light guide region of the first substrate). That is, the moisture absorption member 130 is disposed into the shape of a frame to surround the light guide region of the first deflection units 141 and 341, the second deflection units 142 and 342, and the first substrates 121 and 321. It is desirable that a gap of greater than or equal to 1 μm is provided between the moisture absorption member 130 and the deflection units 141, 341, 142, and 342. Furthermore, in the examples illustrated in (A) and (B) of FIG. 2, the moisture absorption member 130 is not disposed on the first surfaces 122A and 322A of the second substrates 122 and 322. On the other hand, in the examples illustrated in (A) and (B) of FIG. 3, the moisture absorption member 130 is disposed on the first surfaces 122A and 322A of second substrates 122 and 322.

Alternatively, in the optical devices of Example 1 or Example 2 to Example 13 described later, the moisture absorption member 130, can be disposed in, a region along the inside of the sealing member 124 of the first surfaces 122A and 322A of the second substrates 122 and 322, a region along the inside of the sealing member 124 of the first surfaces 121A and 321A of the first substrates 121 and 321, or the region along the inside of the sealing member 124 of the first surfaces 122A and 322A of the second substrates 122 and 322, and the region along the inside of the sealing member 124 of the first surfaces 121A and 321A of the first substrates 121 and 321.

Even in such a case, it is desirable that a gap of greater than or equal to 1 μm is provided between the moisture absorption member 130 and the sealing member 124.

In addition, as illustrated in FIG. 4, a protective film 132 can be disposed on the surface of the first deflection units 141 and 341 and the surface of the second deflection units 142 and 342, which face the second substrates 122 and 322. The moisture absorption member 130 and the protective film 132 can be configured of the same material, and specifically, can be configured of PVA. Then, in this case, it is preferable that a thickness $t_1$ of the moisture absorption member 130 is greater than a thickness $t_2$ of the protective film 132. Specifically, it is preferable to satisfy $t_2 \leq 10$ μm, and $t_2 < t_1 \leq 1$ mm.

More specifically, $t_1 = 5$ μm, and $t_2 = 2.5$ μm are set.

As described above, in the optical device of Example 1, the optical device configuring the image display device, and the optical device configuring the display device, the moisture absorption member is disposed in the space surrounded by the first substrate, the second substrate, and the sealing member, and thus, it is possible to sufficiently suppress the influence of the moisture on the optical characteristics of the deflection unit. That is, it is possible to reliably avoid the occurrence of the problem such as a change in the characteristics of the deflection unit, and for example, a change in the pitch of the interference fringe and a change in the inclined angle (the slant angle) of the interference fringe according to the swelling or the like of the deflection unit due to the moisture absorption of the photopolymer material, while reducing the weight of the display device, and it is possible to provide a display device having stable characteristics.

Example 2

Example 2 is a modification of Example 1. A conceptual diagram of the image display device 200 in the display device (a head mounted display) of Example 2 is illustrated in FIG. 8, and in Example 2, the image forming device 211 is configured of the image forming device of the second configuration. That is, a light source 251, and a scanning unit 253 scanning parallel light exiting from the light source 251 are provided. More specifically, the image forming device 211 is configured of:

the light source 251;

a collimation optical system 252 setting light exiting from the light source 251 to parallel light;

the scanning unit 253 scanning the parallel light exiting from the collimation optical system 252; and the relay optical system 254 which relays the parallel light scanned by the scanning unit 253, and allows the parallel light to exit.

Furthermore, the entire image forming device 211 is stored in a housing 213 (in FIG. 8, illustrated by a dot-and-dash line), an opening portion (not illustrated) is provided on the housing 213, and light from the relay optical system 254 exits through the opening portion. Then, each housing 213 is detachably attached to the temple portion 13 by the attaching member 19.

The light source 251 is configured of a light emitting element emitting white light. Then, the light exiting from the light source 251 is incident on the collimation optical system 252 with positive optical power, and exits as the parallel light, as a whole. Then, the parallel light is reflected on a total reflection mirror 256, is subjected to horizontal scanning and perpendicular scanning by the scanning unit 253 including an MEMS which is capable of setting a micro mirror to be rotatable in a two-dimensional direction, and of two-dimensionally scanning the incident parallel light, and is set to one type of two-dimensional image, and thus, a virtual pixel (the number of pixels, for example, can be the same number as that of Example 1) is generated. Then, light from the virtual pixel passes through the relay optical system (the parallel light exiting optical system) 254 configured of a known relay optical system, and a light flux set to the parallel light is incident on the optical device 120.

The optical device 120 in which the light flux set to the parallel light in the relay optical system 254 is incident and guided, and exits, has the same configuration and the same structure as those of the optical device described in Example 1, and thus, the detailed description will be omitted. In addition, as described above, the display device of Example 2 has substantially the same configuration and the same structure as those of the display device of Example 1 except that the image forming device 211 is different, and thus, the detailed description will be omitted.

Example 3

Example 3 is also a modification of Example 1. A conceptual diagram of the image display device 300 in the display device (a head mounted display) of Example 3 is illustrated in FIG. 9. In Example 3, the image forming device 111 is configured of the image forming device of the first configuration, as with Example 1. In addition, the basic configuration and the basic structure of the optical device 320 are identical to those of the optical device 120 of Example 1 except that the configuration and the structure of the first deflection unit 341 are different.

In Example 3 or Example 4, the first deflection unit 341 reflects the light incident on the first substrate (the light guide plate) 321. That is, in the first deflection unit 341, the parallel light incident on the first substrate 321 is reflected such that the parallel light incident on the first substrate 321 is totally reflected in the first substrate 321. In Example 3 or Example 4 described later, the first deflection unit 341 is configured of a reflector disposed in the first substrate 321, and more specifically, a light reflective film (one type of mirror) which includes aluminum (Al) and reflects the light incident on the first substrate 321. The first deflection unit 341 may cut out a portion in which the first deflection unit 341 of the first substrate 321 is disposed, and thus, an inclined surface on which the first deflection unit 341 is formed may be provided on the first substrate 321, and a light reflective film may be subjected to vacuum vapor deposition on the inclined surface, and then, the cut portion of the first substrate 321 may adhere to the first deflection unit 341.

On the other hand, the second deflection unit 342 reflectively diffracts light propagating through the first substrate 321 by total reflection over a plurality of times. That is, in the second deflection unit 342, the parallel light propagating through the first substrate 321 by the total reflection is reflectively diffracted over a plurality of times, and exits towards a pupil 21 of the observer 20 in a state of the parallel light from the first substrate 321. The second deflection unit 342 includes a reflective volume hologram diffraction grating film, as with the second deflection unit 142 of Example 1.

As described above, the display device of Example 3 has substantially the same configuration and the same structure as those of the display device of Example 1 except that the optical device 320 is different, and thus, the detailed description will be omitted.

Example 4

Example 4 is a modification of Example 3. A conceptual diagram of the image display device in the display device (a head mounted display) of Example 4 is illustrated in FIG. 10. The light source 251, the collimation optical system 252, the scanning unit 253, the parallel light exiting optical system (the relay optical system 254), and the like in the image display device 400 of Example 4 have the same configuration and the same structure as those of Example 2 (the image forming device of the second configuration). In addition, the optical device 320 of Example 4 has the same configuration and the same structure as those of the optical device 320 of Example 3. The display device in Example 4 has substantially the same configuration and the same structure as those of the display device of Example 2 except for the differences described above, and thus, the detailed description will be omitted.

Example 5

Example 5 is a modification of the image display devices of Example 1 to Example 4. A schematic view of the display device of Example 5 as seen from the front is illustrated in FIG. 11, a schematic view of the display device of Example 5 as seen from the above is illustrated in FIG. 12, and a conceptual diagram of the image display device is illustrated in FIG. 13.

In Example 5, the optical device 520 configuring the image display device 500 is configured of a light guide member 521 on which the light exiting from the image forming devices 111A and 111B is incident, and a semi-transparent mirror 522 allowing light guided by the light guide member 521 to exit towards the pupil 21 of the observer 20. The image forming device can be the image forming device 211 described in Example 2. The semi-transparent mirror 522 may be in the shape of a flat surface, or may be in the shape of a concave surface.

The light guide member 521, includes:
the first substrate 121 including the first surface 121A, and the second surface 121B facing the first surface 121A;
the second substrate 122 which includes the first surface 122A, and the second surface 122B facing the first surface 122A, the first surface 122A being disposed to face the first surface 121A of the first substrate 121;
a deflection unit 523 disposed on the first surface 121A of the first substrate 121;
the sealing member 124 sealing the outer edge portion of the first surface 121A of the first substrate 121 and the outer edge portion of the first surface 122A of the second substrate 122; and
the moisture absorption member 130 disposed in a space surrounded by the first substrate 121, the second substrate 122, and the sealing member 124.

That is, the light guide member 521 is substantially configured of the half of the optical device 120 of Example 1 on the first deflection unit 141 side. In addition, the half of the optical device 120 of Example 1 on the second deflection unit 142 side is substituted with the semi-transparent mirror unit 522. The light guide member 521 adheres to the semi-transparent mirror 522 by an adhesive agent.

Here, the deflection unit 523 includes a material having water absorbability, and specifically, is configured of a hologram diffraction grating film including a resin material, as with the first deflection unit 141 of Example 1.

Then, the moisture absorption member 130 is disposed on the first surface 122A of the second substrate 122. Specifically, the moisture absorption member 130 is bonded to the entire first surface 122A of the second substrate 122.

Furthermore, the moisture absorption member 130 may be disposed in a region other than a region in which the deflection unit 523 of the first surface 121A of the first substrate 121 is disposed (according to a case, in addition, the light guide region of the first substrate), as with (A) and (B) of FIG. 2 and (A) and (B) of FIG. 3 of Example 1. That is, the moisture absorption member 130 may be disposed into the shape of a frame in order to surround the deflection unit 523 (according to a case, in addition, the light guide region of the first substrate). It is desirable that a gap of greater than or equal to 1 µm is provided between the moisture absorption member 130 and the deflection unit 523. Alternatively, the moisture absorption member 130 may be disposed in, a region along the inside of the sealing member 124 of the first surface 122A of the second substrate 122, a region along the inside of the sealing member 124 of the first surface 121A of the first substrate 121, or the region along the inside of the sealing member 124 of the first surface 122A of the second substrate 122, and the region along the inside of the sealing member 124 of the first surface 121A of the first substrate 121.

It is desirable that a gap of greater than or equal to 1 µm is provided between the moisture absorption member 130 and the sealing member 124.

In addition, as illustrated in FIG. 4 of Example 1, the protective film 132 may be disposed on the surface of the deflection unit 523 facing the second substrate 122. Then, in this case, as with Example 1, it is possible to set an aspect in which the moisture absorption member 130 and the protective film 132 include the same material, and the thickness $t_1$ of the moisture absorption member 130 is greater than the thickness $t_2$ of the protective film 132. Specifically, it is preferable to satisfy $t_2 \leq 10$ µm, and $t_2 < t_1 \leq 1$ mm.

Each of the image forming devices 111A and 111B is attached to the front portion 11, for example, by using screws. In addition, the light guide member 521 is attached to each of the image forming devices 111A and 111B. The display device of Example 5 has substantially the same configuration and the same structure as those of the display devices of Example 1 to Example 4 except for the differences described above, and thus, the detailed description will be omitted.

Example 6

Example 6 is also a modification of the image display devices of Example 1 to Example 4. A schematic view of the display device of Example 6 as seen from the above is illustrated in FIG. 14. Furthermore, in FIG. 14, the imaging device 17 is not illustrated. In addition, a conceptual diagram of a part of the optical device in the display device of Example 6 is illustrated in FIG. 15.

In Example 6, the optical device 530 configuring the image display device 500 is configured of a virtual image form member 531 on which light exiting from the image forming devices 111A and 111B is incident.

The virtual image form member 531, includes:

the first substrate 121 including the first surface 121A, and the second surface 121B facing the first surface 121A;

the second substrate 122 including the first surface 122A, and the second surface 122B facing the first surface 122A, the first surface 122A being disposed to face the first surface 121A of the first substrate 121;

a deflection unit 533 disposed on the first surface 121A of the first substrate 121;

the sealing member 124 sealing the outer edge portion of the first surface 121A of the first substrate 121 and the outer edge portion of the first surface 122A of the second substrate 122; and the moisture absorption member 130 disposed in a space surrounded by the first substrate 121, the second substrate 122, and the sealing member 124.

Here, the deflection unit 533 includes a material having water absorbability, and specifically, includes a hologram diffraction grating film including a resin material, and more specifically, includes a reflective hologram diffraction grating film.

Then, the moisture absorption member 130 is disposed on the first surface 122A of the second substrate 122. Specifically, the moisture absorption member 130 is bonded to the entire first surface 122A of the second substrate 122.

Furthermore, the moisture absorption member 130 may be disposed in a region other than the region in which the deflection unit 533 of the first surface 121A of the first substrate 121 is disposed, as with (A) and (B) of FIG. 2 and (A) and (B) of FIG. 3 of Example 1. That is, the moisture absorption member 130 may be disposed into the shape of a frame in order to surround the deflection unit 533. It is desirable that a gap of greater than or equal to 1 µm is provided between the moisture absorption member 130 and the deflection unit 533. Alternatively, the moisture absorption member 130 may be disposed in, a region along the inside of the sealing member 124 of the first surface 122A or the second substrate 122, a region along the inside of the sealing member 124 of the first surface 121A of the first substrate 121, or the region along the inside of the sealing member 124 of the first surface 122A of the second substrate 122 and the region along the inside of the sealing member 124 of the first surface 121A of the first substrate 121.

It is desirable that a gap of greater than or equal to 1 µm is provided between the moisture absorption member 130 and the sealing member 124.

In addition, the protective film 132 may be disposed on the surface of the deflection unit 533 facing the second substrate 122, as with FIG. 4 of Example 1. Then, in this case, it is possible to set an aspect in which the moisture absorption member 130 and the protective film 132 include the same material, and the thickness $t_1$ of the moisture absorption member 130 is greater than the thickness $t_2$ of the protective film 132, as with Example 1. Specifically, it is preferable to satisfy $t_2 \leq 10$ µm, and $t_2 < t_1 \leq 1$ mm.

Each of the image forming devices 111A and 111B is attached to the front portion 11, for example, by using screws. In addition, the virtual image form member 531 is attached to each of the image forming devices 111A and 111B. The image forming device substantially can be the image forming device 211 described in Example 2. The display device of Example 6 has substantially the same configuration and the same structure as those of the display devices of Example 1 to Example 4 except for the differences described above, and thus, the detailed description will be omitted.

In Example 6, the light exiting from the light source 251 which is disposed in the housing 213 propagates through the optical fiber (not illustrated), and for example, is incident on the scanning unit 253 attached to the portion 11' of the frame 10 in the vicinity of the nose pad, and the light scanned by the scanning unit 253 is incident on the deflection unit 533. Alternatively, the light exiting from the light source 251 disposed in the housing 213, propagates through the optical fiber (not illustrated), and for example, is incident on the scanning unit 253 attached on the upper side of the portion of the frame 10 corresponding to each of both eyes, and the light scanned by the scanning unit 253 is incident on the deflection unit 533. Alternatively, the light, which exits from the light source 251 disposed in the housing 213, is incident on the scanning unit 253 disposed in the housing 213, and is scanned by the scanning unit 253 is directly incident on the deflection unit 533. Then, light reflected by the deflection unit 533 including the reflective hologram diffraction grating film is incident on the pupil of the observer.

Example 7

Example 7 is a modification of Example 1 to Example 6. A conceptual diagram of the image display device is illustrated in FIG. 16, a schematic view of the display device as seen from the above is illustrated in FIG. 17, and a schematic view of the display device as seen from the side is illustrated in FIG. 18, and in the display device of Example 7, a light shielding member 601 is disposed or provided on the outside of the second surface 122B of the second substrate 122 in order to cover the first deflection units 141 and 341 or the deflection unit 523. Here, an orthogonal projection image of the first deflection units 141 and 341 or the deflection unit 523 with respect to the second substrate 122 is included in an orthogonal projection image of the light shielding member 601 with respect to the second substrate 122. Further, the moisture absorption member 130 is disposed in a region in the orthogonal projection image of the light shielding member 601 with respect to the second substrate 122, which is a region of the first surface 122A of the second substrate 122, a region other than the region in which the first deflection units 141 and 341 of the first surface 121A of the first substrate 121 or the deflection unit 523 are disposed, or the region of the first surface 122A of the second substrate 122 and the region other than the region in which the first deflection units 141 and 341 of the first surface 121A of the first substrate 121 or the deflection unit 523 are disposed.

Furthermore, the moisture absorption member 130 is not disposed in the light guide region of the first substrate of the first substrate.

Specifically, for example, the light shielding member 601 shielding the incidence of the external light on the optical device 120 is disposed in the region of the optical device 120 in which the light exiting from the image forming devices 111A and 111B is incident, and specifically, in the region where the first deflection unit 141 is disposed. Here, a projection image of the light shielding member 601 with respect to the optical device 120 includes the region of the optical device 120 in which the light exiting from the image forming devices 111A and 111B is incident. The light shielding member 601 is disposed on a side opposite to a side where the image forming devices 111A and 111B of the optical device 120 are disposed, in a state of being separated from the optical device 120. The light shielding member 601, for example, is prepared from an opaque plastic material, the light shielding member 601 integrally extends from the housing 113 of the image forming devices 111A and 111B, is attached to the housing 113 of the image forming devices 111A and 111B, integrally extends from the frame 10, is attached to the frame 10, or is attached to the optical device 120. Furthermore, in the illustrated examples, the light shielding member 601 integrally extends from the housing 113 of the image forming devices 111A and 111B. Thus, the light shielding member shielding the incidence of the external light on the optical device is disposed in the region of the optical device in which the light exiting from the image forming device is incident, and thus, the external light is not incident in the region of the optical device in which the light exiting from the image forming device is incident, and specifically, on the first deflection unit 141, and thus, undesired stray light or the like is not generated, and a decrease in the image display quality of the display device is not caused.

Alternatively, as illustrated in FIG. 19, a light shielding member 602 is disposed in a portion of the optical device 120 on a side opposite to a side where the image forming devices 111A and 111B are disposed. Specifically, an opaque ink is printed on the optical device 120 (specifically, the second surface 122B of the second substrate 122), and thus, it is possible to form the light shielding member 602. Furthermore, it is possible to combine the light shielding member 601 with the light shielding member 602. The light shielding member 602 may be formed on the first surface 122A of the second substrate 122.

Example 8

Example 8 is a modification of Example 1 to Example 7. A conceptual diagram of the image display device of Example 8 is illustrated in FIG. 20, a schematic view of the display device of Example 8 as seen from the above is illustrated in FIG. 21, and a schematic view of the display device as seen from the side is illustrated in FIG. 22A. In addition, schematic front views of the optical device and the dimming device are illustrated in FIG. 22B, a schematic sectional view of the dimming device is illustrated in FIG. 23A, and a schematic plan view of the dimming device is illustrated in FIG. 23B.

Here, in Example 8, a dimming device 700 is disposed on the second surface side of the second substrates 122 and 322. The dimming device 700 adjusts the light amount of the external light incident from the outside. Then, the virtual image forming regions of the optical devices 120, 320, and 520 overlap with the dimming device 700, and when a virtual image is formed in a part of the virtual image forming region on the basis of the light exiting from the image forming devices 111 and 211, the dimming device 700 performs control such that a light shielding rate of a virtual image projection region 711 of dimming device 700 including a projection image of the virtual image with respect to the dimming device 700 is higher than a light shielding rate of another region 712 of the dimming device 700. Furthermore, in the dimming device 700, the position of the virtual image projection region 711 is not fixed, but is changed according to a forming position of the virtual image, and the number of virtual image projection regions 711 is also changed according to the number of virtual images (or the number of a set of virtual image groups, the number of blocked virtual image groups, or the like).

When the dimming device 700 is operated, and the light shielding rate of the virtual image projection region of the dimming device 700 including the projection image of the virtual image with respect to the dimming device 700 is set to "1", for example, the light shielding rate of the other region 712 of the dimming device 700 is less than or equal to 0.95. Alternatively, the light shielding rate of the other region of the dimming device 700, for example, is less than or equal to 30%. On the other hand, when the dimming device 700 is operated, the light shielding rate of the virtual image projection region 711 of the dimming device 700 is 35% to 99%, and for example, is 80%. Thus, the light shielding rate of the virtual image projection region 711 may be constant, or as described later, may be changed according to the illuminance of the environment where the display device is disposed.

In Example 8 or Example 9 to Example 10 described later, the dimming device 700, which is one type of light shutter adjusting the light amount of the external light incident from the outside, is disposed on the optical devices 120, 320, and 520 on a side opposite to a side where the image forming devices 111 and 211 are disposed. Then, the second substrates 122 and 322 also function as a first substrate 701 for a dimming device of the dimming device 700, and thus, it is possible to reduce the weight of the entire display device, there is no concern that the user of the display device feels discomfort. In addition, it is possible to set a second substrate 703 for a dimming device to be thinner than the second substrate 122. The same is capable of applying to Example 9 to Example 10. However, the present disclosure is not limited thereto, and the second substrates 122 and 322 and the first substrate 701 for a dimming device of the dimming device 700 can be configured of different members. The size of the dimming device 700 may be identical to the size of the second substrates 122 and 322, or may be greater or smaller than the size of the second substrates 122 and 322. The point is that the virtual image forming region (the second deflection units 142 and 342) may be positioned in the projection image of the dimming device 700. The dimming device 700 is disposed in a region of the optical devices 120, 320, and 520 on a side opposite to the observer 20. That is, the optical device 120 and the dimming device 700 are disposed in this order from the observer side, but the dimming device 700 and the optical devices 120 and 320 may be disposed in this order. A connector (not illustrated) is attached to the dimming device 700, and the dimming device 700 is electrically connected to a control circuit (specifically, the control device 18) for controlling a light shielding rate of the dimming device 700 through the connector and the wiring.

In Example 8 or Example 9 to Example 10 described later, a schematic sectional view of the dimming device 700 is illustrated in FIG. 23A, and a schematic plan view of the dimming device 700 is illustrated in FIG. 23B, and the dimming device 700 includes:

the first substrate 701 for a dimming device;

the second substrate 703 for a dimming device facing the first substrate 701 for a dimming device;

a first transparent electrode 702 disposed on a facing surface of the first substrate 701 for a dimming device facing the second substrate 703 for a dimming device;

a second transparent electrode 704 disposed on a facing surface of the second substrate 703 for a dimming device facing the first substrate 701 for a dimming device; and a dimming layer 705 interposed between the first transparent electrode 702 and the second transparent electrode 704.

Then, the first transparent electrode 702 is configured of a plurality of strip-like first transparent electrode segments 702A extending in a first direction, the second transparent electrode 704 is configured of a plurality of strip-like second transparent electrode segments 704A extending in a second direction different from the first direction, and A light shielding rate of a portion of the dimming device corresponding to an overlap region between the first transparent electrode segment 702A and the second transparent electrode segment 704A (a minimum unit region 708 in which the light shielding rate of the dimming device is changed) is controlled on the basis of the control of a voltage which is applied to the first transparent electrode segment 702A and the second transparent electrode segment 704A. That is, the light shielding rate is controlled on the basis of a simple matrix method. The first direction is orthogonal to the second direction, and specifically, the first direction extends in a horizontal direction (the X-axis direction), and the second direction extends in a vertical direction (the Y-axis direction).

The second substrate 703 for a dimming device includes a plastic material. In addition, the first transparent electrode 702 and the second transparent electrode 704 include a transparent electrode configured of an indium-tin composite oxide (ITO), and are formed on the basis of a combination of a PVD method such as a sputtering method and a lift-off method. A protective layer 706 including a SiN layer, a $SiO_2$ layer, an $Al_2O_3$ layer, a $TiO_2$ layer or a laminate layer thereof is formed between the second transparent electrode 704 and the second substrate 703 for a dimming device. By forming the protective layer 706, it is possible to impart ion barrier properties preventing the movement of ions, waterproofness, moisture resistance, and scratch resistance to the dimming device 700. In addition, an outer edge portion between the second substrate 122 (the first substrate 701 for a dimming device) and the second substrate 703 for a dimming device is sealed with a sealing material 707 including an ultraviolet curable resin and a thermosetting resin such as an ultraviolet curable epoxy resin, or an epoxy resin which is cured by an ultraviolet ray and heat. The first transparent electrode 702 and the second transparent electrode 704 are connected to the control device 18 through the connector and the wiring (not illustrated).

The light shielding rate (the light transmission rate) of the dimming device 700 can be controlled according to a voltage which is applied to the first transparent electrode 702 and the second transparent electrode 704. Specifically, for example, in a case where a voltage is applied to the second transparent electrode 704 in a state where the first transparent electrode 702 is grounded, the light shielding rate of the dimming layer 705 is changed. An electric potential difference between the first transparent electrode 702 and the second transparent electrode 704 may be controlled, or a voltage applied to the first transparent electrode 702 and a voltage applied to the second transparent electrode 704 may be independently controlled.

Furthermore, when the number of pixels in horizontal direction of the virtual image forming region (the second deflection units 142 and 342) in the dimming device 700 is set to $M_0$, and the number of pixels in the vertical direction is set to $N_0$, the number $M_1 \times N_1$ of minimum unit regions 708 in which the light shielding rate of the dimming device 700 is changed, for example, is $M_0=M_1$ and $N_0=N_1$. However, the present disclosure is not limited thereto, and it is possible to set an aspect of satisfying $1.1 \leq k$, preferably, $1.1 \leq k \leq 1.5$, more preferably, $1.15 \leq k \leq 1.3$ and $1.1 \leq k'$, preferably, $1.1 \leq k' \leq 1.5$, and more preferably, $1.15 \leq k' \leq 1.3$ at the time of $M_1/M_0=k$ and $N_1/N_0=k'$ (here, k and k' are a positive integer). The value of k and the value of k' may be identical to each other, or may be different from each other, and in the examples, $k=k'=1$ is set.

In Example 8 or Example 9 to Example 10 described later, the dimming device 700 includes a light shutter using a color change in substances generated by an oxidation and reduction reaction of an electrochromic material. Specifically, the dimming layer contains an electrochromic material. More specifically, the dimming layer has a laminate structure of a $WO_3$ layer 705A/a $Ta_2O_5$ layer 705B/an $Ir_xSn_{1-x}O$ layer 705C from the second transparent electrode side. The $WO_3$ layer 705A performs reduction coloring. In addition, the $Ta_2O_5$ layer 705B configures a solid electrolyte, and the $Ir_xSn_{1-x}O$ layer 705C performs oxidation coloring.

In the $Ir_xSn_{1-x}O$ layer, Ir and $H_2O$ react with each other, and thus, exist as iridium hydroxide Ir $(OH)_n$. In a case where a negative electric potential is applied to the second transparent electrode 704, and a positive electric potential is applied to the first transparent electrode 702, protons of H⁺ are moved to the $Ta_2O_5$ layer from the $Ir_XSn_{1-X}O$ layer, electrons are emitted to first transparent electrode 702, and the next oxidation reaction is performed, and thus, the $Ir_XSn_{1-X}O$ layer is colored.

$$Ir(OH)_n \rightarrow IrO_X(OH)_{n-X}(\text{colored}) + X.H^+ + X.e^-$$

On the other hand, the protons H⁺ in the $Ta_2O_5$ layer are moved to the $WO_3$ layer, and the electrons are injected to the $WO_3$ layer from the second transparent electrode 704, and in the $WO_3$ layer, the next reduction reaction is performed, and thus, the $WO_3$ layer is colored.

$$WO_3 + X.H^+ + X.e^- \rightarrow H_XWO_3(\text{colored})$$

In contrast, in a case where a positive electric potential is applied to the second transparent electrode 704, and a negative electric potential is applied to the first transparent electrode 702, in the $Ir_XSn_{1-X}O$ layer, the reduction reaction is performed, and decoloring is performed in the order reverse to the order described above, and in $WO_3$ layer, the oxidation reaction is performed, and the decoloring is performed in the order reverse to the order described above. Furthermore, $H_2O$ is contained in the $Ta_2O_5$ layer, and $H_2O$ is contained in a state of protons H⁺ and OH⁻ ions by being ionized by applying a voltage to the first transparent electrode and the second transparent electrode, and thus, contributes to a coloring reaction and a decoloring reaction.

In Example 8 or Example 9 to Example 10 described later, for example, the outside world as illustrated in FIG. 24, is seen by the observer through the dimming device 700 and the optical devices 120, 320, and 520 in a state where the light shielding rate is low. Then, the observer, for example, wants to obtain information of "how to get to the station".

In this case, information or data relevant to an image displayed on the image display devices 100, 200, 300, 400, and 500, or a signal received by a receiving device, for example, is recorded, managed, and stored in a so-called cloud computer or a server, and the display device includes a communication unit (a transmitting and receiving device), for example, a mobile phone or a smart phone, or combines the control device (the control circuit and the control unit) 18 with the communication unit (the receiving device), and thus, it is possible to the delivery and the exchange of various information items or data items, and the signal between the cloud computer or the server and the display device through the communication unit, and to receive a signal based on various information items or data items, that is, a signal for displaying an image on the image display devices 100, 200, 300, 400, and 500, and it is possible for the receiving device to receive a signal.

Specifically, in a case where the observer inputs to the mobile phone or the smart phone that "information relevant to the station" as desirable information, the mobile phone or the smart phone accesses the cloud computer or the server, and obtains the "information relevant to the station" from the cloud computer or the server. Thus, the control device 18 receives signal for displaying an image on the image display devices 100, 200, 300, 400, and 500. In the control device 18, known image processing is performed on the basis of the signal, and the "information relevant to the station" is displayed on the image forming devices 111 and 211 as an image. In the image, the "information relevant to the station" is displayed on the optical devices 120, 320, and 520 as a virtual image in a predetermined position controlled by the control device 18 on the basis of the light exiting from the image forming devices 111 and 211. That is, the virtual image is formed in a part of the virtual image forming region (the second deflection units 142 and 342). Then, the dimming device 700 is controlled such that the light shielding rate of the virtual image projection region 711 of the dimming device 700 including the projection image of the virtual image with respect to the dimming device 700 is higher than the light shielding rate of the other region 712 of the dimming device 700 (refer to FIG. 25B). Specifically, a voltage applied to the first transparent electrode 702 and the second transparent electrode 704 is controlled by the control device 18. Here, the size and the position of the virtual image projection region 711 of the dimming device 700 is determined on the basis of the signal for displaying an image on the image forming devices 111 and 211.

According to a case, the signal for displaying an image on the image display devices 100, 200, 300, 400, and 500 may be stored in the display device (specifically, the control device 18, and more specifically, the image information storage device 18A).

Alternatively, an image imaged by the imaging device 17 included in the display device may be transmitted to the cloud computer or the server through the communication unit, various information items or data items corresponding to the image imaged by the imaging device 17 may be searched in the cloud computer or the server, various information items or data items, which have been searched, may be transmitted to the display device through the communication unit, and the images of various information items or data items, which have been searched, may be displayed on the image display devices 100, 200, 300, 400, and 500. In addition, in the case of using such an aspect and the input of the "information relevant to the station" together, for example, it is possible to weigh information such as the location of the observer, or the direction that the observer is directed, and thus, it is possible to display the "information relevant to the station" on the image forming devices 111 and 211 with higher accuracy.

An aspect may be adopted in which the light shielding rate of the virtual image projection region 711 of the dimming device 700 increases (refer to FIG. 25A), before the virtual image is formed in the optical devices 120, 320, and 520 on the basis of the light exiting from the image forming devices 111 and 211 (refer to FIG. 25B). Time of 0.5 seconds to 30 seconds can be exemplified as time from the increase of the light shielding rate of the virtual image projection region 711 of the dimming device 700 to the formation of the virtual image, but the present disclosure is not limited thereto. Thus, it is possible for the observer to know in advance when the virtual image is formed in which position of the optical device, and thus, it is possible to improve visibility of the virtual image of the observer. It is possible to set an aspect in which the light shielding rate of the virtual image projection region 711 of the dimming device 700 sequentially increases over time. That is, a so-called fade-in state can be obtained.

In a case where the virtual image is not formed, the light shielding rate of the entire dimming device 700 may be the same value as that of the light shielding rate of the other region of the dimming device 700. When the formation of the virtual image is ended, and the virtual image disappears, the light shielding rate of the virtual image projection region 711 of the dimming device 700 including the projection image of the virtual image with respect to the dimming device 700 may be immediately set to the same value as that of the light shielding rate of the other region of the dimming device 700, or may be controlled such that the light shielding rate is set to the same value as that of the light shielding rate of the other region of the dimming device 700 over time (for example, for 3 seconds). That is, a so-called fade-out state can be obtained.

A case will be assumed in which one virtual image is formed in the optical devices 120, 320, and 520 on the basis of the light exiting from the image forming devices 111 and 211, and then, the next virtual image different from one virtual image is formed. In this case, it is possible to set an aspect in which when the area of the virtual image projection region 711 of the dimming device 700 corresponding to one virtual image is set to $S_1$, and the area of the virtual image projection region 711 of the dimming device 700 corresponding to the next virtual image is set to $S_2$, in the case of $S_2/S_1<0.8$ or $1<S_2/S_1$, the virtual image projection region 711 of the dimming device 700 in which the next virtual image is formed is a region of the dimming device 700 including a projection image of the next virtual image with respect to the dimming device 700 (refer to FIG. 26A, FIG. 26B, and FIG. 26C), and in the case of $0.8 \le S_2/S_1 \le 1$, the virtual image projection region 711 of the dimming device 700 in which the next virtual image is formed is a region of the dimming device 700 including a projection image of one virtual image with respect to the dimming device 700. That is, it is possible to set an aspect in which in a case where the area of the virtual image projection region decreases by 0% to 20% from the formation of one virtual image to the formation of the next virtual image, the virtual image projection region corresponding to one virtual image is retained (that is, in the state illustrated in FIG. 26A).

In addition, as illustrated in FIG. 27, it is possible to set a configuration in which when the virtual rectangles 142A and 342A circumscribed on the virtual image formed in the optical devices 120, 320, and 520 are assumed, the virtual image projection region 711 of the dimming device 700 is larger than the virtual rectangles 142A and 342A. Then, in this case, when the lengths of the virtual rectangles 142A and 342A circumscribed on the virtual image formed in the optical devices 120, 320, and 520 in the horizontal direction and the vertical direction are set to $L_{1-T}$ and $L_{1-L}$, and the shape of the virtual image projection region 711 of the dimming device 700 is set to a rectangular shape in which the lengths in the horizontal direction and the vertical direction are set to $L_{2-T}$ and $L_{2-L}$, it is preferable to satisfy $1.0 \le L_{2-T}/L_{1-T} \le 1.5$, and $1.0 \le L_{2-L}/L_{1-L} \le 1.5$.

Furthermore, in FIG. 27, a state is illustrated in which "ABCD" is formed as the virtual image.

The dimming device 700 may be constantly in an operation state, an operation/non-operation (On/Off) state may be defined according to an instruction (a manipulation) of the observer, or the dimming device 700 may be generally in a non-operation state, and an operation may be started on the basis of the signal for displaying an image on the image display devices 100, 200, 300, 400, and 500. In order to define the operation/non-operation state according to the instruction (the manipulation) of the observer, for example, the display device may further include a microphone, and may control the operation of the dimming device 700 according to audio input through the microphone. Specifically, the switching of the operation/non-operation of the dimming device 700 may be controlled according to an instruction based on the real voice of the observer. Alternatively, desirable information may be input by the audio input. Alternatively, the display device may further include an infrared ray input and output device, and the operation of the dimming device 700 may be controlled by the infrared ray input and output device. Specifically, the blink of the observer may be detected by the infrared ray input and output device, and thus, the switching of the operation/non-operation of the dimming device 700 may be controlled.

As described above, in the display device of Example 8, when the virtual image is formed in a part of the virtual image forming region on the basis of the light exiting from the image forming device, the dimming device is controlled such that the light shielding rate of the virtual image projection region of the dimming device including the projection image of the virtual image with respect to the dimming device is higher than the light shielding rate of the other region of the dimming device, and thus, it is possible to impart high contrast to the virtual image observed by the observer, and a region of a high light shielding rate is not the entire dimming device, but only a narrow region such as the virtual image projection region of the dimming device including the projection image of the virtual image with respect to the dimming device is the region of a high light shielding rate, and thus, it is possible for the observer using the display device to reliably and securely recognize the external environment.

It is possible to set an aspect in which the frame includes the front portion disposed on the front of the observer, two temple portions rotatably attached to both ends of the front portion through the hinge, and the nose pad; and the dimming device 700 is disposed in the front portion. In addition, it is possible to set an aspect in which the optical device is attached to the dimming device 700. Furthermore, the optical device may be attached to the dimming device 700 in a cohesive state, or may be attached to the dimming device 700 in a state having a gap. Further, in such a case, as described above, it is possible to set an aspect in which the front portion includes the rim; and the dimming device 700 is fitted into the rim, or it is possible to set an aspect in which at least one of the second substrate 122 (the first substrate 701 for a dimming device) and the second substrate 703 for a dimming device is fitted into the rim, and it is possible to set an aspect in which the dimming device 700 and the first substrates 121 and 321 are fitted into the rim, and it is possible to set an aspect in which the first substrates 121 and 321 are fitted into the rim.

The dimming layer 705 can be configured of a light shutter including a liquid crystal display device. In this case, specifically, the dimming layer 705, for example, can be configured of a liquid crystal material layer including a twisted nematic (TN) type liquid crystal material or a super twisted nematic (STN) type liquid crystal material. The first transparent electrode 702 and the second transparent electrode 704 are patterned, and the light shielding rate (the light transmission rate) of the region 712 of a part of the dimming device 700 can be changed to be in a state different from the light shielding rate of the other region. Alternatively, one of the first transparent electrode 702 and the second transparent electrode 704 is set to a so-called solid electrode which is not patterned, and the other is patterned, and is connected to the TFT. Then, the light shielding rate of the minimum unit region 708 in which the light shielding rate of the dimming device 700 is changed is controlled by the TFT. That is, the light shielding rate may be controlled on the basis of an active matrix method. It is obvious that the control of the light shielding rate based on the active matrix method can be applied to the dimming device 700 described in Example 8 or Example 9 to Example 10 described later.

In addition, it is possible to use a light shutter controlling the light shielding rate (the light transmission rate) according to an electrowetting phenomenon. Specifically, a structure is obtained in which the first transparent electrode and the second transparent electrode are disposed, and a space between the first transparent electrode and the second transparent electrode is filled with a first liquid having insulating properties and a second liquid having conductivity. Then, a voltage is applied between the first transparent electrode and the second transparent electrode, and thus, the shape of an interface formed by the first liquid and the second liquid, for example, is changed to a curved state from the shape of a flat surface, and therefore, the light shielding rate (the light transmission rate) can be controlled. Alternatively, it is possible to use a light shutter to which an electrodeposition method (electrodeposition and electric field precipitation) based on an electrodeposition and disassociation phenomenon occurring by a reversible oxidation and reduction reaction of a metal (for example, silver particles) is applied. Specifically, $Ag^+$ and $I^-$ are dissolved in an organic solvent, and a suitable voltage is applied to the electrode, and thus, $Ag^+$ is reduced, and Ag is precipitated, and thus, the light shielding rate (the light transmission rate) of the dimming device decreases, and Ag is oxidized, and is dissolved as $Ag^+$, and thus, the light shielding rate (the light transmission rate) of the dimming device increases.

According to a case, it is possible to set a configuration in which the light passing through the dimming device is colored with a desired color by the dimming device, and in this case, the coloring color of the dimming device is variable. Specifically, for example, the dimming device coloring the light with red, the dimming device coloring the light with green, and the dimming device coloring the light with blue may be laminated.

The dimming device may be detachably disposed in a region from which the light of the optical device exits. Thus, in order to detachably dispose the dimming device, for example, the dimming device may be attached to the optical device by using screws prepared from transparent plastic, and may be connected to the control circuit for controlling the light transmission rate of the dimming device (for example, included in the control device 18 controlling the image forming device) through the connector and the wiring.

Example 9

Example 9 is a modification of Example 8. A schematic view of the display device of Example 9 as seen from the above is illustrated in FIG. 28A. In addition, a schematic view of a circuit controlling the environmental illuminance measurement sensor is illustrated in FIG. 28B.

The display device of Example 9 further includes an environmental illuminance measurement sensor 721 measuring the illuminance of the environment where the display device is disposed, and the light shielding rate of the dimming device 700 is controlled on the basis of a measurement result of the environmental illuminance measurement sensor 721. At the same time, or independently, the brightness of the image formed by the image forming devices 111 and 211 is controlled on the basis of the measurement result of the environmental illuminance measurement sensor 721. The environmental illuminance measurement sensor 721 having a known configuration and structure, for example, may be disposed in an outside end portion of the optical devices 120 and 320, or an outside end portion of the dimming device 700. The environmental illuminance measurement sensor 721 is connected to the control device 18 through the connector and the wiring (not illustrated). The control device 18 includes a circuit controlling the environmental illuminance measurement sensor 721. The circuit controlling the environmental illuminance measurement sensor 721 is configured of an illuminance arithmetic circuit obtaining an illuminance by receiving a measurement value from the environmental illuminance measurement sensor 721, a comparison arithmetic circuit comparing the value of the illuminance obtained by the illuminance arithmetic circuit with a standard value, and an environmental illuminance measurement sensor control circuit controlling the dimming device 700 and/or the image forming devices 111 and 211 on the basis of the value obtained by the comparison arithmetic circuit, and the circuit can be configured of a known circuit. In the control of the dimming device 700, the light shielding rate of the dimming device 700 is controlled, and on the other hand, in the control of the image forming devices 111 and 211, the brightness of the image formed by the image forming devices 111 and 211 is controlled. Furthermore, the light shielding rate of the dimming device 700 and the brightness of the image formed by the image forming devices 111 and 211 may be independently controlled, or may be controlled with a mutual relationship.

For example, when the measurement result of the environmental illuminance measurement sensor 721 is greater than or equal to a predetermined value (a first illuminance measurement value), the light shielding rate of the dimming device 700 is greater than or equal to a predetermined value (a first light shielding rate). On the other hand, when the measurement result of the environmental illuminance measurement sensor 721 is less than or equal to a predetermined value (a second illuminance measurement value), the light shielding rate of the dimming device 700 is less than or equal to a predetermined value (a second light shielding rate). Here, 10 luxes can be exemplified as the first illuminance measurement value, any value of 99% to 70% can be exemplified as the first light shielding rate, 0.01 luxes can be exemplified as the second illuminance measurement value, and any value of 49% to 1% can be exemplified as the second light shielding rate.

Furthermore, the environmental illuminance measurement sensor 721 of Example 9 can be applied to the display device described in Example 1 to Example 7. In addition, in a case where the display device includes the imaging device 17, the environmental illuminance measurement sensor 721 can be configured of a light receiving element for measuring exposure provided in the imaging device 17.

In the display devices of Example 9 or Example 10 described below, the light shielding rate of the dimming device is controlled on the basis of the measurement result of the environmental illuminance measurement sensor, the brightness of the image formed by the image forming device is controlled on the basis of the measurement result of the environmental illuminance measurement sensor, the light shielding rate of the dimming device is controlled on the basis of the measurement result of the transmitted light illuminance measurement sensor, and the brightness of the image formed by the image forming device is controlled on the basis of the measurement result of the transmitted light illuminance measurement sensor, and thus, it is possible to not only impart high contrast to the virtual image observed by the observer, but also optimize an observation state of the virtual image according to the illuminance of the surrounding environment where the display device is disposed.

Example 10

Example 10 is also a modification of Example 8. A schematic view of the display device of Example 10 as seen from the above is illustrated in FIG. 29A. In addition, a schematic view of the circuit controlling the transmitted light illuminance measurement sensor is illustrated in FIG. 29B.

The display device of Example 10 further includes a transmitted light illuminance measurement sensor 722 measuring an illuminance based on the light transmitted through the dimming device from the external environment, that is, measuring whether or not environment light is transmitted through the dimming device and is incident by adjusting the illuminance to a desired illuminance, and controls the light shielding rate of the dimming device 700 on the basis of a measurement result of the transmitted light illuminance measurement sensor 722. At the same time, or independently, the brightness of the image formed by the image forming devices 111 and 211 is controlled on the basis of the measurement result of the transmitted light illuminance measurement sensor 722. The transmitted light illuminance measurement sensor 722 having a known configuration and structure is disposed on the observer side from the optical devices 120, 320, and 520. Specifically, the transmitted light illuminance measurement sensor 722, for example, may be disposed on an inside surface of the housings 113 and 213, or the surface of the first substrates 121 and 321 on the observer side. The transmitted light illuminance measurement sensor 722 is connected to the control device 18 through the connector and the wiring (not illustrated). The control device 18 includes a circuit controlling the transmitted light illuminance measurement sensor 722. The circuit controlling the transmitted light illuminance measurement sensor 722 is configured of an illuminance arithmetic circuit obtaining an illuminance by receiving a measurement value from the transmitted light illuminance measurement sensor 722, a comparison arithmetic circuit comparing the value of the illuminance obtained by the illuminance arithmetic circuit with a standard value, and a transmitted light illuminance measurement sensor control circuit controlling the dimming device 700 and/or the image forming devices 111 and 211 on the basis of the value obtained by the comparison arithmetic circuit, and the circuit can be configured of a known circuit. In the control of the dimming device 700, the light shielding rate of the dimming device 700 is controlled, and on the other hand, in the control of the image forming devices 111 and 211, the brightness of the image formed by the image forming devices 111 and 211 is controlled. Furthermore, the light shielding rate of the dimming device 700 and the brightness of the image formed by the image forming devices 111 and 211 may be independently controlled, or may be controlled with a mutual relationship. Further, in a case where the measurement result of the transmitted light illuminance measurement sensor 722 is not capable of being controlled to a desired illuminance in consideration of the illuminance of the environmental illuminance measurement sensor 721, that is, in a case where the measurement result of the transmitted light illuminance measurement sensor 722 is not the desired illuminance or in a case where more delicate illuminance adjustment is required, the light shielding rate of the dimming device may be adjusted while monitoring the value of the transmitted light illuminance measurement sensor 722. At least two transmitted light illuminance measurement sensors are arranged, and an illuminance may be measured on the basis of light passing through the portion of a high light shielding rate, or an illuminance may be measured on the basis of light passing through the portion of a low light shielding rate.

Furthermore, the transmitted light illuminance measurement sensor 722 of Example 10 can be applied to the display device described in Example 1 to Example 7. Alternatively, the transmitted light illuminance measurement sensor 722 of Example 10 and the environmental illuminance measurement sensor 721 of Example 9 may be combined with each other, and in this case, various tests are performed, the light shielding rate of the dimming device 700 and the brightness of the image formed by the image forming devices 111 and 211 may be independently controlled, or may be controlled with a mutual relationship. In each of a dimming device for a right eye and a dimming device for a left eye, a voltage applied to the first transparent electrode and the second transparent electrode is adjusted, and thus, it is possible to equalize a light shielding rate of the dimming device for a right eye and a light shielding rate of the dimming device for a left eye. An electric potential difference between the first transparent electrode and the second transparent electrode may be controlled, or a voltage applied to the first transparent electrode and a voltage applied to the second transparent electrode may be independently controlled. The light shielding rate of the dimming device for a right eye and the light shielding rate of the dimming device for a left eye, for example, can be controlled on the basis of the measurement result of the transmitted light illuminance measurement sensor 722, or the observer observes a brightness of light passing through the dimming device for a right eye and the optical device and a brightness of light passing through the dimming device for a left eye and the optical device, and the observer can manually control and adjust the brightness by manipulating a switch or a button, a dial, a slider, a knob, or the like.

Example 11

Example 11 is a modification of Example 8 to Example 13, and in Example 11, the dimming layer is configured of an electrophoretic dispersion liquid. Hereinafter, a preparing method of the electrophoretic dispersion liquid will be described.

First, 10 grams of carbon black (#40, manufactured by Mitsubishi Chemical Corporation) as electrophoretic particles was added to 1 liter of pure water, and was stirred, and then, 1 $cm^3$ of a hydrochloric acid of 37 mass % and 0.2 grams of 4-vinyl aniline were added, and thus, a solution-A was prepared. On the other hand, 0.3 grams of sodium nitrite was dissolved in 10 $cm^3$ of pure water, and then, was heated to 40° C., and thus, a solution-B was prepared. Then, the solution-B was slowly added to the solution-A, and was stirred for 10 hours. After that, a product obtained by a reaction was subjected to centrifugal separation, and thus, a solid content was obtained. Next, the solid content was washed by a method in which the solid content was washed with pure water, and was dispersed in acetone, and then, was subjected to centrifugal separation. After that, the solid content was dried in a vacuum drying machine at a temperature of 50° C. overnight.

Next, 5 grams of a solid content, 100 $cm^3$ of toluene, 15 $cm^3$ of methacrylic acid 2-ethyl hexyl, and 0.2 grams of azobisisobutyronitrile (AIBN) were put into a reaction flask provided with a nitrogen purge device, a magnetic stirring rod, and a reflux column, and were mixed. Then, the reaction flask was purged with nitrogen gas for 30 minutes while being stirred. After that, the reaction flask was put into an oil bath, and was gradually heated to 80° C. while being continuously stirred, and such a state was maintained for 10 hours. After that, a manipulation of performing cooling to a room temperature, of performing centrifugal separation with respect to the solid content, and of performing centrifugal separation with respect to the solid content along with tetrahydrofuran (THF) and ethyl acetate was performed three times, and the solid content was washed, and then, the solid content was taken out, and was dried in a vacuum drying machine at 50° C. overnight. With this arrangement, 4.7 grams of brown electrophoretic particles was obtained.

On the other hand, an Isopar G (manufactured by Exxon Mobil Corporation) solution containing 0.5% of N,N-dimethyl propane-1,3-diamine, an 1,2-hydroxy octadecanoic acid, and methoxy sulfonyl oxymethane (Solsperse 17000, manufactured by The Lubrizol Corporation) and containing 1.5% of sorbitan trioleate (Span 85) was prepared as a dispersion liquid (a dispersion medium), which is an insulating liquid. Then, 0.1 grams of the electrophoretic particles was added to 9.9 grams of the dispersion medium, and was stirred by a beads mill for 5 minutes. After that, the mixed liquid was subjected to centrifugal separation in a centrifugal separator (rotation rate=2000 rpm) for 5 minutes, and then, the beads were removed. Thus, an electrophoretic dispersion liquid was capable of being obtained. Furthermore, the electrophoretic particles were charged positively.

In the dimming device 700 of Example 11, a distance between the second substrate 122 (the first substrate 701 for a dimming device) and the second substrate 703 for a dimming device was set to 50 μm. The first transparent electrode 702 and the second transparent electrode 704 are configured of an indium-tin composite oxide (ITO), and are formed by a combination of a PVD method such as a sputtering method and a lift-off method. The first transparent electrode 702 is patterned into the shape of a comb-shaped electrode. On the other hand, the second transparent electrode 704 is a so-called solid electrode, which is not patterned. The first transparent electrode 702 and the second transparent electrode 704 are connected to the control device 18 through the connector and the wiring (not illustrated).

The light shielding rate (the light transmission rate) of the dimming device 700 can be controlled according to a voltage applied to the first transparent electrode 702 and the second transparent electrode 704. Specifically, in a case where a relatively positive voltage is applied to the first transparent electrode 702, and a relatively negative voltage is applied to the second transparent electrode 704, the electrophoretic particles, which are charged positively, migrate to cover the second transparent electrode 704. Accordingly, the light shielding rate of the dimming device 700 is a high value. In contrast, in a case where a relatively negative voltage is applied to the first transparent electrode 702, and a relatively positive voltage is applied to the second transparent electrode 704, the electrophoretic particles migrate to cover the first transparent electrode 702. Accordingly, the light shielding rate of the dimming device 700 is a low value. A voltage applied to the first transparent electrode 702 and the second transparent electrode 704 can be performed by manipulating a control knob of the control device 18 by the observer. That is, the virtual image from the optical devices 120 and 320 is observed by the observer, and the light shielding rate of the dimming device 700 is adjusted, and thus, the contrast of the virtual image may be improved.

Example 12

Example 12 is a modification of Example 11. In Example 11, the coloring color of the dimming device 700 was set to a fixed color of black. On the other hand, in Example 12, the light passing through the dimming device is colored with a desired color by the dimming device, and the coloring color of the dimming device is variable. Specifically, the dimming device is formed by laminating the dimming device coloring the light with red, the dimming device coloring the light with yellow, and the dimming device coloring the light with blue. Here, an electrophoretic dispersion liquid of the dimming device coloring the light with red, is configured of a dispersion liquid which is obtained by premixing a styrene-based resin and C.I. Pigment Red 122 with a Henschel mixer as the electrophoretic particles, and then, by melt-kneading the mixture with a twin screw extruder, by cooling the mixture, and then, by coarsely grinding the mixture with a hammer mill, and then, by dispersing particles, which are finely ground by a jet mill, in an Isopar G (manufactured by Exxon Mobil Corporation) solution containing 0.5% of N,N-dimethyl propane-1,3-diamine, an 1,2-hydroxy octadecanoic acid, and methoxy sulfonyl oxymethane (Solsperse 17000, manufactured by The Lubrizol Corporation) and containing 1.5% of sorbitan trioleate (Span 85). In addition, an electrophoretic dispersion liquid of the dimming device coloring the light with yellow, is configured of a dispersion liquid which is obtained by premixing a styrene-based resin and C.I. Pigment Yellow 12 with a Henschel mixer as the electrophoretic particles, and then, by melt-kneading the mixture with a twin screw extruder, by cooling the mixture, and then, by coarsely grinding the mixture with a hammer mill, and then, by dispersing particles, which are finely ground by a jet mill in an Isopar G (manufactured by Exxon Mobil Corporation) solution containing 0.5% of N,N-dimethyl propane-1,3-diamine, an 1,2-hydroxy octadecanoic acid, and methoxy sulfonyl oxymethane (Solsperse 17000, manufactured by The Lubrizol Corporation) and containing 1.5% of sorbitan trioleate (Span 85). Further, an electrophoretic dispersion liquid of the dimming device coloring the light with blue, is configured of a dispersion liquid which is obtained by premixing a styrene-based resin and C.I. Pigment Blue 1 with a Henschel mixer as the electrophoretic particles, and then, by melt-kneading the mixture with a twin screw extruder, by cooling the mixture, and then, by coarsely grinding the mixture with a hammer mill, and then, dispersing particles, which are finely ground by a jet mill, in an Isopar G (manufactured by Exxon Mobil Corporation) solution containing 0.5% of N,N-dimethyl propane-1,3-diamine, an 1,2-hydroxy octadecanoic acid, and methoxy sulfonyl oxymethane (Solsperse 17000, manufactured by The Lubrizol Corporation) and containing 1.5% of sorbitan trioleate (Span 85). Then, the applying of a voltage to the electrode of each of the dimming devices is controlled, and thus, the external light exiting from the three-layer dimming device can be colored with a desired color.

The configuration and the structure of the display device of Example 12 can be similar to the configuration and the structure of the display device described in Example 11 except for the above description, and thus, the detailed description will be omitted.

Example 13

Example 13 is a modification of Example 1 to Example 12. In Example 13, as illustrated in FIG. 30, a first deflection unit A (141A) is disposed on the first surface 121A of the first substrate 121, a first deflection unit B (141B) is disposed on the second surface 121B of the first substrate 121, and a third substrate 123 is disposed to cover the second surface 121B of the first substrate 121. An outer edge portion of the second surface 121B of the first substrate 121 and an outer edge portion of the first surface 123A of the third substrate 123 are sealed with the sealing member 125. In addition, a moisture absorption member 130 is disposed in a space surrounded by the first substrate 121, the third substrate 123, and the sealing member 125.

Specifically, it is possible to set an aspect in which the deflection unit is configured of the first deflection unit A (141A), the first deflection unit B (141B), and the second change unit 142, an interference fringe 1A is formed in the reflective volume hologram diffraction grating film configuring the first deflection unit A (141A), an interference fringe 1B is formed in the reflective volume hologram diffraction grating film configuring the first deflection unit B (141B), a second interference fringe is formed in the reflective volume hologram diffraction grating film configuring the second deflection unit 142, and a relationship of $$\phi_{1A} < \phi_2 < \phi_{1B} \text{ and } P_{1A} = P_2 = P_{1B}$$

is satisfied. Here, $\phi_{1A}$: of slant angle of interference fringe 1A
$\phi_{1B}$: slant angle of interference fringe 1B
$\phi_2$: slant angle of second interference fringe
$P_{1A}$: pitch of interference fringe 1A
$P_{1B}$: pitch of interference fringe 1B
$P_2$: pitch of second interference fringe.

Alternatively, it is possible to set an aspect in which a relationship of $$\lambda_{1A} < \lambda_2 < \lambda_{1B}$$

is satisfied.
Here, $\lambda_{1A}$: peak wavelength of light incident on first substrate and deflected by first deflection unit A
$\lambda_{1B}$: peak wavelength of light incident on first substrate and deflected by first deflection unit B
$\lambda_2$: peak wavelength of light deflected by first deflection unit A and first deflection unit B, propagating through first substrate by total reflection, and deflected by second deflection unit.

The configuration and the structure of such the optical device of Example 13, the image display device of Example 13 including such the optical device of Example 13, and the display device of Example 13 are capable of being similar to the configuration and the structure of the image display device and the display device described in Example 1 to Example 12 except for the above description, and thus, the detailed description will be omitted.

As described above, the present disclosure has been described on the basis of preferred examples, but the present disclosure is not limited to such examples. The configuration and the structure of the display device (the head mounted display), the image display device, and the optical device described in the examples are an example, and can be suitably changed. For example, a front relief type hologram (refer to US Patent No. 20040062505 A1) may be disposed on the first substrate (the light guide plate). In the optical device 120, the deflection unit can be configured of a transmissive hologram diffraction grating film, or it is possible to set an aspect in which one of the first deflection unit and the second deflection unit is configured of a reflective hologram diffraction grating film, and the other is configured of a transmissive hologram diffraction grating film. Alternatively, the deflection unit can be a reflective blazed diffraction grating film. The display device of the present disclosure can be used as a stereoscopic display device. In this case, as necessary, a polarization plate or a polarization film may be detachably attached to the optical device, or the polarization plate or the polarization film may be bonded to the optical device.

In the examples, it have been described that the image forming devices 111 and 211 display a monochroic (for example, green) image, but the image forming devices 111 and 211 are capable of displaying a color image, and in this case, the light source, for example, may be configured of a light source allowing red light, green light, and blue light to exit. Specifically, for example, red light, green light, and blue light respectively exiting from a red light emitting element, a green light emitting element, and a blue light emitting element may be mixed and subjected to brightness homogenization by using a light pipe, and thus, white light may be obtained.

Furthermore, the present disclosure is capable of having the following configurations.

[A01]<<Optical Device>>

An optical device, including:
a first substrate which includes a first surface, and a second surface facing the first surface;
a second substrate which includes a first surface, and a second surface facing the first surface, the first surface being disposed to face the first surface of the first substrate;
a deflection unit which is disposed on the first surface of the first substrate;
a sealing member which seals an outer edge portion of the first surface of the first substrate and an outer edge portion of the first surface of the second substrate; and
a moisture absorption member which is disposed in a space surrounded by the first substrate, the second substrate, and the sealing member.

[A02] The optical device according to [A01],
in which the moisture absorption member is disposed on the first surface of the second substrate.

[A03] The optical device according to [A02],
in which the moisture absorption member, is bonded to the entire first surface of the second substrate.

[A04] The optical device according to any one of [A01] to [A03],
in which the moisture absorption member is disposed in a region other than the region of the first surface of the first substrate in which the deflection unit is disposed.

[A05] The optical device according to [A01],
in which the moisture absorption member is disposed in a region along the inside of the sealing member on the first surface of the second substrate, a region along the inside of the sealing member on the first surface of the first substrate, or the region along the inside of the sealing member on the first surface of the second substrate and the region along the inside of the sealing member on the first surface of the first substrate.

[A06] The optical device according to [A01],
in which a light shielding member is disposed on the outside of the second surface of the second substrate in order to cover the deflection unit.

[A07] The optical device according to [A06],
in which an orthogonal projection image of the deflection unit with respect to the second substrate is included in an orthogonal projection image of the light shielding member with respect to the second substrate.

[A08] The optical device according to [A06] or [A07], in which the moisture absorption member is disposed in a region in an orthogonal projection image of the light shielding member with respect to the second substrate, which is a region of the first surface of the second substrate, a region other than the region of the first surface of the first substrate in which the deflection unit is disposed, or the region other than the region of the first surface of the second substrate and the region of the first surface of the first substrate in which the deflection unit is disposed.

[A09] The optical device according to any one of [A01] to [A08], in which the deflection unit includes a material having water absorbability.

[A10] The optical device according to [A09], in which the deflection unit is configured of a hologram diffraction grating film including a resin material.

[A11] The optical device according to [A09] or [A10], in which a protective film is disposed on a surface of the deflection unit facing the second substrate.

[A12] The optical device according to [A11], in which the moisture absorption member and the protective film include the same material.

[A13] The optical device according to [A12], in which a thickness of the moisture absorption member is greater than a thickness of the protective film.

[A14] The optical device according to [A01], in which the deflection unit is configured of a first deflection unit and a second deflection unit, the first deflection unit deflects light which is incident on the first substrate such that the light incident on the first substrate is totally reflected in the first substrate, and the second deflection unit deflects light which propagates through the first substrate by total reflection such that the light propagating through the first substrate by the total reflection exits from the first substrate.

[A15] The optical device according to [A14], in which the moisture absorption member is disposed on the first surface of the second substrate.

[A16] The optical device according to [A15], in which the moisture absorption member is bonded to the entire first surface of the second substrate.

[A17] The optical device according to any one of [A14] to [A16], in which the moisture absorption member is disposed in a region other than the region of the first surface of the first substrate in which the first deflection unit and the second deflection unit are disposed.

[A18] The optical device according to [A14], in which the moisture absorption member is disposed in a region along the inside of the sealing member on the first surface of the second substrate, a region along the inside of the sealing member on the first surface of the first substrate, or the region along the inside of the sealing member on the first surface of the second substrate and the region along the inside of the sealing member on the first surface of the first substrate.

[A19] The optical device according to [A14], in which a light shielding member is disposed on the outside of the second surface of the second substrate in order to cover the first deflection unit.

[A20] The optical device according to [A19], in which an orthogonal projection image of the first deflection unit with respect to the second substrate is included in an orthogonal projection image of the light shielding member with respect to the second substrate.

[A21] The optical device according to [A19] or [A20], in which the moisture absorption member is disposed in a region in an orthogonal projection image of the light shielding member with respect to the second substrate, which is a region of the first surface of the second substrate, a region other than the region of the first surface of the first substrate in which the first deflection unit is disposed, or the region other than the region of the first surface of the second substrate and the region of the first surface of the first substrate in which the first deflection unit is disposed.

[A22] The optical device according to any one of [A14] to [A21], in which at least one of the first deflection unit and the second deflection unit includes a material having water absorbability.

[A23] The optical device according to [A22], in which the first deflection unit is configured of a hologram diffraction grating film which includes a resin material, and the second deflection unit is configured of a hologram diffraction grating film which includes a resin material.

[A24] The optical device according to any one of [A14] to [A23], in which a protective film is disposed on a surface of the first deflection unit and a surface of the second deflection unit which face the second substrate.

[A25] The optical device according to [A24], in which the moisture absorption member and the protective film include the same material.

[A26] The optical device according to [A25], in which a thickness of the moisture absorption member is greater than a thickness of the protective film.

[A27] The optical device according to any one of [A01] to [A26], in which a water absorption rate of the moisture absorption member is higher than a water absorption rate of a material configuring the deflection unit.

[A28] The optical device according to any one of [A01] to [A27], in which the moisture absorption member includes polyvinyl alcohol.

[A29] The optical device according to any one of [A01] to [A27], in which the moisture absorption member includes at least one type of material selected from the group consisting of nanoporous silica, molecular sieve, zeolite, active carbon, active alumina, diatomaceous earth, montmorillonite, and bentonite.

[A30] The optical device according to any one of [A01] to [A27], in which the moisture absorption member includes a resin film having a light transmission rate of greater than or equal to 50%.

[A31] The optical device according to any one of [A01] to [A30], in which the first substrate and the second substrate include a transparent substrate.

[A32] The optical device according to any one of [A01] to [A31], in which a dimming device is disposed on the second surface side of the second substrate.

[B01] An optical device, including:

a virtual image forming region in which a virtual image is formed on the basis of light exiting from the image forming device, in which the virtual image forming region of the optical device overlaps with the dimming device, and when the virtual image is formed in a part of the virtual image forming region on the basis of the light exiting from the image forming device, the dimming device is controlled such that a light shielding rate of the virtual image projection region of the dimming device including a projection image of the virtual image with respect to the dimming device is higher than a light shielding rate of the other region of the dimming device.

[B02] The optical device according to [B01], in which when the dimming device is operated, and the light shielding rate of the virtual image projection region of the dimming device including the projection image of the virtual image with respect to the dimming device is set to "1", the light shielding rate of the other region of the dimming device is less than or equal to 0.95.

[B03] The optical device according to [B01] or [B02], in which when the dimming device is operated, the light shielding rate of the virtual image projection region of the dimming device is 35% to 99%.

[B04] The optical device according to any one of [B01] to [B03], in which the light shielding rate of the virtual image projection region of the dimming device increases before the virtual image is formed in the optical device on the basis of the light exiting from the image forming device.

[B05] The optical device according to any one of [B01] to [B04], in which when one virtual image is formed in the optical device on the basis of the light exiting from the image forming device, and then, the next virtual image different from one virtual image is formed, and an area of the virtual image projection region of the dimming device corresponding to one virtual image is set to $S_1$, and an area of the virtual image projection region of the dimming device corresponding to the next virtual image is set to $S_2$, in the case of $S_2/S_1 < 0.8$ or $1 < S_2/S_1$, the virtual image projection region of the dimming device in which the next virtual image is formed is a region of the dimming device including a projection image of the next virtual image with respect to the dimming device, and in the case of $0.8 \leq S_2/S_1 \leq 1$, the virtual image projection region of the dimming device in which the next virtual image is formed is a region of the dimming device including the projection image of one virtual image with respect to the dimming device.

[B06] The optical device according to any one of [B01] to [B05], in which when a virtual rectangle circumscribed on the virtual image formed in the optical device is assumed, the virtual image projection region of the dimming device is larger than the virtual rectangle.

[B07] The optical device according to [B06], in which when lengths of the virtual rectangle circumscribed on the virtual image formed in the optical device in a horizontal direction and a vertical direction are set to $L_{1-T}$ and $L_{1-L}$, and a shape of the virtual image projection region of the dimming device is set to a rectangular shape in which lengths in the horizontal direction and the vertical direction are $L_{2-T}$ and $L_{2-L}$, $1.0 \leq L_{2-T}/L_{1-T} \leq 1.5$, and $1.0 \leq L_{2-L}/L_{1-L} \leq 1.5$ are satisfied.

[B08] The optical device according to any one of [B01] to [B07], in which the dimming device, includes a first substrate for a dimming device, a second substrate for a dimming device facing the first substrate for a dimming device, a first transparent electrode disposed on a facing surface of the first substrate for a dimming device facing the second substrate for a dimming device, a second transparent electrode disposed on a facing surface of the second substrate for a dimming device facing the first substrate for a dimming device, and a dimming layer interposed between the first transparent electrode and the second transparent electrode.

[B09] The optical device according to [B08], in which the first transparent electrode is configured of a plurality of strip-like first transparent electrode segments extending in a first direction, the second transparent electrode is configured of a plurality of strip-like second transparent electrode segments extending in a second direction different from the first direction, a light shielding rate of a portion of the dimming device corresponding to an overlap region between the first transparent electrode segment and the second transparent electrode segment is controlled on the basis of the control of a voltage which is applied to the first transparent electrode segment and the second transparent electrode segment.

[B10] The optical device according to any one of [B01] to [B09], further including:

an environmental illuminance measurement sensor measuring an illuminance of an environment in which the optical device is disposed, in which a light shielding rate of the dimming device is controlled on the basis of a measurement result of the environmental illuminance measurement sensor.

[B11] The optical device according to any one of [B01] to [B10], further including:

the environmental illuminance measurement sensor measuring the illuminance of the environment in which the optical device is disposed, in which a brightness of an image formed by the image forming device is controlled on the basis of the measurement result of the environmental illuminance measurement sensor.

[B12] The optical device according to any one of [B01] to [B11], further including:

a transmitted light illuminance measurement sensor measuring an illuminance based on light transmitted through the dimming device from the external environment, in which the light shielding rate of the dimming device is controlled on the basis of a measurement result of the transmitted light illuminance measurement sensor.

[B13] The optical device according to any one of [B01] to [B12], further including:

the transmitted light illuminance measurement sensor measuring the illuminance based on the light transmitted through the dimming device from the external environment, in which the brightness of the image formed by the image forming device is controlled on the basis of the measurement result of the transmitted light illuminance measurement sensor.

[B14] The optical device according to [B12] or [B13], in which the transmitted light illuminance measurement sensor is disposed on the observer side from the optical device.

[B15] The optical device according to any one of [B01] to [B14],
in which light passing through the dimming device is colored with a desired color by the dimming device.

[B16] The optical device according to [B15],
in which a coloring color of the dimming device is variable.

[B17] The optical device according to [B15],
in which the coloring color of the dimming device is fixed.

[C01]<<Image Display Device>>
An image display device, including:
(A) an image forming device; and
(B) an optical device in which light exiting from the image forming device is incident and exits,
in which the optical device, includes
a first substrate including a first surface, and a second surface facing the first surface,
a second substrate including a first surface, and a second surface facing the first surface, the first surface being disposed to face the first surface of the first substrate,
a deflection unit disposed on the first surface of the first substrate,
a sealing member sealing an outer edge portion of the first surface of the first substrate and an outer edge portion of the first surface of the second substrate, and
a moisture absorption member disposed in a space surrounded by the first substrate, the second substrate, and the sealing member.

[D01]<<Display Device>>
A display device, including:
(a) a frame mounted in a head portion of an observer; and
(b) an image display device attached to the frame,
in which the image display device, includes
(A) an image forming device, and
(B) an optical device in which light exiting from the image forming device is incident and exits, and
the optical device, includes
a first substrate including a first surface, and a second surface facing the first surface,
a second substrate including a first surface, and a second surface facing the first surface, the first surface being disposed to face the first surface of the first substrate,
a deflection unit disposed on the first surface of the first substrate,
a sealing member sealing an outer edge portion of the first surface of the first substrate and an outer edge portion of the first surface of the second substrate, and
a moisture absorption member disposed in a space surrounded by the first substrate, the second substrate, and the sealing member.

REFERENCE SIGNS LIST

10 Frame
11 Front portion
11' Center portion of front portion
12 Hinge
13 Temple portion
14 Drop end portion
15 Wiring (signal line, power source line, or the like)
16 Headphone portion
16' Wiring for headphone portion
17 Imaging device
18 Control device (control circuit, control unit)
18A Image information storage device
19 Attaching member
20 Observer
21 Pupil
100, 200, 300, 400, 500 Image display device
111, 111A, 111B, 211 Image forming device
112 Optical system (collimation optical system)
113, 213 Housing
120, 320, 520, 530 Optical device
121, 321 First substrate (light guide plate)
121A, 321A First surface of first substrate
121B, 321B Second surface of first substrate
122, 322 Second substrate (protective member)
122A, 322A First surface of first substrate
122B, 322B Second surface of first substrate
123 Third substrate
123A First surface of third substrate
123B Second surface of third substrate
124, 125 Sealing member
130, 131 Moisture absorption member
132 Protective film
141, 341 First deflection unit (first diffraction grating member)
142, 342 Second deflection unit (second diffraction grating member, virtual image forming region)
143 Third deflection unit
150 Reflective spatial light modulation device
151 Liquid crystal display device (LCD)
152 Polarization beam splitter (PBS)
153 Light source
251 Light source
252 Collimation optical system
253 Scanning unit
254 Optical system (relay optical system)
256 Total reflection mirror
521 Light guide member
522 Semi-transparent mirror
523 Deflection unit
531 Virtual image form member
533 Deflection unit
601, 602 Light shielding member
700 Dimming device
701 First substrate for dimming device (shared by second substrate)
702 First transparent electrode
702A First transparent electrode segment
703 Second substrate for dimming device
704 Second transparent electrode
704A Second transparent electrode segment
705 Dimming layer
705A $WO_3$ layer
705B $Ta_2O_5$ layer
705C $Ir_xSn_{1-x}O$ layer
706 Protective layer
707 Sealing material
708 Minimum unit region in which light shielding rate of dimming device is changed
721 Environmental illuminance measurement sensor
722 Transmitted light illuminance measurement sensor

The invention claimed is:

1. An optical device, comprising:
a first substrate which includes a first surface, and a second surface facing the first surface;
a second substrate which includes a first third surface, and a fourth surface facing the third surface, the third surface being disposed to face the first surface of the first substrate;
a deflection unit which is disposed on the first surface of the first substrate;

a sealing member which seals an outer edge portion of the first surface of the first substrate and an outer edge portion of the third surface of the second substrate; and a moisture absorption member which is disposed in a space surrounded by the first substrate, the second substrate, and the sealing member, wherein a protective film is disposed on a surface of the deflection unit facing the second substrate, wherein the moisture absorption member and the protective film include the same material, and wherein a thickness of the moisture absorption member is greater than a thickness of the protective film.

2. The optical device according to claim 1,
wherein the moisture absorption member is disposed on the third surface of the second substrate.

3. The optical device according to claim 1,
wherein the moisture absorption member is disposed in a region other than the region of the first surface of the first substrate in which the deflection unit is disposed.

4. The optical device according to claim 1,
wherein the deflection unit includes a material having water absorbability.

5. The optical device according to claim 1,
wherein the deflection unit is configured of a first deflection unit and a second deflection unit,
the first deflection unit deflects light which is incident on the first substrate such that the light incident on the first substrate is totally reflected in the first substrate, and
the second deflection unit deflects light which propagates through the first substrate by total reflection such that the light propagating through the first substrate by the total reflection exits from the first substrate.

6. The optical device according to claim 5,
wherein the moisture absorption member is disposed on the third surface of the second substrate.

7. The optical device according to claim 5,
wherein the moisture absorption member is disposed in a region other than the region of the first surface of the first substrate in which the first deflection unit and the second deflection unit are disposed.

8. The optical device according to claim 5,
wherein a light shielding member is disposed on the outside of the fourth surface of the second substrate in order to cover the first deflection unit.

9. The optical device according to claim 5,
wherein the moisture absorption member is disposed in a region in an orthogonal projection image of the light shielding member with respect to the second substrate, which is a region of the third surface of the second substrate, a region other than the region of the first surface of the first substrate in which the first deflection unit is disposed, or the region other than the region of the third surface of the second substrate and the region of the first surface of the first substrate in which the first deflection unit is disposed.

10. The optical device according to claim 5,
wherein at least one of the first deflection unit and the second deflection unit includes a material having water absorbability.

11. The optical device according to claim 10,
wherein the first deflection unit is configured of a hologram diffraction grating film which includes a resin material, and
the second deflection unit is configured of a hologram diffraction grating film which includes a resin material.

12. The optical device according to claim 5,
wherein a protective film is disposed on a surface of the first deflection unit and a surface of the second deflection unit which face the second substrate.

13. An optical device, comprising:
a first substrate which includes a first surface, and a second surface facing the first surface;
a second substrate which includes a third surface, and a fourth surface facing the third surface, the third surface being disposed to face the first surface of the first substrate;
a deflection unit which is disposed on the first surface of the first substrate;
a sealing member which seals an outer edge portion of the first surface of the first substrate and an outer edge portion of the third surface of the second substrate; and
a moisture absorption member which is disposed in a space surrounded by the first substrate, the second substrate, and the sealing member,
wherein a water absorption rate of the moisture absorption member is higher than a water absorption rate of a material configuring the deflection unit.

14. The optical device according to claim 1,
wherein the moisture absorption member includes polyvinyl alcohol.

15. The optical device according to claim 1,
wherein the moisture absorption member includes at least one type of material selected from the group consisting of nanoporous silica, molecular sieve, zeolite, active carbon, active alumina, diatomaceous earth, montmorillonite, and bentonite.

16. An image display device, comprising:
(A) an image forming device; and
(B) an optical device in which light exiting from the image forming device is incident and exits,
wherein the optical device, includes
a first substrate which includes a first surface, and a second surface facing the first surface,
a second substrate which includes a third surface, and a fourth surface facing the third surface, the third surface being disposed to face the first surface of the first substrate,
a deflection unit which is disposed on the first surface of the first substrate,
a sealing member which seals an outer edge portion of the first surface of the first substrate and an outer edge portion of the third surface of the second substrate, and
a moisture absorption member which is disposed in a space surrounded by the first substrate, the second substrate, and the sealing member, wherein a protective film is disposed on a surface of the deflection unit facing the second substrate, wherein the moisture absorption member and the protective film include the same material, and wherein a thickness of the moisture absorption member is greater than a thickness of the protective film.

17. A display device, comprising:
(a) a frame which is mounted on a head portion of an observer; and
(b) an image display device which is attached to the frame,
wherein the image display device, includes
(A) an image forming device, and
(B) an optical device in which light exiting from the image forming device is incident and exits, and
the optical device, includes a first substrate which includes a first surface, and a second surface facing the first surface, a second substrate which includes a third surface, and a fourth surface facing the third surface, the third surface being disposed to face the first surface of the first substrate, a deflection unit which is disposed on the first surface of the first substrate, a sealing member which seals an outer edge portion of the first surface of the first substrate and an outer edge portion of the third surface of the second substrate, and a moisture absorption member which is disposed in a space surrounded by the first substrate, the second substrate, and the sealing member, wherein a protective film is disposed on a surface of the deflection unit facing the second substrate, wherein the moisture absorption member and the protective film include the same material, and wherein a thickness of the moisture absorption member is greater than a thickness of the protective film.

* * * * *